US008549416B2

(12) United States Patent
Ganz et al.

(10) Patent No.: US 8,549,416 B2
(45) Date of Patent: *Oct. 1, 2013

(54) FEATURE CODES AND BONUSES IN VIRTUAL WORLDS

(75) Inventors: Howard Ganz, North York (CA); Karl Joseph Borst, Woodbridge (CA)

(73) Assignee: Ganz, Woodbridge, Ontario ( * ) Notice: Subject to any disclaimer, the term of this patent is extended or adjusted under 35 U.S.C. 154(b) by 0 days.

This patent is subject to a terminal disclaimer.

(21) Appl. No.: 13/410,436

(22) Filed: Mar. 2, 2012

(65) Prior Publication Data

US 2012/0215667 A1 Aug. 23, 2012

Related U.S. Application Data

(63) Continuation of application No. 11/951,007, filed on Dec. 5, 2007, now Pat. No. 8,205,158.

(60) Provisional application No. 60/946,829, filed on Jun. 28, 2007, provisional application No. 60/868,793, filed on Dec. 6, 2006.

(51) Int. Cl.
*G06F 3/048* (2013.01)

(52) U.S. Cl.
USPC ........... 715/757; 715/706; 715/741; 715/742; 715/745

(58) Field of Classification Search
USPC ................... 705/14; 446/465; 715/706, 741, 715/742, 745, 757
See application file for complete search history.

(56) References Cited

U.S. PATENT DOCUMENTS

| 5,255,834 A | 10/1993 | Bendersky |
| 5,411,259 A | 5/1995 | Pearson |
| 5,544,320 A | 8/1996 | Konrad |
| 5,606,652 A | 2/1997 | Silverbrook |
| 5,659,692 A | 8/1997 | Poggio et al. |
| 5,682,469 A | 10/1997 | Linnett et al. |
| 5,684,943 A | 11/1997 | Abraham |
| 5,717,869 A | 2/1998 | Moran et al. |
| 5,802,296 A | 9/1998 | Morse |

(Continued)

FOREIGN PATENT DOCUMENTS

| CA | 2475463 A1 | 8/2003 |
| DE | 10304779 A1 | 7/2003 |

(Continued)

OTHER PUBLICATIONS

Request for Reexamination of U.S. Patent No. 7,677,948—with Exhibits B,C,D,E,O,P,Q,R,S,T.

(Continued)

*Primary Examiner* — Andrey Belousov
(74) *Attorney, Agent, or Firm* — Pearne & Gordon LLP

(57) ABSTRACT

An Entertainment System including a website, in combination with a commercially purchased product, wherein the system allows a product user to register a primary product online using a registration code, allowing the user access to various activities and scenarios in a "virtual world" including a virtual representation of the product, via a computer connected to the Internet. Additional ancillary products are also provided that may be related to the primary product or the virtual world, with these ancillary products also being provided with one or more codes to provide additional content, bonus items, and/or bonus access in the virtual world.

24 Claims, 30 Drawing Sheets

(56) References Cited

U.S. PATENT DOCUMENTS

| | | | |
|---|---|---|---|
| 5,822,428 A | 10/1998 | Gardner | |
| 5,886,697 A | 3/1999 | Naughton et al. | |
| 5,923,330 A | 7/1999 | Tarlton | |
| 5,926,179 A | 7/1999 | Matsuda et al. | |
| 5,956,038 A | 9/1999 | Rekimoto | |
| 6,012,961 A | 1/2000 | Sharpe, III et al. | |
| 6,057,856 A | 5/2000 | Miyashita et al. | |
| 6,081,830 A | 6/2000 | Schindler | |
| 6,200,216 B1 | 3/2001 | Peppel | |
| 6,227,931 B1 | 5/2001 | Shackelford | |
| 6,253,167 B1 | 6/2001 | Matsuda | |
| 6,349,301 B1 | 2/2002 | Mitchell et al. | |
| 6,356,867 B1 | 3/2002 | Gabai et al. | |
| 6,388,665 B1 | 5/2002 | Linnett et al. | |
| 6,404,438 B1 | 6/2002 | Hatlelid et al. | |
| 6,493,001 B1 | 12/2002 | Takagi et al. | |
| 6,519,771 B1 | 2/2003 | Zenith | |
| 6,522,333 B1 | 2/2003 | Hatlelid et al. | |
| 6,539,400 B1 | 3/2003 | Bloomfield | |
| 6,559,863 B1 | 5/2003 | Megiddo | |
| 6,650,761 B1 | 11/2003 | Rodriguez et al. | |
| 6,685,565 B2 | 2/2004 | Tanibuchi et al. | |
| 6,719,604 B2 | 4/2004 | Chan | |
| 6,720,949 B1 | 4/2004 | Pryor | |
| 6,727,925 B1 | 4/2004 | Bourdelais | |
| 6,734,884 B1 | 5/2004 | Berry | |
| 6,734,885 B1 | 5/2004 | Matsuda | |
| 6,772,195 B1 | 8/2004 | Hatlelid et al. | |
| 6,813,605 B2 | 11/2004 | Nakamura et al. | |
| 6,845,486 B2 | 1/2005 | Yamada et al. | |
| 6,899,333 B2 | 5/2005 | Weisman | |
| 6,951,516 B1 | 10/2005 | Eguchi et al. | |
| 7,012,602 B2 | 3/2006 | Watson et al. | |
| 7,042,440 B2 | 5/2006 | Pryor | |
| 7,058,897 B2 | 6/2006 | Matsuda | |
| 7,062,722 B1 | 6/2006 | Carlin et al. | |
| 7,066,781 B2 | 6/2006 | Weston | |
| 7,086,005 B1 | 8/2006 | Matsuda | |
| 7,143,358 B1 | 11/2006 | Yuen | |
| 7,155,680 B2 | 12/2006 | Akazawa et al. | |
| 7,168,051 B2 | 1/2007 | Robinson et al. | |
| 7,249,139 B2 | 7/2007 | Chuah et al. | |
| 7,314,407 B1 | 1/2008 | Pearson | |
| 7,425,169 B2 | 9/2008 | Ganz | |
| 7,442,108 B2 | 10/2008 | Ganz | |
| 7,448,231 B2 | 11/2008 | Jeanvoine et al. | |
| 7,465,212 B2 | 12/2008 | Ganz | |
| 7,478,047 B2 | 1/2009 | Loyall et al. | |
| 7,488,231 B2 | 2/2009 | Weston | |
| 7,534,157 B2 | 5/2009 | Ganz | |
| 7,548,242 B1 | 6/2009 | Hughes et al. | |
| 7,568,964 B2 | 8/2009 | Ganz | |
| 7,604,525 B2 | 10/2009 | Ganz | |
| 7,618,303 B2 | 11/2009 | Ganz | |
| 7,677,948 B2 | 3/2010 | Ganz | |
| 7,789,726 B2 | 9/2010 | Ganz | |
| 7,850,527 B2 | 12/2010 | Barney et al. | |
| 7,908,324 B2 | 3/2011 | Shochet et al. | |
| 2001/0020955 A1 | 9/2001 | Nakagawa | |
| 2001/0039206 A1 | 11/2001 | Peppel | |
| 2002/0002514 A1 | 1/2002 | Kamachi et al. | |
| 2002/0036617 A1 | 3/2002 | Pryor | |
| 2002/0054094 A1 | 5/2002 | Matsuda | |
| 2002/0065746 A1 | 5/2002 | Lewis | |
| 2002/0065890 A1 | 5/2002 | Barron | |
| 2002/0160835 A1 | 10/2002 | Fujioka et al. | |
| 2002/0169672 A1 | 11/2002 | Barnhart | |
| 2002/0198940 A1 | 12/2002 | Bower et al. | |
| 2003/0004889 A1 | 1/2003 | Fiala | |
| 2003/0061161 A1 | 3/2003 | Black | |
| 2003/0126031 A1 | 7/2003 | Asami | |
| 2003/0222902 A1 | 12/2003 | Chupin et al. | |
| 2004/0046736 A1 | 3/2004 | Pryor | |
| 2004/0053690 A1 | 3/2004 | Fogel et al. | |
| 2004/0075677 A1 | 4/2004 | Loyall et al. | |
| 2004/0092311 A1 | 5/2004 | Weston | |
| 2004/0093266 A1 | 5/2004 | Dohring | |
| 2004/0153557 A1 | 8/2004 | Shochet et al. | |
| 2004/0189702 A1 | 9/2004 | Hlavac et al. | |
| 2004/0259465 A1 | 12/2004 | Wright et al. | |
| 2005/0059483 A1 | 3/2005 | Borge | |
| 2005/0071225 A1 | 3/2005 | Bortolin | |
| 2005/0182693 A1 | 8/2005 | Alivandi | |
| 2005/0192864 A1* | 9/2005 | Ganz | 705/14 |
| 2005/0233744 A1 | 10/2005 | Karaoguz et al. | |
| 2005/0250415 A1* | 11/2005 | Barthold | 446/465 |
| 2005/0250416 A1 | 11/2005 | Barthold | |
| 2005/0287925 A1 | 12/2005 | Proch et al. | |
| 2006/0076735 A1 | 4/2006 | Proch et al. | |
| 2006/0079150 A1 | 4/2006 | Filoseta et al. | |
| 2006/0080539 A1 | 4/2006 | Asami | |
| 2006/0100018 A1 | 5/2006 | Ganz | |
| 2006/0148567 A1 | 7/2006 | Kellerman et al. | |
| 2006/0209068 A1 | 9/2006 | Ajioka et al. | |
| 2006/0230072 A1 | 10/2006 | Partovi et al. | |
| 2006/0246970 A1 | 11/2006 | Smith et al. | |
| 2006/0271433 A1 | 11/2006 | Hughs | |
| 2006/0281555 A1 | 12/2006 | Kellerman et al. | |
| 2006/0285441 A1 | 12/2006 | Walker et al. | |
| 2006/0293103 A1 | 12/2006 | Mendelsohn | |
| 2007/0050716 A1 | 3/2007 | Leahy et al. | |
| 2007/0060368 A1 | 3/2007 | Cheng | |
| 2007/0073582 A1 | 3/2007 | Jung et al. | |
| 2007/0082720 A1 | 4/2007 | Bradbury et al. | |
| 2007/0087838 A1 | 4/2007 | Bradbury et al. | |
| 2007/0087839 A1 | 4/2007 | Bradbury et al. | |
| 2007/0088656 A1 | 4/2007 | Jung et al. | |
| 2007/0099685 A1 | 5/2007 | Luchene | |
| 2007/0112624 A1 | 5/2007 | Jung et al. | |
| 2007/0128978 A1 | 6/2007 | Nishino et al. | |
| 2007/0130001 A1 | 6/2007 | Jung et al. | |
| 2007/0226062 A1 | 9/2007 | Hughes et al. | |
| 2008/0009350 A1 | 1/2008 | Ganz | |
| 2008/0009351 A1 | 1/2008 | Ganz | |
| 2008/0026666 A1 | 1/2008 | Ganz | |
| 2008/0109313 A1 | 5/2008 | Ganz | |
| 2008/0134099 A1 | 6/2008 | Ganz | |
| 2008/0163055 A1 | 7/2008 | Ganz | |
| 2008/0221998 A1 | 9/2008 | Mendelsohn et al. | |
| 2009/0029768 A1 | 1/2009 | Ganz | |
| 2009/0029772 A1 | 1/2009 | Ganz | |
| 2009/0053970 A1 | 2/2009 | Borge | |
| 2009/0054155 A1 | 2/2009 | Borge | |
| 2009/0063282 A1 | 3/2009 | Ganz | |
| 2009/0118009 A1 | 5/2009 | Ganz | |
| 2009/0131164 A1 | 5/2009 | Ganz | |
| 2009/0203446 A1 | 8/2009 | Bradbury et al. | |
| 2009/0204420 A1 | 8/2009 | Ganz | |
| 2010/0151940 A1 | 6/2010 | Borge | |

FOREIGN PATENT DOCUMENTS

| | | |
|---|---|---|
| GB | 2365364 | 2/2002 |
| JP | 200057373 A | 2/2000 |
| JP | 2001222585 | 8/2001 |
| JP | 2001222585 A | 8/2001 |
| JP | 2001283024 A | 10/2001 |
| JP | 2001321571 A | 11/2001 |
| JP | 2002063092 | 2/2002 |
| JP | 2002297498 A | 10/2002 |
| JP | 2003016035 A | 1/2003 |
| JP | 2003242058 A | 8/2003 |
| JP | 2003248650 A | 9/2003 |
| KR | 2001073524 A | 8/2000 |
| WO | 99/42917 A2 | 8/1999 |
| WO | 01/69829 A2 | 9/2001 |
| WO | 02/054327 A1 | 7/2002 |
| WO | 02/099581 A2 | 12/2002 |
| WO | 03/034303 A1 | 4/2003 |
| WO | 03026764 A2 | 4/2003 |
| WO | 03034303 A1 | 4/2003 |
| WO | 2005064502 A1 | 7/2005 |
| WO | 2007101785 A1 | 9/2007 |

OTHER PUBLICATIONS

"The Sims Booklet," dated 2000.
"The Sims 10th Anniversary", http://thesims2.ea.com/, dated Feb. 26, 2010.
PC Magazine, "The Sims Online Arrives," dated Dec. 18, 2002.
U.S. Copyright Registrations for The Sims expansion packs.
Prima's Official Strategy Guide—The Sims, dated 2000.
"The Sims", http://en.wikipedia.org/wikil, retrieved Feb. 6, 2010.
Request for Reexamination of U.S. Patent No. 7,618,303—with Exhibits B, C, D, E, M, N, and O.
CNET News, "Who Let the Neopets out?" dated Feb. 26, 2002.
Neopets The Official Magazine, dated Nov. 18, 2003.
Request for Reexamination of U.S. Patent No. 7,604,525—with Exhibits H, I, J, K, L, X, and Y.
Neopian Hospital, retrieved Mar. 24, 2010.
Pojo's Unofficial Guide to Neopets, 2003.
Neopets—Archeology, retrieved Mar. 25, 2010.
Nothing but Neopets, "Neopian History.", retrieved Mar. 24, 2010.
The Neopian Times, Week 32, retrieved Mar. 25, 2010.
The Neopian Times, Week 42, retrieved Mar. 25, 2010.
The Helpful Neopian, retrieved Mar. 25, 2010.
Request for Reexamination of U.S. Patent No. 7,568,964—with Exhibits B, C, N, 0, R, S.
Nothing but Neopets, "Dec. 2002".
The Sims: News, "Details about Makin Magic," Jul. 11, 2003.
U.S. Appl. No. 12/707,055, filed Feb. 17, 2010.
Monopets, "The Gurgle," plush toy, undated, (photographs taken Aug. 2007).
3rd Party Comments re: Response to Office action for Inter Partes Reexamination of U.S. Patent No. 7604525, dated Nov. 2, 2010.
Action Closing Prosecution for Inter Partes Reexamination of U.S. Patent No. 7604525, dated Feb. 25, 2011.
Action Closing Prosecution of Inter Partes Reexamination of U.S. Patent No. 7,568,964—dated Sep. 8, 2010.
Action Closing Prosecution of Inter Partes Reexamination of U.S. Patent No. 7,677,948—dated Sep. 14, 2010.
Amendment and Response to Office action for Inter Partes Reexamination of U.S. Patent No. 7604525, dated Oct. 19, 2010.
Decision Vacating Inter Partes Reexamination of U.S. Patent No. 7618303, dated Jun. 30, 2010.
Intl Search Repory—PCT-CA2009-000271, dated Sep. 7, 2010.
Japanese Patent Office, Decision of Refusal, JP App No. 2006-545875, Dated Feb. 18, 2009.
M2 Presswire, "UltraCorps—second premium title for the Internet Gaming Zone Oblivion," May 1998.
Notice of Appeal in Inter Partes Reexamination of of U.S. Patent No. 7,568,964 dated Feb. 10, 2011.
Notice of Appeal in Inter Partes Reexamination of of U.S. Patent No. 7,677,948 dated Feb. 17, 2011.
Notice of Termination of Inter Partes Reexamination of U.S. Patent No. 7618303, dated Sep. 30, 2010.
Office action for Inter Partes Reexamination of U.S. Patent No. 7,604,525—dated Aug. 19, 2010.
Office action for Inter Partes Reexamination of U.S. Patent No. 7,618,303—dated Dec. 17, 2010.
Order Denying Ex Partes Reexamination of U.S. Patent No. 7,568,964 dated Dec. 10, 2010.
Order Granting Request for Inter Partes Reexamination of U.S. Patent No. 7,568,964, dated Jul. 10, 2010.
Order Granting Request for Inter Partes Reexamination of U.S. Patent No. 7,604,525, dated Jul. 9, 2010.
Order Granting Request for Inter Partes Reexamination of U.S. Patent No. 7,618,303, dated Nov. 8, 2010.
Order Granting Request for Inter Partes Reexamination of U.S. Patent No. 7,677,948, dated Jul. 9, 2010.
Petition to Review Denial for Ex Partes Reexamination of U.S. Patent No. 7,568,964 dated Jan. 6, 2011.
Request for ExParte Reexamination of U.S. Patent No. 7,568,964—no exhibits, dated Nov. 1, 2010.
Right of Appeal notice for Inter Partes Reexamination of U.S. Patent No. 7,568,964 dated Jan. 15, 2011.
Right of Appeal notice for Inter Partes Reexamination of U.S. Patent No. 7,677,948 dated Jan. 18, 2011.
Search Report—CA2665737—, dated Oct. 26, 2010.
Second Request for Reexamination of U.S. Patent No. 7,618,303—with Exhibits B, C, D, E, F, L, M, dated Aug. 24, 2010.
Telecomworldwire, "Product Sidewire," Oct. 1995.
USPTO Communication Form for Ex Partes Reexamination of U.S. Patent No. 7,568,964 dated Nov. 12, 2010.
Search Report—AU-2009202828, dated Jan. 13, 2011.
Search Report—AU-2009202829, dated Jan. 4, 2011.
Search Report—AU-2009202831, dated Jan. 12, 2011.
Search Report dated Mar. 20, 2008 for Application No. PCT/CA2007/002198, filed Dec. 6, 2007.
Search Report dated Mar. 19, 2008 for Application No. 07254720.1-1238, filed Dec. 6, 2007.
Search Report dated Apr. 15, 2008 for Application No. GB0723897.5 filed Dec. 6, 2007.
Search Report dated May 11, 2009 for Application No. GB0723897.5, filed Dec. 6, 2007.
Search Report—CA2696620—Mar. 1, 2011.
Appeal—ThirdParty—Filed for Inter Partes Reexamination of U.S. Patent No. 7,677,948, dated Apr. 13, 2011, no exhibits.
Appeal—ThirdParty—Filed for Inter Partes Reexamination of U.S. Patent No. 7,568,964, dated Apr. 7, 2011, no exhibits.
Response to Inter Partes Action Closing Prosecution for U.S. 7,604,525, dated Mar. 24, 2011.
Certificate of service for Response in U.S. 7,604,525, dated Mar. 24, 2011.
Transmittal letter for Response in U.S. 7,604,525, dated Mar. 24, 2011.
3rdParty Comments on Response for U.S. 7,604,525, dated Apr. 22, 2011.
Exhibit A from Response for U.S. 7,604,525, dated Mar. 24, 2011.
Petition for the Director to Review the Denial of Reexamination Request U.S. Appl. No. 90/011,310, dated Jan. 6, 2011.
Status Inquiry on Petition for the Director to Review the Denial of Reexamination Request U.S. Appl. No. 90/011,310, dated Jan. 13, 2012.
Denial of Petition for the Director to Review the Denial of Reexamination Request U.S. Appl. No. 90/011,310, dated Jan. 26, 2012.
Rebuttal Brief of Patent Owner of Reexamination Request U.S. Appl. No. 95/001,343, dated May 25, 2012.
Decision on Appeal of Reexamination Request U.S. Appl. No. 95/001,345, dated Jun. 12, 2012.
Extension of Time Petition of Reexamination Request U.S. Appl. No. 95/001,345, dated Jul. 2, 2012.
Decision on Petition of Reexamination Request U.S. Appl. No. 95/001,345, dated Jul. 12, 2012.
Request to Reopen Prosecution of Reexamination Request U.S. Appl. No. 95/001,345, dated Jul. 12, 2012.
Third Party Requestor's Reply to Request of Reexamination Request U.S. Appl. No. 95/001,345, dated Aug. 9, 2012.
Examiner's Answer of Reexamination Request U.S. Appl. No. 95/001,422, dated Aug. 15, 2012.
Examiner's Answer of Reexamination Request U.S. Appl. No. 95/001,341, dated Apr. 12, 2012.
Rebuttal Brief of 3rd Party Requestor of Reexamination Request U.S. Appl. No. 95/001,341, dated May 10, 2012.
Appellant's Brief of Reexamination Request U.S. Appl. No. 95/001,343, dated Feb. 14, 2012.
Respondent's Brief of Reexamination Request U.S. Appl. No. 95/001,343, dated Mar. 8, 2012.
Examiner's Answer of Reexamination Request U.S. Appl. No. 95/001,343, dated Apr. 25, 2012.
Rebuttal Brief of 3rd Party Requestor of Reexamination Request U.S. Appl. No. 95/001,345, dated Dec. 14, 2011.
BPAI Docketing Notice of Reexamination Request U.S. Appl. No. 95/001,345, dated Apr. 9, 2012.
Rebuttal Brief Entry of Reexamination Request U.S. Appl. No. 95/001,345, dated Mar. 27, 2012.
Right of Appeal Notice of Reexamination Request U.S. Appl. No. 95/001,422, dated Apr. 2, 2012.

Notice of Appeal by 3rd Party Requestor of Reexamination Request U.S. Appl. No. 95/001,422, dated Apr. 17, 2012.
Right of Appeal notice for Inter Partes Reexamination of U.S. Patent No. 7,604,525 dated Nov. 14, 2011.
Examiners Answer for Inter Partes Reexamination of U.S. Patent No. 7,568,964 dated Nov. 15, 2011.
Action Closing Prosecution for Inter Partes Reexamination of U.S. Patent No. 7,618,303 dated Nov. 14, 2011.
Reexamination Request U.S. Appl. No. 95/001,343—NTC of Intent to Issue Reexam Certificate Feb. 27, 2013.
Reexamination Request U.S. Appl. No. 95/001,422—Board Decision Feb. 13, 2013.
Reexamination Request U.S. Appl. No. 95/001,422—Patent Owner's Response After Closing Prosecution. Cert of Service Mar. 13, 2013.
Reexamination Request U.S. Appl. No. 95/001,345—Order Remanding Inter Partes Reexamination to the Examiner Mar. 19, 2013.
Decision on Appeal of Reexamination Request U.S. Appl. No. 95/001,341, dated Oct. 30, 2012.
Request to Reopen Prosecution of Reexamination Request U.S. Appl. No. 95/001,341, dated Nov. 30, 2012.
Decision on Appeal of Reexamination U.S. Appl. No. 95/001,343, dated Oct. 30, 2012.
Order Denying Request Reopen of Reexamination Request U.S. Appl. No. 95/001,345, dated Nov. 7, 2012.
Renewed Request Reopen of Reexamination Request U.S. Appl. No. 95/001,345, dated Nov. 21, 2012.
Rebuttal Brief of 3rd Party of Reexamination Request U.S. Appl. No. 95/001,422, dated Sep. 13, 2012.
Rebuttal Brief Entered of Reexamination Request U.S. Appl. No. 95/001,422, dated Nov. 15, 2012.
Appeal Docketing Notice of Reexamination Request U.S. Appl. No. 95/001,422, dated Nov. 26, 2012.
Inter Parties Reexamination Certificate for 95/001,343 Issued Apr. 24, 2013.
Examiner's Determination for 95/001,345 Issued May 11, 2013.
Reexamination Request No. 95/001,422—Final Board Decision Issued Jun. 4, 2013.

* cited by examiner

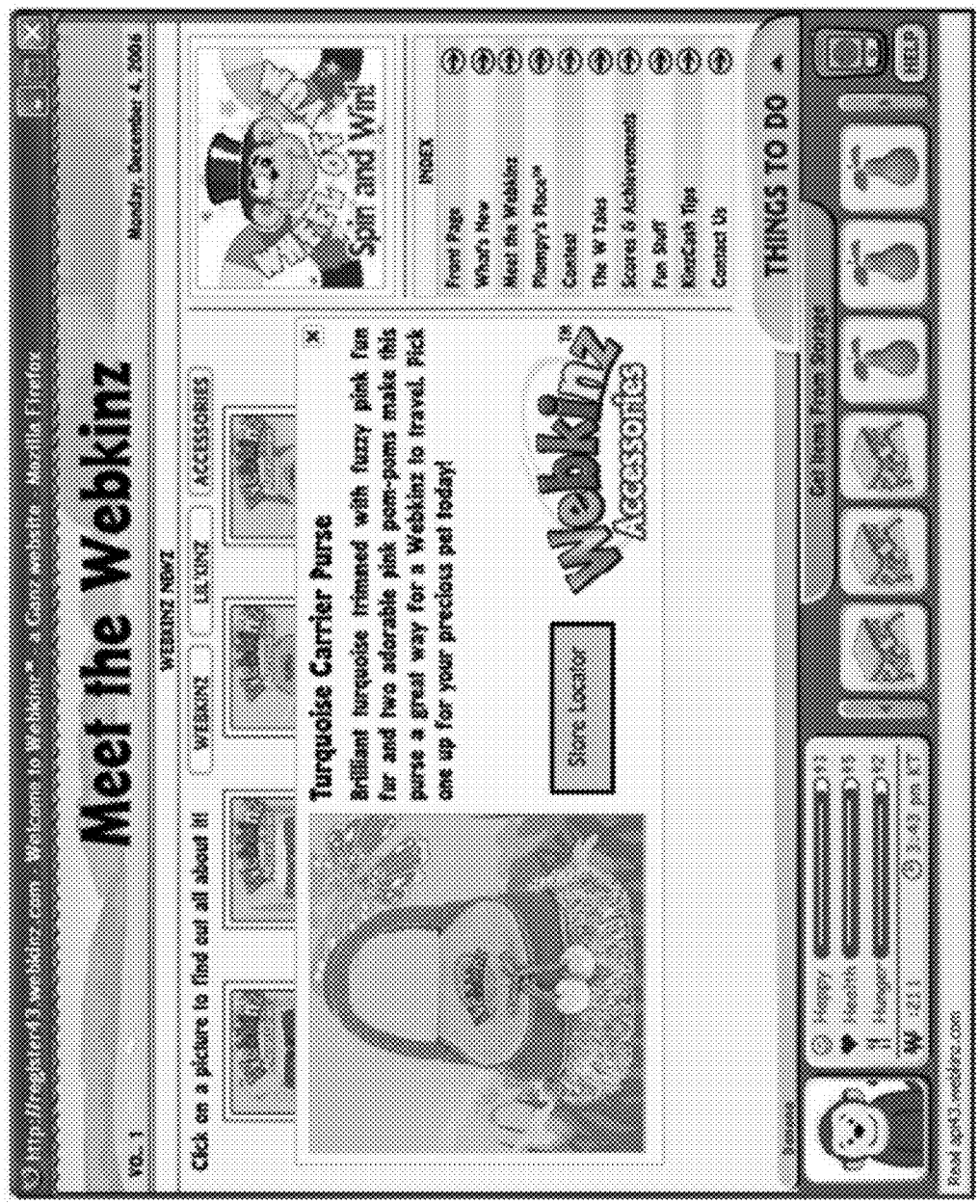

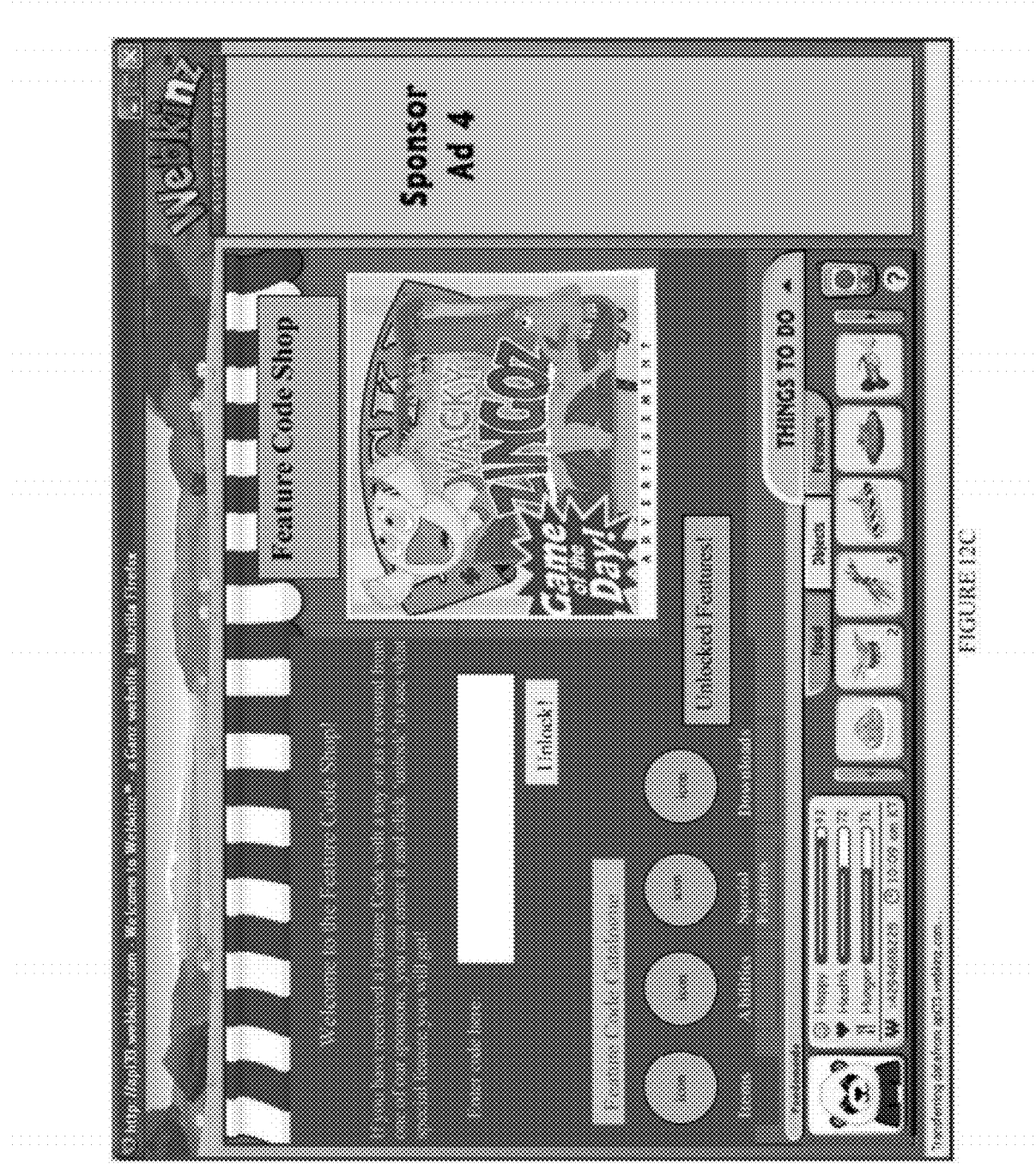

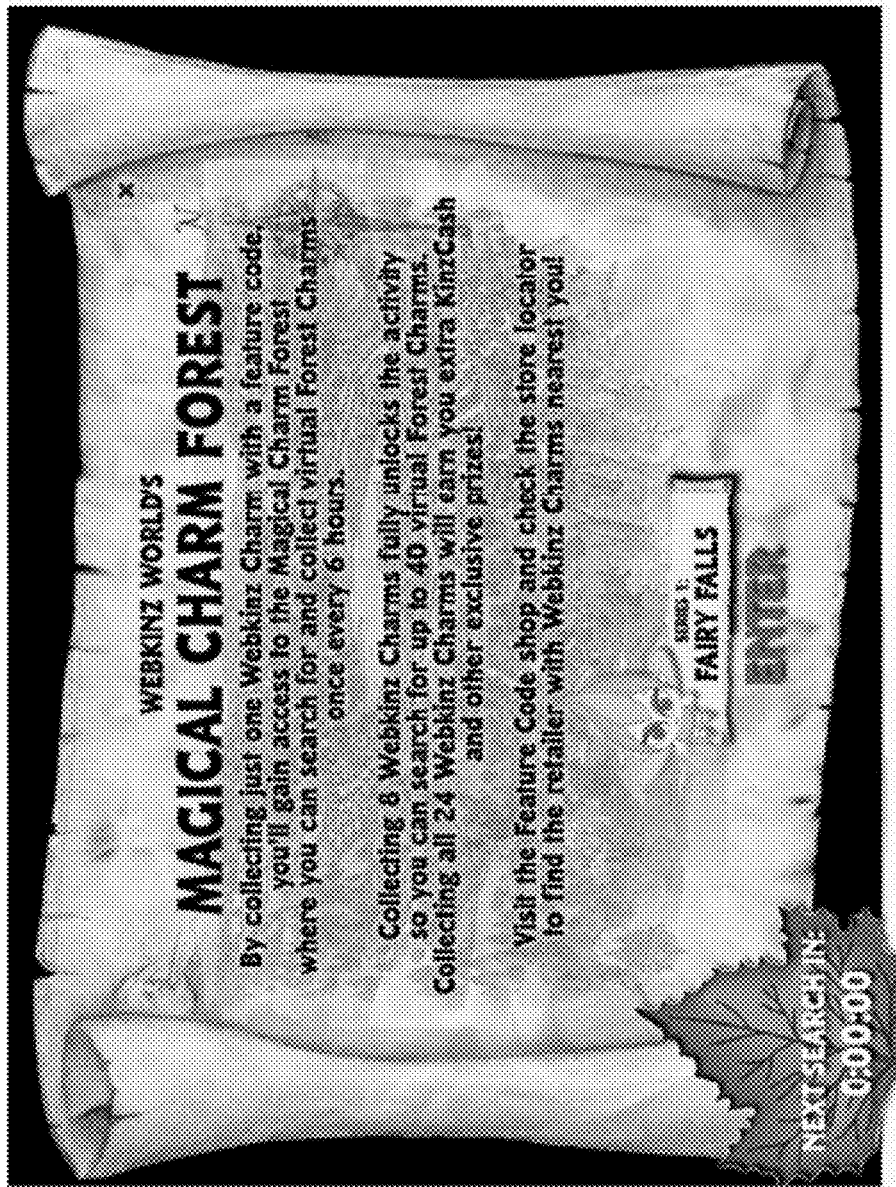

FEATURE CODES AND BONUSES IN VIRTUAL WORLDS

CROSS-REFERENCES TO RELATED APPLICATIONS

This application claims the benefit of provisional application Ser. No. 60/868,793 filed on Dec. 6, 2006, incorporated herein by reference, and provisional application Ser. No. 60/946,829, filed on Jun. 28, 2007, incorporated herein by reference.

This application is a continuation of U.S. patent application Ser. No. 11/951,007, filed on Dec. 5, 2007 which claims the benefit of U.S. Provisional Application Nos. 60/946,829, filed on Jun. 28, 2007 and 60/868,793, filed on Dec. 8, 2006.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by the law, but otherwise reserves all copyright rights whatsoever.

FIELD OF THE INVENTION

This application relates generally to a system and method for product sales and marketing including a continued online relationship of the manufacturer/producer with the user of the product even after the product has been sold, including encouraging the purchase of ancillary products.

More specifically, this application relates to an Entertainment System including a website, in combination with a commercially purchased toy, wherein the system allows a toy user to register the toy online using a registration code, allowing the user access to various activities and scenarios in a "virtual world" including a virtual representation of the toy, via a computer connected to the Internet. Additional ancillary products are also provided that are related to the real toy or the virtual world, with these products also being provided with one or more codes to provide additional content and bonus access in the virtual world.

BACKGROUND OF THE INVENTION

A consumer who purchases a product typically does not have any continued interaction with the product manufacturer or supplier. For example, a consumer purchases a toy (e.g., a stuffed plush animal or other creature, etc.) as a gift for a child, for example, and that child then uses the toy for imaginative activities. However, the toy manufacturer relationship with the toy does not typically continue until the next toy is purchased.

SUMMARY OF THE INVENTION

Provided are a plurality of embodiments the invention, including, but not limited to, a method for providing a virtual world presentation to a user for user entertainment, said method comprising the steps of:
  registering a first product on a website;
  responsive to registering the first product, displaying a virtual replica of the first product on said website, said virtual replica of the first product being associated with a user ID;
  registering a second product on said website, wherein said second product is an accessory to said first product;
  responsive to registering the second product, displaying a virtual replica of the second product on said website, said virtual replica of the second product also being associated with said user ID, wherein said virtual replica of the first product interacts with said virtual replica of the second product on said website.

Also provided is a method for providing a virtual world presentation to a user for user entertainment, said method comprising the steps of:
  registering a first product on a website, wherein the first product belongs to a first class of products (such as the class of plush animals, for example);
  responsive to registering the first product, displaying a virtual replica of the first product on said website, said virtual replica of the first product being associated with a user ID;
  registering a second product on said website, wherein the second product belongs to a second class of products different than the first class of products (such as a class of clothing, for example); and
  responsive to registering the second product, displaying a virtual item on said website, said virtual item also being associated with the user ID.

Further provided is method for providing a virtual world presentation to a user for user entertainment, said method comprising the steps of:
  registering the user on a website using a user ID;
  registering a code provided with a first product on the website;
  responsive to registering the first product, performing one or both of the steps of:
    displaying a virtual representation of the first product on said website, said virtual representation of the first product being associated with said user ID, and
    granting access to a first subset of restricted content on said website, said first subset of restricted content providing an activity for the user;
  after said registering of the user and the code, registering a second product on said website, wherein said second product is associated with said user ID;
  responsive to registering the second product, providing access to additional restricted content on the website, and also providing a bonus feature associated with said first product that was not available prior to said registering of the second product and that would not have been available without said registering of the first product and wherein said bonus feature is other than the second product itself.

Also provided is a method comprising: distributing a first product with a code that allows access only to a first portion of a website; and distributing a second product, that is an accessory for said first product, and which has a code that allows access to a second portion of said website, wherein said second portion has a them that is based on said accessory.

Further provided is a system for implementing one or more of the methods described herein.

Also provided are additional embodiments of the invention, some, but not all of which, are described hereinbelow in more detail.

BRIEF DESCRIPTION OF THE DRAWINGS

The features and advantages of the examples of the present invention described herein will become apparent to those skilled in the art to which the present invention relates upon reading the following description, with reference to the accompanying drawings, in which:

FIG. 8B shows an example screen shot of a informational news page that describes a product and provides a link to a store locator to find a retailer selling the product.

FIGS. 9A and 9C are sketches of a body spritz ancillary product in its packaging, and FIG. 9B shows the spritz with a feature code printed on an included tag;

FIG. 12C shows a screen shot of an example page of a Feature Code Shop where feature codes can be entered to unlock bonus features;

FIG. 12E a screen shot of an example shopping page that could be utilized for offering for sale various peripheral products directly on the entertainment site;

FIG. 13B shows a screen shot of an example splash page showing a top-over map view of the entire Magical Charms Forest with a link to enter the forest;

DETAILED DESCRIPTION OF THE EXAMPLE EMBODIMENTS

Figure 1:
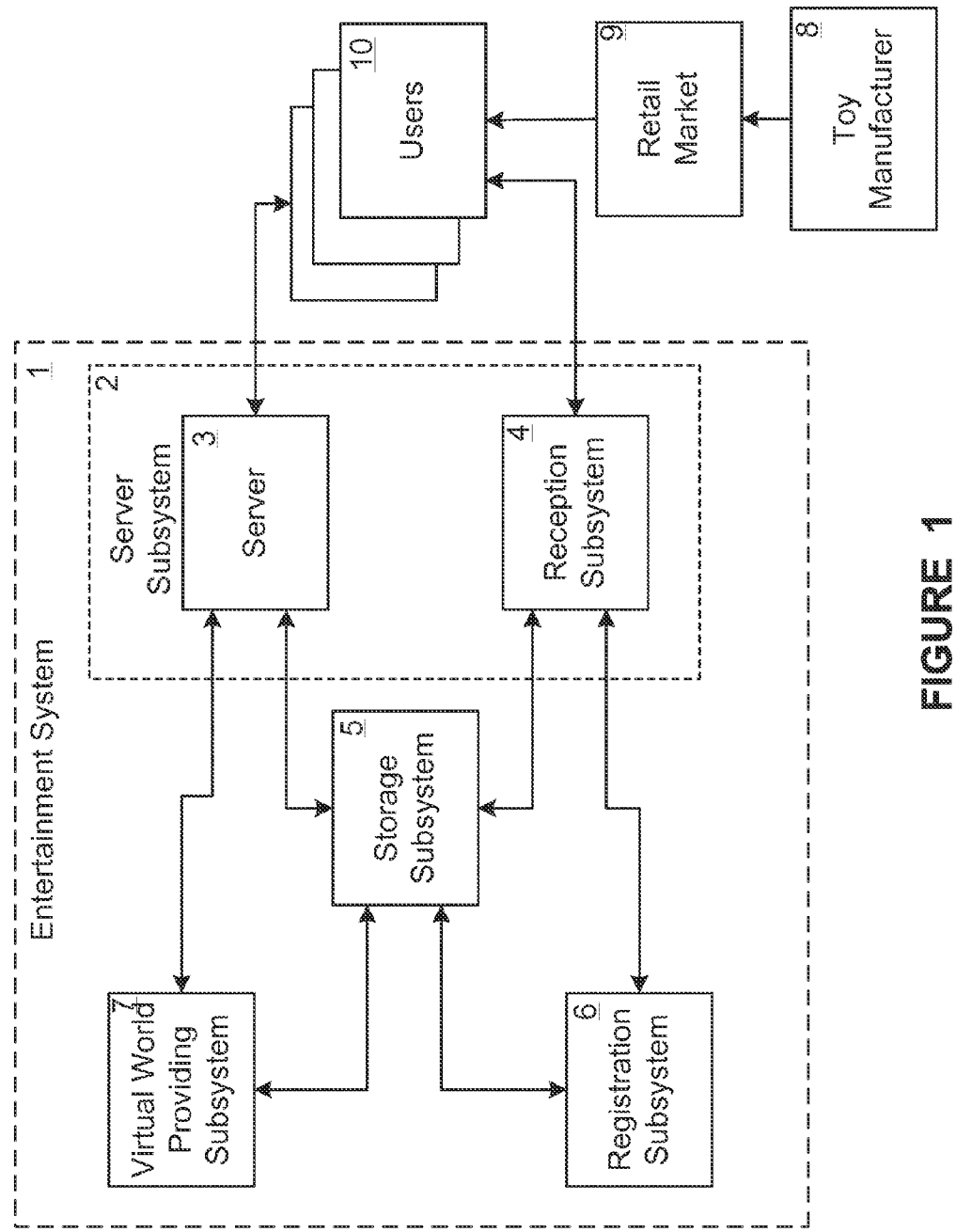
FIG. 1 shows a schematic block diagram of a first example embodiment of the system and its interactions with some external entities.

This lack of continuity represents a lost opportunity to take advantage of the fact that the child or other toy owner likely wants to create a whole imaginative world for the toy for play purposes. A means of creating a such an imaginative world using modern computer tools, such as a personal computer connected to the internet, wherein the toy can be utilized in a computer generated "virtual world" for various games and activities, given a name and a history, and taken care of, would allow the owner a more varied and interactive means of playing with the toy.

Further, such a virtual world could be used to maintain the relationship between the toy owner and the toy manufacturer (or, alternatively a retailer or service provider), allowing new toys, accessories, and services of the manufacturer, retailer, or other provider to be offered to the toy owner, thereby increasing the potential market for the manufacturer and increasing the usage of the toy by the user. Such a virtual world could also provide many educational and gaming scenarios that would engage a child or adult with many hours of play.

Furthermore, such a virtual world could increase the attachment that the toy owner feels for the toy, and thus increase the likelihood that additional toy or accessory purchases would occur, and also increasing the satisfaction the owner feels with the toy, thus extending the relationship between the toy manufacture and the toy owner.

In addition, such a virtual world could be utilized to encourage the purchase of ancillary products, such as accessory items for the toy. The purchase of such accessory items could also be linked to the virtual world to even further increase the attachment that the toy owner feels to the toy with the accessories.

Even further, additional products could be marketed to the toy owner that might be more remotely related to the toy, such as personal care products, school products, games, and many other types of products.

Additionally, by engaging the toy owner in the virtual world, advertising and other marketing advantages would likely occur because of the additional satisfaction that the toy, its accessory products, and other products would provide, hence leading to potential word-of-mouth and other means of marketing the toy and the website.

Finally, a similar approach could be applied to products other than toys, such as collectibles, trading materials, etc.

Accordingly, a system for creating such a virtual world to take advantage of such marketing potential might provide some or all of the listed benefits and even additional benefits.

Provided is an entertainment system including an online "virtual world" where the user of a product can register the product using a unique registration code provided with the product at purchase, where the registration code is typically hidden from view until after purchase or use of the product, or provided after or during purchase. The registration ensures that a valid purchase has occurred. This registration code provides access to certain online content that would not be otherwise available to the user without the code. An example of such a system is disclosed in application Ser. No. 11/027,880, filed on Dec. 30, 2004, and incorporated herein by reference.

Also provided is a system where ancillary items, such as accessory items or items of personal interest to a purchaser related (or not) to the product are also provided, where each one of such items is also provided with one or more special codes that are typically hidden from view prior to purchase and/or use, where these special codes provide additional online content that would not be otherwise available to the user without the code(s). Such codes might be registration codes that are used to register the product, and/or they might be feature codes that provide bonus features to the user in the virtual world.

In the example embodiments discussed in the above cited reference, provided is an Entertainment System including an online "virtual world" where the user of a toy can register the toy using a unique registration number provided with the toy at purchase, adopt the toy online, receive and play with a virtual representation of the toy (the "virtual toy) in the virtual world. In some embodiments, the "virtual world" can be implemented using an interactive website via a user computer connected to the Internet. In this manner, a user can play with the virtual toy in a computer generated fantasy world (i.e., the virtual world).

The term "toy" could be any type of toy (for example, those used by a child), including, for example, plush toys (including but not limited to stuffed animals, fantasy figures, dinosaurs, vehicles, dolls, etc.), along with other types of toys (including, but not limited to, vehicles such as cars and trucks; action figures such as army figures, monsters, sports figures, fantasy figures, dinosaurs; and dolls, etc.). Additional products could also be utilized in a similar manner, such as collectibles (including figurines, for example), trading cards, jewelry, personal products, etc.

Accessory items to the toy that are in a different class of products than the toy can be provided. For example, if the toy is a plush animal, accessory items such as clothing, trading cards, and charms, for example, each of which is a different class of product, can also be provided for sale, where these items also come with their own respective registration code that provides additional content in the virtual world after the registration codes are entered by the user. For example, an accessory item could be clothing that can be worn by the real world version of the toy. This clothing may come with a registration code that, when entered by the user, provides a piece of virtual clothing for the virtual toy that looks similar to the real clothing provided for the real toy. Similarly, charms that can be worn by the real toy may also come with a similar registration code that, when entered by the user, provides a similar virtual charm that can be worn by the virtual toy or worn by an image of the virtual toy.

Some items that may not be accessories to the toy (but might encompass similar themes) might be sold with a hidden registration code that provides a virtual item that is similar to the purchased item and that might be put to a similar use. For example, trading cards, which could be used in a game, might be sold with a registration code that, when entered by the user, provides virtual trading cards that may be used for one or more games played in the virtual world (i.e., online). The virtual trading cards might be similar to, or different than, the real trading cards. Furthermore, the trading cards may have images of various types of the toy. For example, various images of plush animals that are sold could be provided on the cards.

Graphics, animation, sound, and recorded images might be utilized to generate the virtual world and virtual toy. Even live images might be utilized, if desired. In addition, other sources of material can also be employed. In essence, the virtual world creates an interactive playland for the toy owner to encourage imagination using the toy, and at the same time, provide an incentive to purchase additional toys or encourage additional individuals to also purchase toys in order to participate in the Entertainment System.

Throughout this disclosure, the term "virtual" is used, for example, to describe the user viewable/hearable material presented to the user on the user computer from data and/or computer programs and commands generated and/or provided by the Entertainment System, to the user computer running one or more computer applications (e.g., a web browser with the appropriate plug-ins, applets, and/or other support programs, etc.). The System provides the data and/or programs, via a communication network connected to the System and the user computer (e.g., the Internet).

The term "virtual" does not necessarily mean that the displayed item is not "real", because the displayed item could, for example, be a video or picture of a real item, for example. Furthermore, the "virtual world" is presented using "real" physical phenomena (e.g., light and sound), and is impacted by "real" user interactions (e.g., mouse and keyboard manipulations). Rather, the term "virtual" is used to describe the computer generated and/or provided presentation to the user, including both visual and audible effects, via the user computer. It is a "virtual world" in the sense that it is primarily a computer presented fantasy world with which the user can interact via manipulations of the user computer. In this manner, the "virtual" items of the virtual world can be presented as interacting with each other and with the user. Furthermore, the user is provided access to games and trivia as well.

Example Virtual World

In a first example embodiment of a virtual world, disclosed in application Ser. No. 11/027,880, the user buys a toy (such as a plush animal), registers the toy in a website at an URL listed on the toy or toy packaging, or a tag on the toy. Various classes of toy may be utilized. For example, the class of toy may be a plush animal, which could have a number of different types of members (lions, bears, dogs, cats, fish, etc.). Other possible classes of toys include soldier figures, vehicles, dolls, etc. Additional classes include accessories to the toys that are used with the toys (e.g., weapons for the soldiers, clothing for dolls, etc.), or even classes of less related peripheral items, such as clothing for the user, toiletries, etc. Thus, various classes of products can be accommodated and utilized for the methods disclosed herein and obvious modifications thereof.

The System serves pages of a website that provides the virtual world to the user using various web pages, flash images, video, etc.; providing a biography of the toy, a virtual representation of the toy (a virtual toy) using graphics and/or sound (such as an animated image, for example) to participate in games and activities. The system also provides a virtual means for maintaining the virtual "health and well-being" of the character through various maintenance activities, such as virtual feeding and playing, virtual shopping, and virtual medical checkups, for example.

Furthermore, in these example embodiments, the Entertainment System can be utilized for marketing additional toys and/or accessories and/or services related to the toy, to allow restricted access to additional online activities and features to those who purchase the toys.

The Entertainment System of the example embodiments may provide some general services and features open to the public, such as information about the toys and where to purchase them, a description of the features of the website, and other similar information. The website might also offer tiered access depending on whether the user has entered a registration code, or has purchased any virtual characters (that are not representing a corresponding purchased toy, for example). However, a primary purpose of the System in the first example embodiment is to encourage the public to purchase a toy at a retail establishment to obtain a registration code for access to the primary features and services. Accordingly, many of the primary features of the System are restricted to registered users to encourage toy purchase. The existence of the System may encourage initial sales of the toy by new users (such as via word-of-mouth from current users), and the System will also encourage the purchase of additional toys by current users.

Online sales may be supported and encouraged in an alternate embodiment to gain additional revenue, but in the first example embodiment the invention is primarily intended to be utilized to sell toys in retail establishments. Thus, the invention becomes a marketing tool, utilizing word-of-mouth and the desire to increase participation in the virtual world, and thusly makes the toys more attractive to retail merchants and increases their sales.

In essence, the present invention in this first example embodiment provides an Entertainment System including an online virtual world with a virtual toy representing a toy purchased at a retail store. The toys might be plush toy animals, for example. However, there is no limit to the type of toy that the system could support, as long as the toy can be represented by a virtual replica.

The current system functions basically as follows: A consumer purchases a toy (such as the plush toy animal representing a particular animal, for example, or some other toy). The toy includes, for example, a tag attached to the toy body, or the toy packaging, (or alternatively, another indicator and/or a storage device) indicating a web site address and a registration code. The code is typically hidden from view until after the purchase has occurred to prevent unauthorized use of the code. For example, the code might be on the inside of a folded piece of paper that is sealed prior to purchase. The user can load the System web site using the web address in a browser application running on the user's computer, and then enter the registration code to register the toy, thereby obtaining access to restricted portions of the System website.

In an alternative embodiment, the code can be automatically entered via the storage device, for example, for automatically loading, and/or downloading, and/or registering the user with the System.

Registration allows the user to participate in a virtual adoption process utilizing a virtual online replica of the toy (the "virtual toy") to provide an analogous online representation of the toy. The virtual toy would preferably look somewhat like the real toy (e.g., same type of animal, similar shapes, color patterns, etc.), but could be more "cartoonized", for example, and can be animated (automatically, and/or by user control), which may or may not be the case for the real toy.

The registered user can then participate in various activities both for enjoyment, and to virtually "maintain" the virtual toy in a happy, healthy, contented state.

The System of the first example embodiment utilizes a server subsystem including a web server subsystem for generating both dynamic and static web pages as is known in the art, and for receiving data and/or commands from the user computer. One or more databases support the functioning of this server subsystem. The web server utilizes various scripting or other executable programs for providing dynamic content to the user's computer, which is attached to the web server via some computer network, such as the Internet, for example. The web server can also utilize various animated motion programs, such as a Flash program, Java scripts, etc., to provide dynamic content to the user.

FIG. 1 shows a top-level block diagram of the Entertainment System 1, interacting with various users 10. The users 10 should have previously purchased and registered one or more toys from a Retail Merchant 9, who obtained the toys from a manufacturer 8, or via a distributor.

If the user has not yet purchased a toy, the user can still access the System 1 to obtain information about the System and/or the toys, but will not, in the first example embodiment, have access to much of the site until a toy is purchased and registered.

The Entertainment System 1 is comprised of a server subsystem 2 for interacting with the users 10 via a user computer being operated by the user. The server subsystem can utilize a server 3, for serving content, including web pages, data, commands, and/or programs, for example, to the user computer. In addition, the server subsystem can include a reception subsystem 4, for receiving information and commands from the users 10. Alternatively, the server 3 and reception subsystem 4 might be combined into a single computer application, such as a commercially available web server, for example, running on one or more computers. The current system will utilize commercially available applications to implement much of the server subsystem.

The Entertainment System 1 also comprises a Storage Subsystem 5, for storing system data, user IDs and passwords, toy registration codes, personalized user information, etc. utilized by the various subsystems. The Storage Subsystem 5 of the current system will utilize a commercially available database application running on commercially available hardware, for example.

A Registration Subsystem 6 is used for registering the user and the user's toy into the system, so that the user has access to restricted portions of the system. The Registration Subsystem 6 may utilize its own dedicated application and hardware, or could be combined with or share the Server Subsystem 2 applications and/or hardware. The registration subsystem examines the registration code against stored data relating to a plurality of registration codes each representing a toy for sale.

A Virtual World Providing Subsystem 7 generates and/or provides the virtual world data to be served by the server 3 to the users 10 for use in displaying a virtual world on the users' computers. Portions of this data may be generated on the fly in response to user interactions, and portions are likely to be obtained and/or derived from data stored in the Storage Subsystem 5. (For example, in the first example embodiment, items owned by the user [the items in the dock for example], the virtual room state [virtual furniture in the room for example], virtual cash, health, happiness, hunger parameters are all examples of "stored data", whereas data generated on the fly include position in the room [which also gets stored], and Arcade Game scores, all of which are described in more detail below).

Again, the Subsystem 7 may utilize unique applications and/or hardware, or may be combined with one or more of the Registration Subsystem 6 and/or the Server Subsystem 2 applications and hardware.

Figure 2:
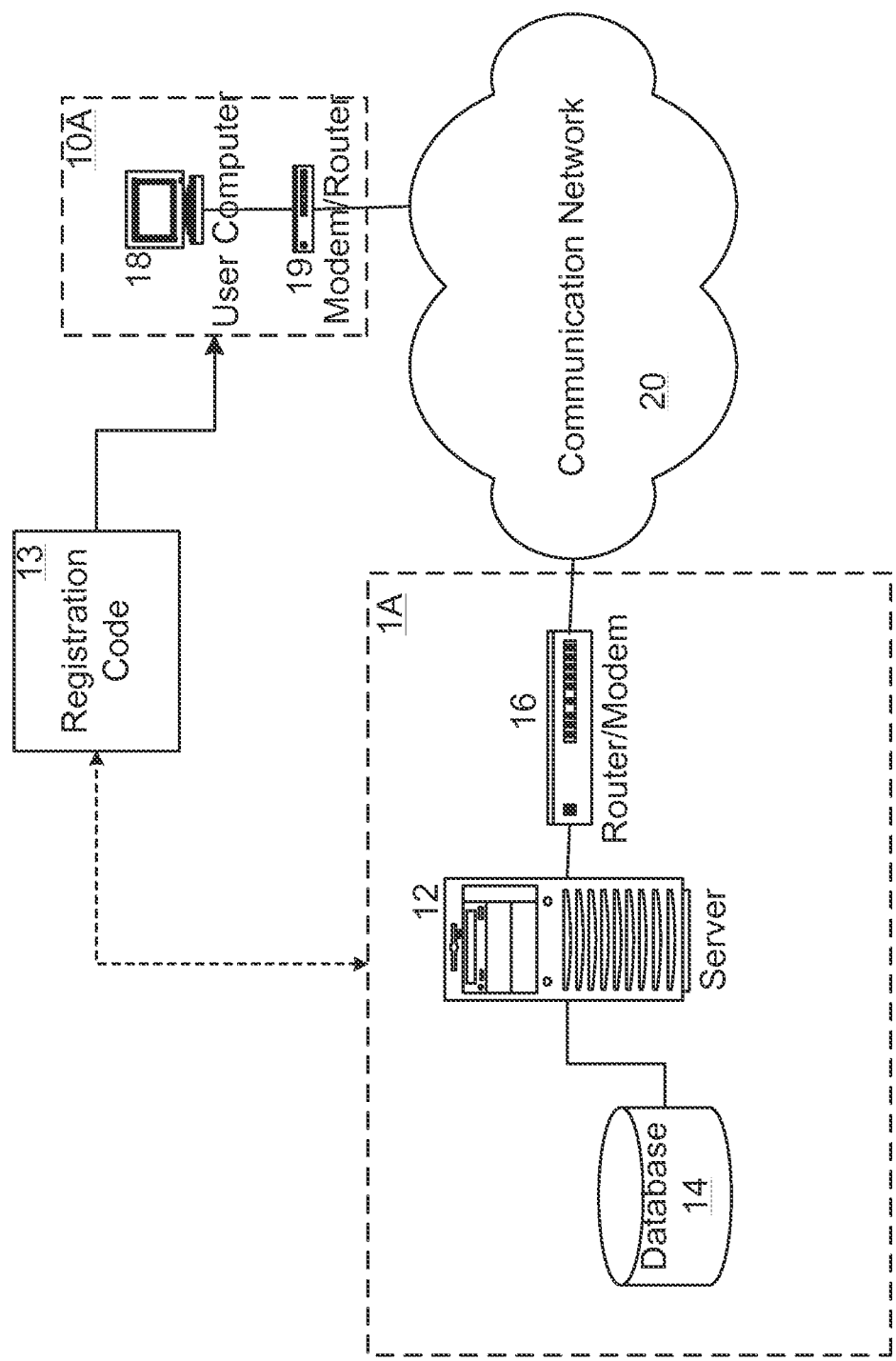
FIG. 2 shows a schematic diagram of a possible hardware implementation of an embodiment of the invention.

FIG. 2 shows an example implementation 1A of the Entertainment System 1, in one of its simplest forms. The system 1A comprises a server 12, a database 14, and a router/modem 16 to connect to a public communications network 20. A user 10A, utilizing a workstation 18, is also connected to the communications network via a router and/or modem 19, for example. In this implementation, the server 12, along with the database 14 and router/modem 16 and the appropriate software, implement all of the subsystem functions of the System 1 shown in FIG. 1 by executing various application programs on the server 12 hardware, for example. Of course, the system 1A may also support many additional users in a manner similar to that shown for user 10A, for example.

These example embodiments can utilize the Internet as the public communications network. However, other communications networks could be utilized, such as telephone networks, cellular networks, dedicated networks, cable TV networks, power lines, etc. Furthermore, combinations of these networks can be used for various functions. However, because of the ubiquitous nature of the Internet, a solution utilizing that diverse network (which can utilize many individual communications networks) is utilized in the first example embodiment.

Furthermore, the System 1 might also utilize a private communication network for at least part of the system. For example, the Registration Subsystem 6 of FIG. 1 might be connected to a private computer network located at the Retail Merchant 9, where the user might register the toy, for example, as discussed in more detail below. Alternatively, the toy might automatically be registered at the time of purchase (e.g., by scanning a code at the register, for example), and thus not require any user interaction at all beyond purchasing the toy. Or the user might send in a registration card to implement registration, as another example.

Figure 3:
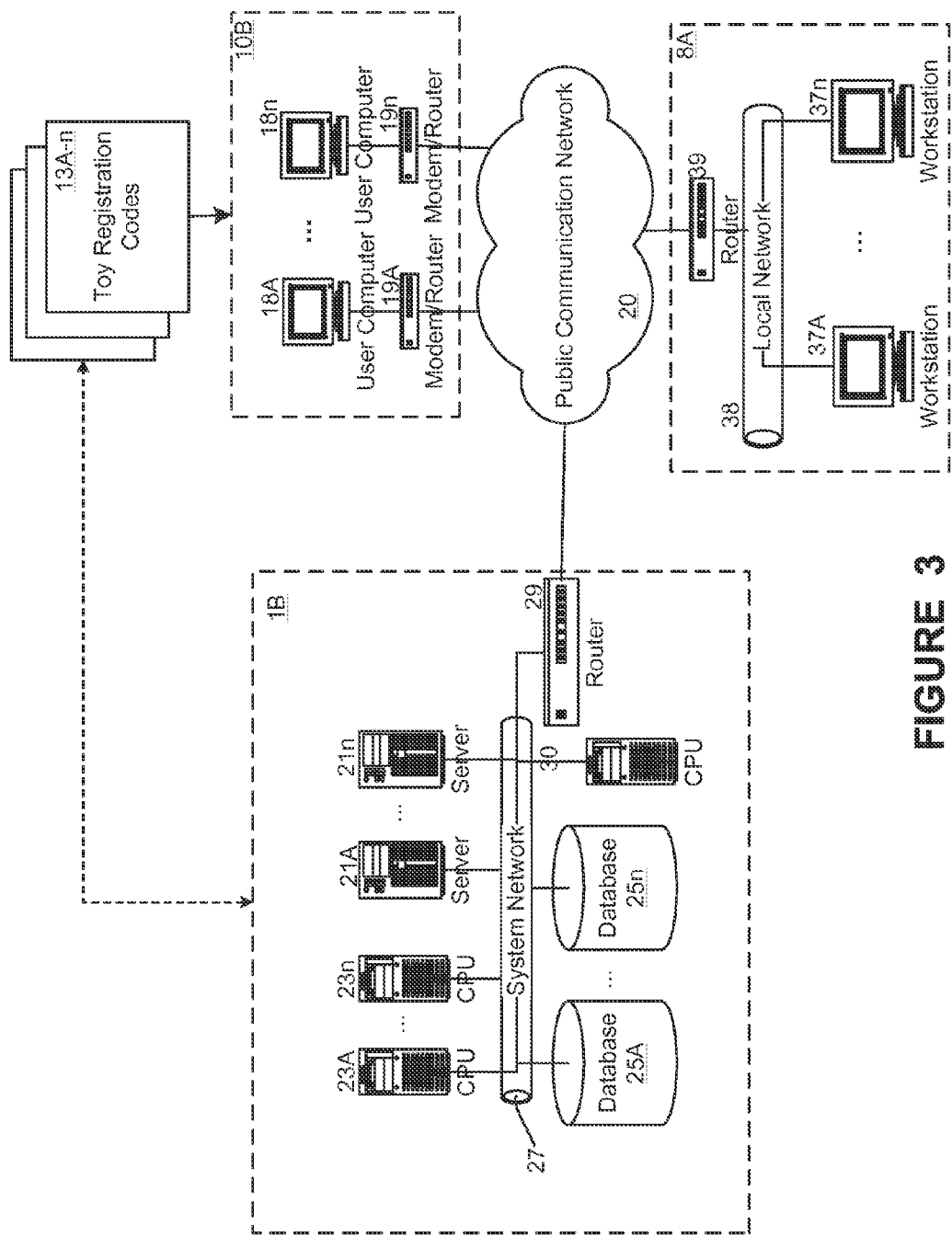
FIG. 3 shows a schematic diagram of a more complex hardware implementation of another embodiment of the invention.

FIG. 3 shows a more complex implementation 1B of the System 1. In this example system 1B, a plurality of servers 21A-21n can be utilized to implement the server subsystem 2 functions of FIG. 1. Furthermore, a plurality of CPUs 23A-23n can be utilized to implement the Virtual World Providing Subsystem 7 functions of FIG. 1. A plurality of database storage devices 25A-25n may be used to implement the Storage Subsystem 5 functions of FIG. 1. A CPU 30 can be used to implement the Registration Subsystem 6 functions of FIG. 1, for example. Finally, a router 29 can be used to connect to the Public Communications Network 20.

Note that, although FIG. 3 shows a plurality of servers 21A-n, a plurality of CPUs 23A-n, and a plurality of database storage devices 25A-n, any of these might be implemented on one or more shared computers in various configurations, executing one or more computer program applications, as desired. As the number of users supported by the system 1B grows, additional hardware can be added to increase the capacity of the system, as necessary, in a manner similar to that shown in the Figure.

Continuing with FIG. 3 showing the more complex implementation 1B, a plurality of users can be supported in various configurations. For example, a plurality of users 10B operating single workstations 18A-18n, individually connected to the public communications network 35, can be supported. Furthermore, complex user networks can also be supported. Retailers and or Toy Manufacturers might also have access to the system, as represented by the example shown in 8A, should an online-ordering system be implemented for selling toys. Of course, alternate implementations are also possible, depending on the types and number of users and/or retailers being supported, and also depending on the state-of-the-art computer technology.

In one example embodiment, the System uses an Apache web server running in a Linux environment. For webserver hardware, an Intel 2 Ghz+CPUs with 2 GB RAM running Gentoo Linux with the appropriate extensions can be utilized. The server will serve flash content to a web browser running a web browser application using PHP, Perl, and actionscript, and flash plugins. A MySQL database application will also be utilized for the storage subsystem. Alternatively, commercially available programs, such as Microsoft™ IIS and Microsoft™ SQL Server™ 2000 running on a Windows Server 2003 machine could be utilized.

The client (user) side Flash application makes the calls to a number of PHP files. These PHP files then "interface" with the MySQL database to obtain the necessary data. All are served by the Apache web server, which can serve HTML, XML, along with the appropriate flash and other content. For multi-user environments (e.g., the multi user rooms discussed below) these are served by a socket server written in Perl.

Figure 1A:
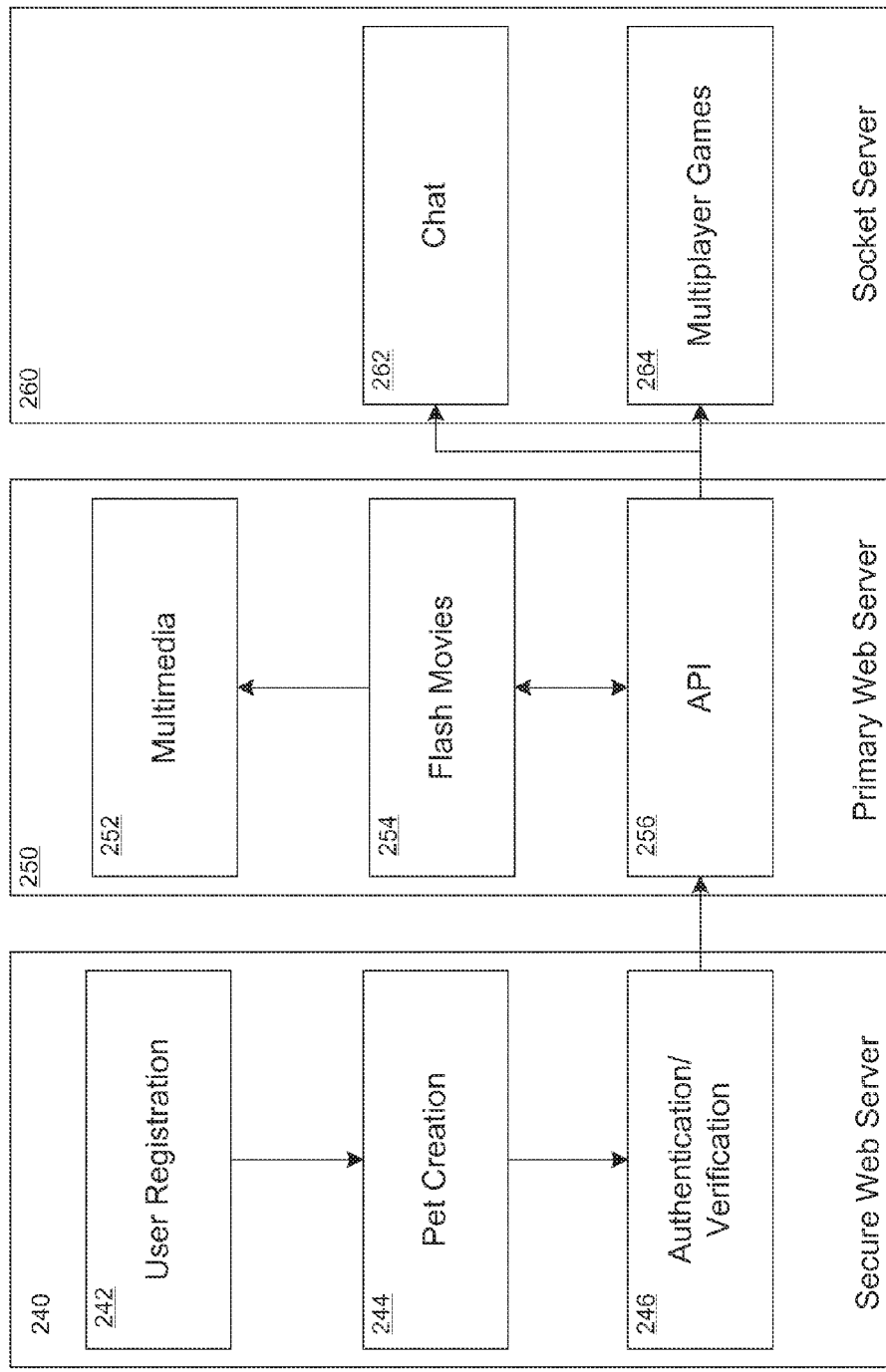
FIGS. 1A and 1B show additional implementation details about the embodiment of 1A.
Figure 1B:
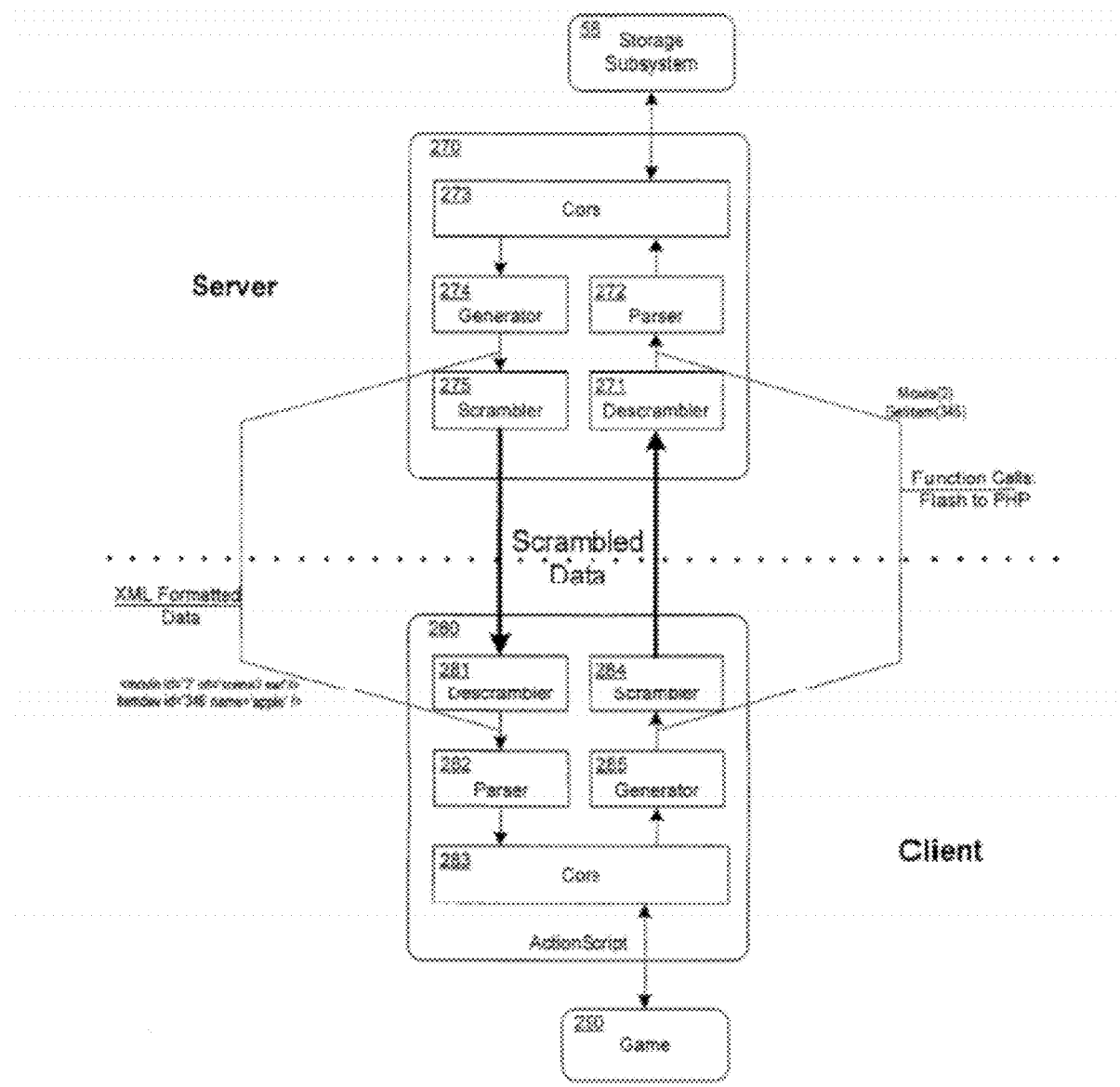

FIG. 1B shows the interaction between the client (user) and server subsystem data flows in more detail. A dedicated database server running MySQL on a dedicated computer running the Gentoo Linux OS can be used in the current system.

A secure Apache SSL server can be utilized for the registration subsystem, likely sharing the computer with the other Apache server.

FIG. 1A shows an implementation of the current system utilizing an Apache Secure Web server 240 for serving files over secure connection (HTTPS, SSL mode), and an Apache Web server 250 for serving files over regular HTTP. A custom Socket Server 260, which is an XML socket server, written in PERL, is also utilized for providing independent environments for game sessions.

Items 242, 244, and 246 are parts of adoption center (discussed below), which is a flash application with PHP backend. Item 242 provides for user registration, using a form-driven flash application which validates the registration code and creates a user account within the system. A pet creation application 244, is a form driven flash application designed for guiding the user through pet creation process, and validating the registration code.

Authentication/Login process 246 is a flash application validating user credentials on the server side and spawning an API core in case of validation. It also has module designed for password retrieval based on collected user information, and currently passes user data to a client side API, and may in the future pass user data and a generated encryption key for a current session to a client side API.

Items 252 & 254 are Different media (files) available on the server subsystem for user use. Item 254 represents Flash Movies and Games available for the user. Item 256 represents the server side API. Chat 262 and Multi-user games interactions API (MAPI) 264 are a part of Client side API and are used for setting up and maintaining connection to the socket server, authenticating the user, and work in a pass-through mode for multi-user games/environment to exchange messages.

FIG. 1B shows the API as a functional layer, serving end user applications (Flash games and such) with stored data (users statistics, virtual toys' properties, item parameters, etc.) retrieved from the database; it also is used to modify/enter certain data.

The scheme of the API is subdivided into Client part 280 (flash application) and Server part 270 (PHP script). Flash clip/movie Game 290 calls a function within the API client side [Core 283] passing a request to some arbitrary data. The Client side API [Generator 285] sends the request to [Parser 272] server side API. The Server side [Core 273] processes it and retrieves data from the database, wraps it in XML [Generator 274] and sends it back to the Client Side API [Parser 282], which calls specified a callback function within originator Flash clip/movie [Game 290] and passes received data to it.

To ensure users privacy, prevent cheating and preserve validity/authenticity of information, additional security layers can be designed which encrypts all data being passed back and forth in-between parts of the APIs (client/server).

The site web pages should be quick to load so as to make it useful and fun.

The chosen Encryption technique of the first example embodiment is a modification of TEA routines, using a Feistel cipher with 128 bit key. Keys are generated at the login stage and securely passed to client side via HTTPS, after which the adoption centre spawns the client side API and passes the encryption data specific for the session. Additional measures which can be taken to prevent cheating and maintain data coherency include using different permutations of the original key for every data transmission.

Figure 4:
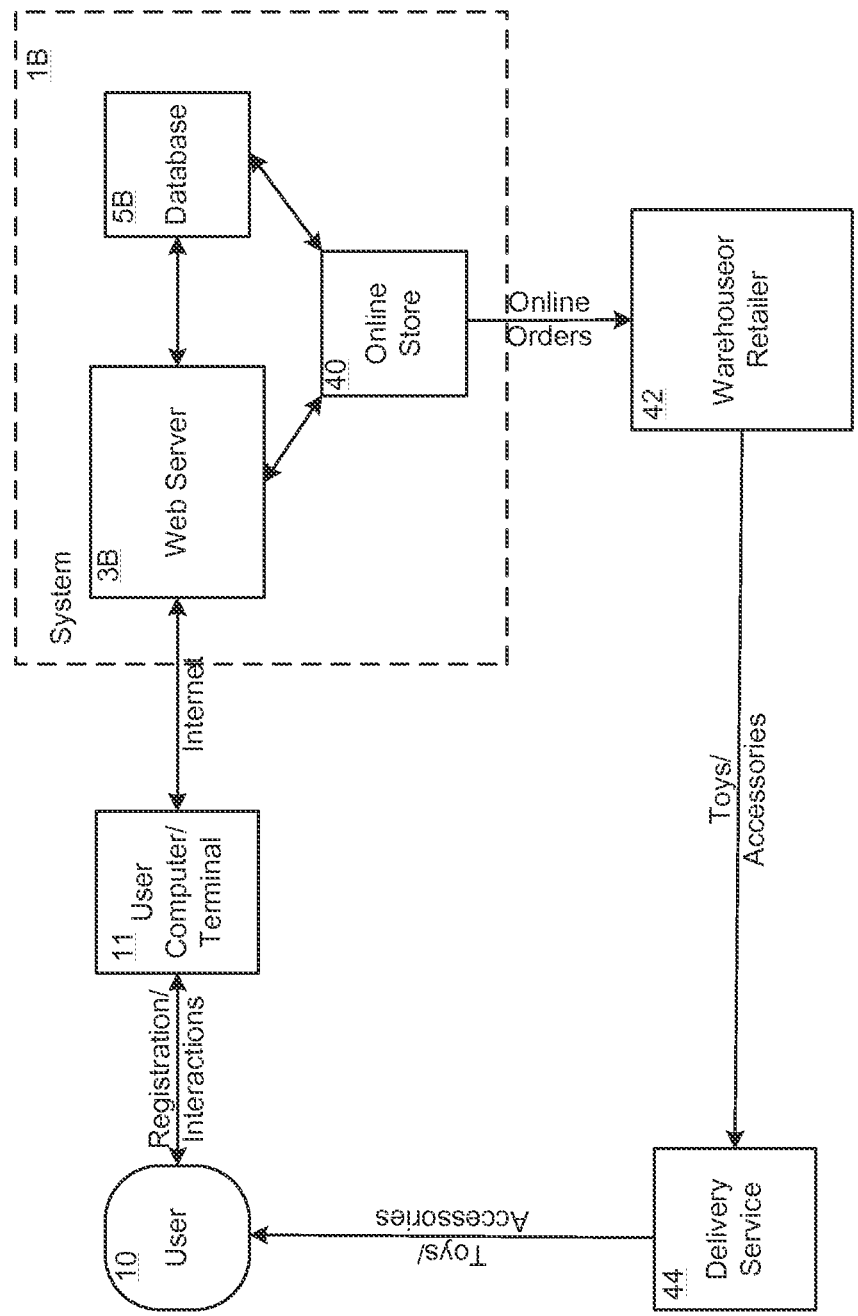
FIG. 4 shows a block diagram of another embodiment of the system and its interactions with some external entities.

FIG. 4 shows an alternate embodiment of the Entertainment System where the toys are sold to user via an online merchant. In this alternate embodiment, the Entertainment System 1B includes an online store 40 for a user 10 to purchase toys. The user 10 purchases the toys (e.g., plush stuffed pets) using the user computer 11, making an online payment using a credit card or online payment service, for example. A Warehouse or Retailer 42 then delivers the purchased toys, via a delivery service 44, for example, to the user 10. Registration of the toys could be automated, or as described above and below for a store-purchased toy.

Various features are provided by the online environment, including maintaining the virtual well-being of the virtual toy, providing a specific Temperament/Personality of the toy which can impact the well-being of the toy, which can include parameters such as happiness, hunger, and health, for example. Also provided are online User Games and Activities, which can be used to win more virtual cash or impact the well-being of the toy. The user can furnish one or more virtual rooms set up for the virtual toy, in addition to adding various virtual accessories, the user can purchase virtual food and virtually feed the virtual toy, and by playing with the virtual toy, the virtual toy's happiness and health parameters can be improved. Playing may, however, make the toy hungry, thus affecting the toy's hunger parameter. The virtual cash may also be used to provide a virtual medical checkup for the virtual toy to improve the virtual toy's health parameter.

In this manner, the Entertainment System uses the well-being parameters and virtual cash to help balance a platform for providing fun and activities, with an incentive to purchase new additional toys, and to increase the user's attachment to the physical toy. The fun and enjoyment obtained through the use of the system provides free word-of-mouth advertising, which also helps sell additional physical toys. In this manner, the Entertainment System is a marketing tool that will increase the overall sales of the toys, and thus provide a benefit to retailers selling the toys.

Figure 5:
FIG. 5 shows a sketch of an example toy according to the first example embodiment.
Figure 6A:
FIGS. 6A and 6B show the front and back of a tag listing the System website address and a registration code according to the first example embodiment.
Figure 6B:
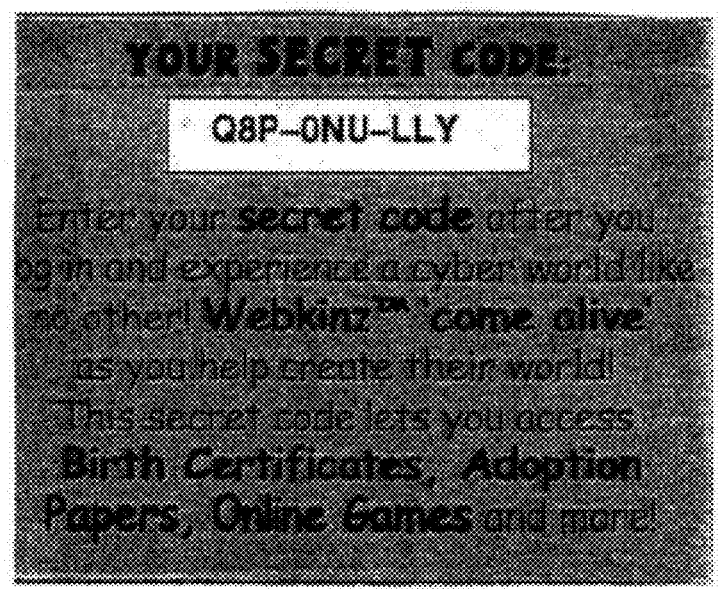

The toys that provide access codes might be, for example, plush toy animals (e.g., "pets", an example drawing of which is shown in FIG. 5), robots, action figures, figures based on cartoon characters, vehicles, aliens, inanimate objects, etc. The toy may be paired with a hang tag or other device having the system website address and a registration code imprinted thereon or stored therein, an example of which is shown in FIGS. 6A, 6B. Alternatively, an electronic storage device, such as a USB key, or wireless RF tag or Bluetooth device, could be embedded within or provided with the toy and/or its packaging at purchase. The electronic device would then have the registration code stored in the device using electronic memory (RAM, ROM, EEPROM, etc.), for example. As electronic storage devices become cheaper, using such a device for storing the registration code may become the preferred approach.

For the example embodiments, after the user takes the toy home, the user begins the registration process by visiting the Entertainment System website using the address on the tag and a user computer via an Internet connection to load the home page, for example, and the user registers the toy, such as by entering the registration code, thus receiving access to the various online features of the invention, as discussed herein.

The registration process of the first example embodiment is performed by manually entering the registration code printed on the registration tag via the user computer connected to the Internet. The user also chooses a user ID and password. The System can ensure that at least the combination of ID and password is unique, or might also insure that each user ID is unique as well.

Personal information might also be requested in order to recover user ID and password information. Such personal information might be a favorite color, user's birthdate, etc.

In an alternative embodiment using an electronic storage device with the registration code stored therein, the electronic device can communicate with the user computer via a corresponding device, and thus automatically or manually transfer the registration code to the user computer. For example, the System could request that the user plug in a USB key into the user computer at the appropriate time, or the user computer may wirelessly read an RF or Bluetooth device located in or on the toy.

In the first exemplary embodiment, after the user enters the registration code, and before or after the user enters the user ID and password, the System checks the registration code in any one of a number of ways. In essence, the System uses stored data relating to all of the registration codes associated with corresponding toys for sale.

The system might check the registration code against a list of valid registration codes stored in the system database, for example. In this case, the stored data are the actual registration codes themselves. If there is a match, the registration code has been validated, and the system then determines the type of toy that the user purchased based on information stored with the registration code in the database. For example, each code could be linked to information about the type of toy (e.g., a basset hound, a fish, a lion, a robot, a soldier, etc.), its coloration and appearance, its temperament, etc.

The System may display a user agreement at some point, providing the terms of usage and legal notices, for example. The System might require an affirmative response from the user in order to complete registration.

In such an embodiment discussed above, it would be beneficial to make each registration code unique and complicated, in order to make it difficult for an imposter or unauthorized user to make up a code or use a previously registered number to obtain unauthorized access or unauthorized additional virtual toys.

As an alternative, after being entered, the registration code is used in a mathematical algorithm to determine its authenticity, and such an algorithm might also be used to determine the type of toy being registered. For example, all lion plush toy registration codes might start with the letter "L" followed with a number or a series of digits that can be factored into exactly five prime numbers, for example, or the number might fall into a particular range or format. Another example is the use of an algorithmic pass-code based on a central key value.

In these examples, the stored data relating to the registration codes provides the proper information to perform the validation process (e.g., the proper letters, number ranges, acceptable factors, the central key, or the algorithm itself). Accordingly, by these methods, the actual registration numbers need not be stored, but could still be verified. Then, perhaps by storing the registered registration code, uniqueness could be guaranteed by never allowing that same code to be used again.

Of course, additional techniques can be used to determine a registration code's authenticity as well as long as the registration process ensures that it is likely the user has purchased a valid toy, and thus is an appropriate user of the System.

Note that alternative means of registering the toy are also possible in alternative embodiments. For example, the user might phone in the registration code using a telephone, and be given a user ID and password, or choose one over the phone. Or the user may register the toy at the place of purchase using a dedicated or general purpose computer on a private network. Or, if the toy is purchased online, the registration might occur at the time of purchase, before the user has obtained the actual physical toy. Thus, different communication networks may be utilized for registration as are utilized for website access, for example.

The System website can present various interactive scenes into which the virtual toy is incorporated. In the first exemplary embodiment, the toy characters can be animals that reside in a virtual village, for example. New features can be opened based on the number of toy animals a user owns and registers. For example, there might be a special adventure that opens when the user purchases and registers his fifth toy, regardless of what those toys are.

In an alternative embodiment, the scenes might be customized based on the type of toy. For example, a basset hound plush animal could be shown in an urban landscape or setting. Likewise, a cow could be shown in the countryside, a monkey in the jungle, and a lobster under the sea, as additional examples.

Furthermore, in another embodiment, each type of toy might have different traits that can impact the way the toy reacts based on the type of toy. Thus, a toy lion might be a mean carnivore, while a toy monkey eats fruit and is playful, for example. Soldiers might be aggressive, while dancers are graceful, for example. Thus, any of the above concepts are not limited to animal toys, but could easily support other toys such as human dolls, robots, machines, soldiers, etc.

Having virtually adopted their toy by registering it with the System, the consumer can then participate in a variety of online games, some involving the virtual representation of the toy (i.e., the virtual toy). These games can include adventure games, trivia games, arcade-style games, and the like. Participants can collect "virtual cash", which is virtual money which can be spent to purchase virtual items for their toys, as discussed above and below. This virtual cash may or may not be useable at other sites and may or may not represent legal tender.

Furthermore, a participant may purchase additional toys or other products, register them (which then associates them with the user's ID), adopt them, which adds them to their virtual world, thus creating additional virtual toys. These purchases are preferred to be actual toy purchases using legal tender where the user obtains a real toy. However, in an alternative embodiment, "virtual toys" represented only online might also be utilized, whether purchased with legal tender or merely online "money".

After registration, each of the new toys is represented as a virtual toy which can interact with other virtual toys (including those created to represent other actual toys), including team game play, for example. Participants can also chat with other registered users using online chatting or posting features. The first example embodiment utilizes a symbol chat with preset icons, rather than general text chat, to protect children from inappropriate language. However, generalized chatting features could also be added, such as provided by a commercially available chat program, for example.

The virtual items in the virtual world can be made to interact with each other. For example, the virtual toy might sit in virtual chair, or climb on top of a virtual table. The virtual toy might walk around the virtual world, and play with its own virtual toys. Virtual toys may play and interact with each other. Virtual accessories might be placed on a table, and virtual pictures can be "hung" on a virtual wall. Virtual chairs might be moved around, and slid up to a virtual table. The virtual toy might sit in a chair. Virtual food might be placed on a virtual plate, for example, and the virtual toy may simulate eating the virtual food. Thus, the user is provided with an animated display of these interactions, including both video and/or audio components. In this manner, the virtual world simulates activity in the real world.

The user can also zoom in and out of various views, virtually move from room to room (i.e., display different rooms), etc. all by manipulating the mouse and keyboard of the user computer.

The virtual world and the games represented on the Entertainment System website may be changed and updated on a regular basis to maintain the interest of the user participants. For example, trivia game questions may be updated, and new games periodically added.

Further, new types of plush toy animals can be periodically introduced to encourage consumers to make additional purchases. Special or limited addition toys could be introduced, for example, on holidays. For example, an American bald eagle might be introduced to commemorate Independence Day, and a Santa Claus for Christmas. These new toys can be introduced to the user in a virtual manner, and the user encouraged to purchase the actual toy. Bonuses of virtual cash, or special activities might be provided to those who do purchase special toys.

Subsequent purchases of toys, when registered, may lead to increasingly greater deposits of virtual cash as a reward. For example, the first toy registration may lead to $1500 in virtual cash, a second purchase and registration may add $2000, and a third add $2500, for example. Furthermore, purchasing and registering a certain number of toys could lead to bonuses, such as additional virtual rooms, and/or access to additional games (e.g., an outdoor tennis court with game). These bonuses encourage subsequent purchases, and keep the user interested in both the System and the toys.

Additional features that can be included in additional embodiments, as discussed above, are incorporating a storage medium into the plush toy animal or peripheral products, instead of, or as a complement to, the registration tags, for example. This might allow the online profile of the toy, including everything the toy has "learned", to be stored in the device with the toy. The toy could then be connected to another computer at another location, for example at a friend's house, in order to participate in online activities, as long as that computer is connected to the Internet, for example. Furthermore, the storage medium could be used to store other information for its owner, such as homework assignments, photographs, music or shortcuts to favorite online websites.

The Entertainment System website that provides this virtual world is a site where children and other toy owners that own an appropriate toy can adopt and care for their virtual toy (e.g., "virtual pets"), play games, and go on adventures, as discussed above. After registration, the user can begin to enjoy the complete 'game' in the virtual world, which is a combination of caring for the toy, going on fun adventures, being surprised by rollovers and trivia, and generally having interesting and entertaining experiences. It is a multi-faceted world, rich in amusement and learning opportunities, including both audio and video (graphics, animation, photos, etc.) representations.

In at least one exemplary embodiment, there are about seven or more main sections to explore in this virtual world. These can include the home page, public pages, adoption center, checkup clinic, one or more virtual rooms, arcade and game areas, a clubhouse, chat areas, etc.

Figure 7:
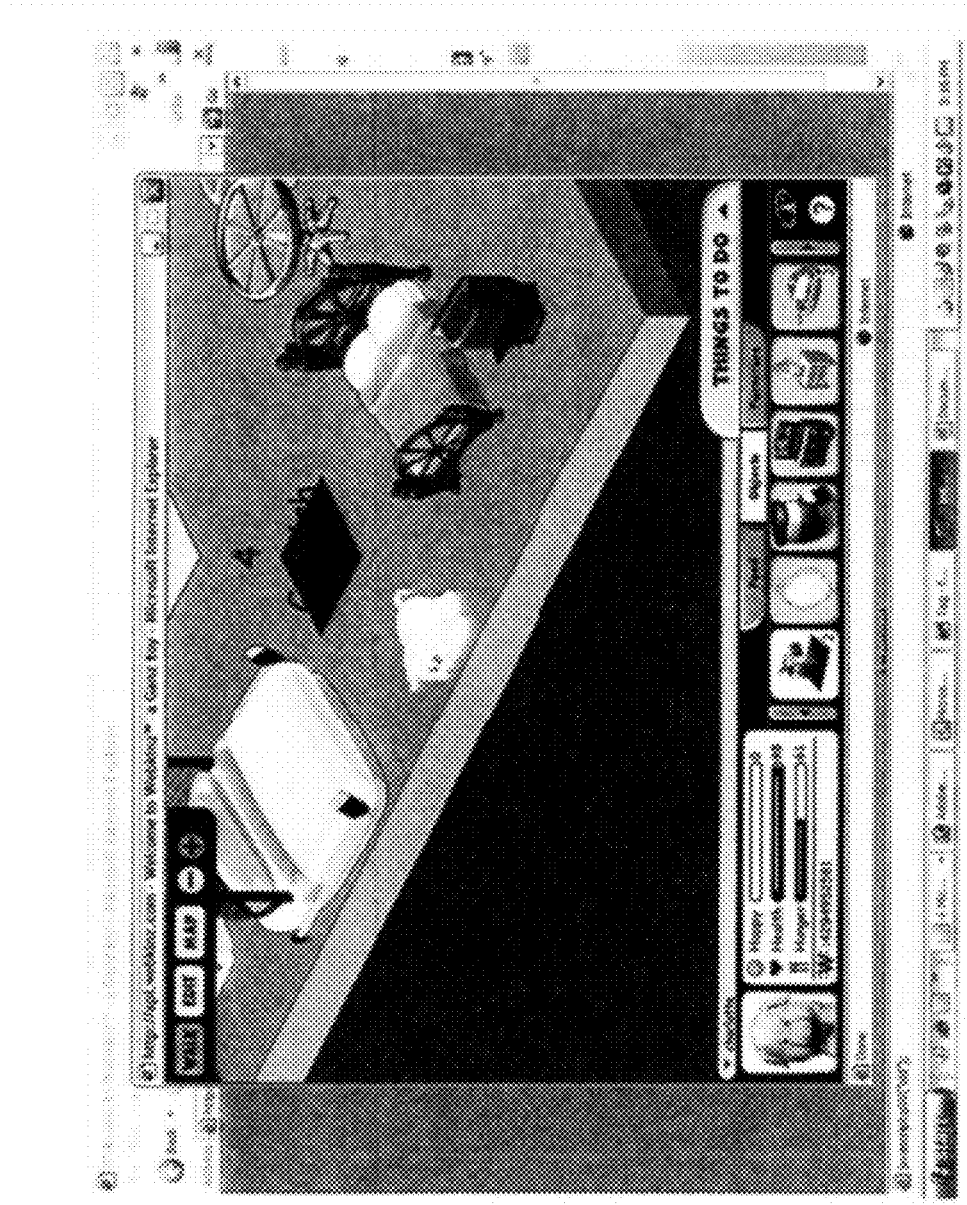
FIG. 7 shows an example screen shot of a virtual room displaying a virtual toy and virtual accessories.

In particular, the virtual toy has a room that is made up of a series of animated (e.g., Flash based) screens that depict the virtual room or rooms where the toy "lives", "eats" and "plays". In the first exemplary embodiment, a single isometric view of the room is provided. FIG. 7 is an example screen shot of such a virtual room showing a virtual toy. The virtual room can, in time, be converted into a large virtual house or even multiple virtual houses, through the use of room expansions via spending the virtual cash, for example. In the first exemplary embodiment, the user can purchase virtual flooring, virtual wallpaper or paint, and virtual furnishings to prepare the virtual room for the virtual toy. See FIG. 7 for the screen shot of an exemplary virtual pet room already furnished, showing an animated pig as the virtual pet.

Virtual outdoor yards that have their own virtual furniture and exclusive virtual objects (i.e. trees) that cannot be placed inside the house, for example, can also be provided for "purchase" using virtual cash.

A user interface section located at the bottom of the window known as the "dock", or "Control Panel" can also be provided, where user may virtually store many or all virtual purchases, collectibles, and adventure objects for later use or retrieval (some of which are functional, such as a virtual calculator for example). Where applicable, a stored item or object can be placed, positioned, or arranged in the room by dragging it from the dock. The dock displays a visual description of the virtual toy's well-being parameters (e.g., a numerical index), as the toys need food and attention to remain healthy and happy. Also shown in the dock are the user's point level and available "virtual cash" earned in virtual games and adventures that can be used throughout the site. FIG. 7 shows an example of such a "dock" in the lower portion of the screen shot. A Family Album, which may be available or accessible for viewing from the dock, for example, can be used to contain all the important documents including, for example, one or more of:
  a-Birth Certificate
  an-Adoption Record
  a-Biography
If the user has multiple toys, all the corresponding records for each toy can appear in the album.

In an alternative embodiment, there might be a number (e.g. three) of views of the room, and each scene might be accompanied by the dock. If the user has multiple registered virtual toys, the dock interface will allow the user to switch between toys and view them when not in use. Furthermore, a plurality of virtual toys might be moved into a room for interactive play, for example.

The user can also add friends to a friends list, and then the friends can virtually visit each other's rooms, each seeing the same room and playing with their virtual toys, both interacting with the room objects, and chatting using a chatting tool, for example. In the first exemplary embodiment, the chatting tool can use "chat symbols", for example, rather than using typed words, so that pre-defined phrases can be chosen and transmitted to the other participant.

In an alternative embodiment, users would be encouraged to revisit by receiving daily rewards, such as an 'allowance' or pieces of a puzzle that can be put together, or one piece will be put in the puzzle box every day, thus encouraging users to revisit.

In the first exemplary embodiment, a user can go virtually "shopping" using the computer in a dedicated shopping location/room (e.g., at the "WShop"). This simulated virtual shopping experience allows the user to simulate the purchase of virtual online goods for their virtual toy(s). Furthermore, real-life shopping for additional physical toys and/or their accessories, such as via mail-order, can also be supported.

Optionally, users can be provided partial access to the site by adopting an online virtual toy for free. Access to many features will be restricted or blocked because no retail toy has been purchased. Users will be able to purchase a retail toy to gain access to the complete site. Accounts may still expire after a certain length of time of "free" restricted access, but under this option users of expired toys can maintain access to their accounts, albeit with a different kind of access to the site. That is, these users would no longer have the free restricted access. Instead, users of expired accounts would enter a new and different tier of access to more of the site, or even the entire site, but may be excluded from specific site bonuses and features. Alternatively, virtual toys could be sold to users, providing additional access to the site over and above what the free adoption (e.g., free restricted access) would provide. This allows users to get many more virtual toys than actual physical toys to avoid the physical restraints of smaller rooms, for example.

Furthermore, additional enhancements can be provided for additional benefits. For example, some information on the toy might be stored locally, such as on a USB key, which can be carried by the user and used to access the site from various locations.

Feature Codes and Bonus Content

Feature codes, which could include registration codes as examples, are codes that provide bonus features and/or bonus virtual content for the user of the virtual world. The bonus features and bonus content are tied to and unlocked by the code and are associated with a user account, and thus typically not made available to users who do not have the required feature code (perhaps because they have not purchased the required product, for example). Accordingly, feature codes can be used to encourage a user to purchase additional products (such as peripheral products that might include accessories to the original toys). Feature codes can also encourage users to perform activities that are desired by a manufacturer, retailer, and/or website hosting organization, for example, by offering bonus codes in response to participating in certain activities.

Figure 8A:
FIG. 8A shows an example screen shot of a page showing a plurality of such products along with a more detailed description of one of the products and its bonus materials

The peripheral (including accessory) products that are provided with feature codes (that may also be product registration codes for registering the product) can be advertised on the main site, and a "product store locator" can be used to tell registered users where to purchase such products. This service can identify where the retailers closest to the user might be located. In addition, the site might advertise various limited time products that are available, such as in a 'news' item, a pop-up ad, or a banner ad. FIG. 8A shows an exemplary screen shot of a page showing a plurality of such products along with a more detailed description of one of the products and its bonus materials. FIG. 8B shows an exemplary screen shot of an informational news page that describes a product and provides a link to a store locator to find a retailer selling the product.

Figure 9D:
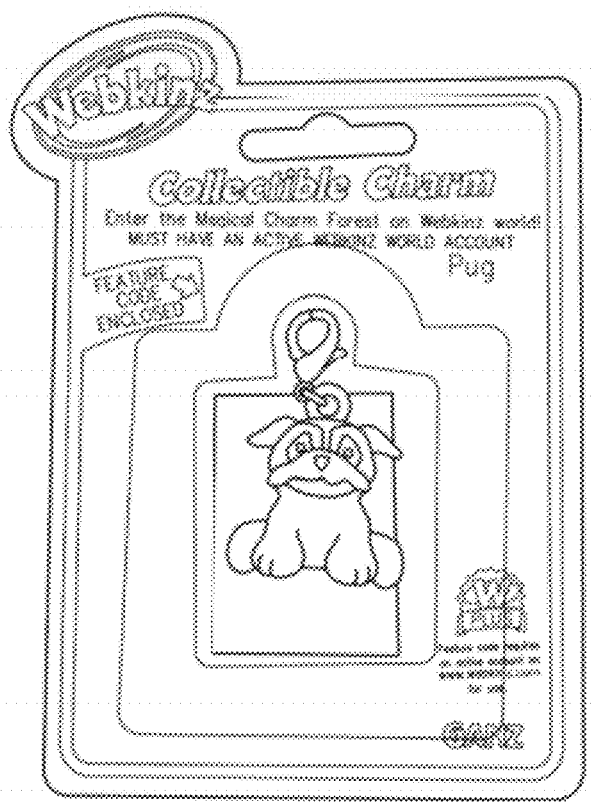
FIG. 9D is a sketch of a charm ancillary product in its packaging and FIG. 9E shows the charm with an associated feature code on an included tag.
Figure 9E:
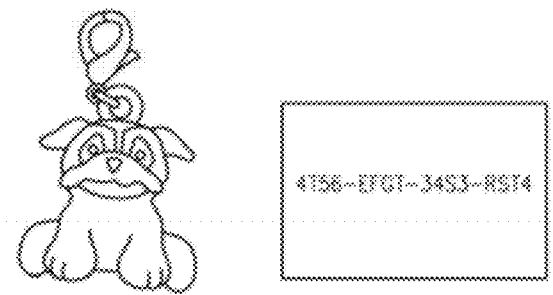

A number of different products could be utilized with this feature code feature. Below is a list of different classes of exemplary products and some possible bonus features that can be provided in response to unlocking an accompanying feature code:

Toiletries, such as Lip Gloss, or a Body Spritz, shown in FIGS. 9A, 9B, and 9C, provided with a feature code that could provide a virtual piece of salon furniture, for example;

Bookmarks that could be provided with a feature code to obtain access to a virtual book bag having a plurality of virtual books, such as a cookbook or set of short stories, where the user might get to choose the book he wants; Example bookmarks and their associated example bonus features are shown and described in the screen shot of FIG. 8, Charms (that might also come with, or separately from, a charm bracelet or necklace) or other jewelry, provided with a feature code that provides a virtual item such as a charm (that may be similar to, or different than, the purchased charm) and also provides access to a Charm Forest activity described in more detail, below; An example charm product along with an example feature code is shown in FIGS. 9D and 9E.

Figure 9F:
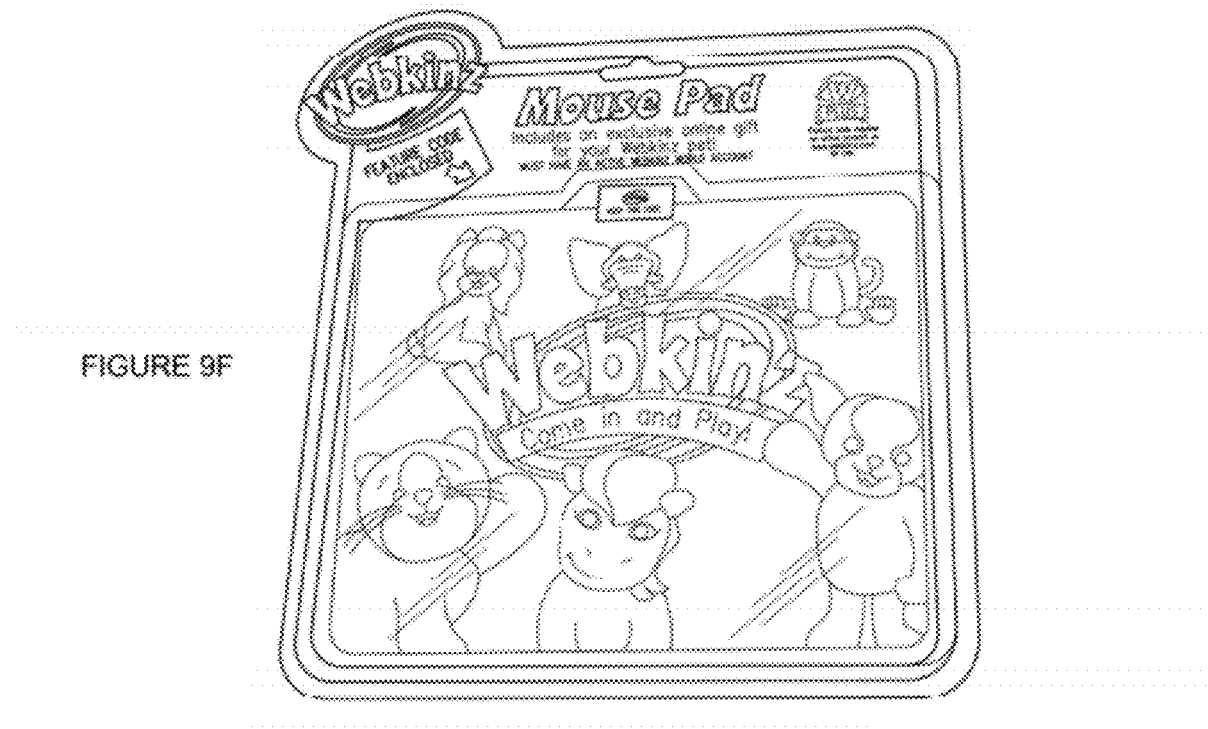
FIG. 9F is a sketch of a mouse pad ancillary product in its packaging and FIG. 9G shows the mouse pad with a feature code on an included tag.
Figure 9G:

Real clothing that could be worn by the user, or the user's pet, provided with a feature code that provides access to a virtual item of clothing that can be worn by the virtual representation of the pet—the real clothing might be similar to the purchased item, or the code might provide access to a clothing shop where the user can choose the virtual clothing item to receive;

A Mouse Pad, provided with a feature code that unlocks a virtual framed poster for use in the pet's room, that could feature the same artwork as on the mouse pad; An example mouse pad with its associated feature code is shown in FIGS. 9F and 9G.

Figure 9H:
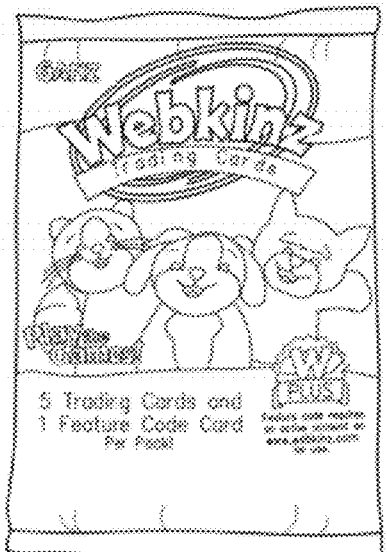
FIG. 9H is a sketch of a package containing trading cards and feature codes.
Figure 9I:
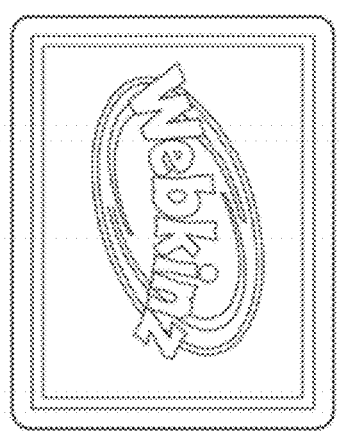
FIG. 9I shows sketches of the trading cards with an associated registration code and bonus feature codes printed on one of the cards and game instructions printed on another of the cards.
Figure 9I:
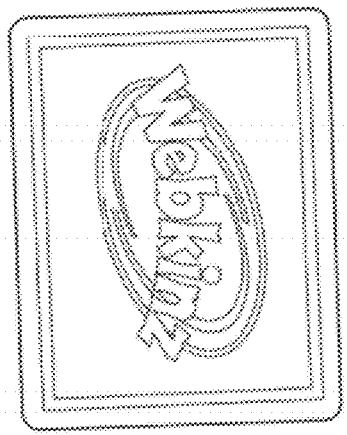
Figure 9I:
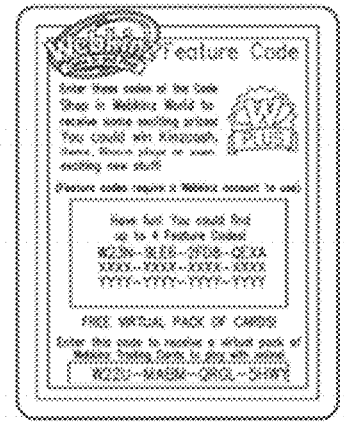
Figure 9I:
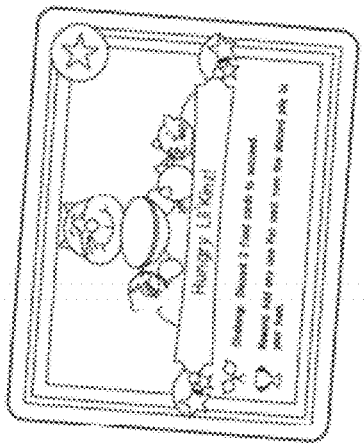
Figure 9I:
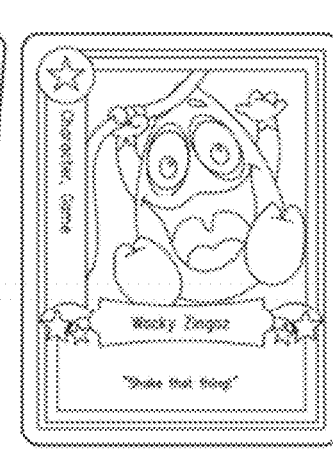
Figure 9I:

A package of trading cards (see FIG. 9H) having individual cards (see FIG. 9I) that can be used in a game, provided with a registration code to obtain a different set of virtual trading cards that can also be used in the same, or a different, game. In addition, the trading cards might come with additional feature codes (e.g., one to four, varying by purchase) that can unlock additional bonus features (for obtaining bonus content, activities, or additional virtual items); An example set of trading cards (showing some two with front views and two with back views) along with an instruction card and an associated card having a registration code and extra feature codes is shown in FIG. 9I;

A pet carrier for carrying a plush animal (see FIG. 8B); and

In addition, many different products could also be utilized, such as book bags, stationary, writing utensils, food items, computer accessories, etc., any of which could be provided with registration/feature codes for providing bonus content to the registered user of the virtual world.

With respect to bonus feature codes, typically the bonus feature code is packaged with a real world item. The bonus feature code unlocks a bonus item within the virtual world. That bonus item exists only in the virtual world and can be different than the virtual version of the real world item. The bonus item interacts with, and is usable with, the virtual version of the real world item.

Therefore, the real world item may have a feature code that allows it to be used in the virtual world as a virtual item. The real world item may also have a bonus feature code that produces only a virtual item, and does not produce a real world item. That virtual item produced by the feature code is related to and interacts with the virtual version of the real world item.

This technique encourages the consumers to purchase items with bonus codes in order to obtain, not just the real world item, and its associated virtual item, but also the bonus virtual item. In an embodiment, that bonus virtual item cannot be obtained any other way other than by purchasing the real world item with which it interacts.

A feature code might be a series of numbers and/or letters, such as a series of seven numbers and letters, for example. The feature code is utilized by the System to provide the bonus features and/or bonus virtual content to the user associated with the users account (user ID) when the user "unlocks" the code, for example by entering it into the system. This could be done by entering the code into an input field on a page of the website. If an improper code is entered (such as by entering an improper series of digits, for example) an "unlock" or other execute button can be made non-functional. Examples of such registration/feature codes are shown for the exemplary playing cards in FIG. 9E. These feature codes are typically intended to be entered manually. The feature codes may also be stored electronically on an electronic part, in which case the feature code can include many more numbers and letters By entering and "unlocking" the feature code, the system will reward the user with the associated bonus features and/or bonus virtual content (such as a virtual item) being associated with the user's account. Some codes may come with a plurality of such bonuses, while other codes may come with only one, or even no bonus content at all (perhaps as a "gag" code, for example).

A virtual item provided in response to unlocking a feature code might be a virtual representation of the product class (such as a set of virtual playing cards) that are similar to (e.g., used for the same type of games), but different than (e.g., a different set of images on the virtual cards or a different number of cards) the purchased item. Alternatively, the virtual item may be only remotely related to the purchased item, such as receiving a virtual book in response to purchasing a bookmark. Or the virtual item might be a virtual replica of the purchased item, such as when the feature code provided with a virtual charm (such as of a pug dog, for example) provides a virtual replica of the charm (such as a virtual image of a pug dog charm, in this example). Similarly, the purchase of real clothing for the pet may result in a virtual image that is a replica of the clothing (thus, a yellow raincoat for a boxer plush animal provides a virtual yellow raincoat for the virtual image of the boxer to wear in the virtual world), whereas other items of clothing might provide a feature code that allows the user to pick from a selection of virtual clothing, and thus the virtual item is similar to (e.g., in the same class of clothing), but not identical to the real item (a different item of clothing).

Replicas will not typically be exactly the same as the original real item (because this would be difficult to accomplish technically) but are basically of similar design, color, use, etc. Thus, a virtual replica of a plush lion would be a virtual representation of the lion to remind the viewer of the plush lion. Similarly, a replica of specific toy soldier would be a virtual soldier of the same rank and similar features, to remind the viewer of the toy soldier.

As discussed above, ancillary products that are related to the primary product can be provided to supplement the primary product, and thus provide an additional source of revenue to retailers and/or the provider of the virtual world, and might provide a continuing source of revenue to either or both parties.

Another embodiment provides accessories to a primary product (e.g., accessories to a toy), with feature codes that provide virtual accessories in the virtual world. The toy may be represented in the virtual world by use of one feature code. The accessories for the toy are provided in the virtual world by another feature code. These accessories for the toy are things that are usable with the toy, and in one embodiment change the appearance of the toy. These may be personal items for the user of the toy, educational items, game items, etc. These accessories products can be provided for sale, either online or via retail markets, or they might be provided as bonuses or product giveaways to attract customers to a store or a website. These products might all follow a common theme (e.g., be related to the toy or virtual world in some manner). Another embodiment provides accessories that are completely independent of the toys, but are somehow targeted to the user of the virtual world (perhaps just by the nature of providing a working feature code that provides some bonus content in the virtual world to the user).

For the exemplary embodiments discussed above, where the primary product for registration in the virtual world is a toy such as a plush animal, for example, the ancillary products could include such products as lunch boxes, clothing for the toy or the user, backpacks, additional toys, stationary, trading cards, bookmarks, toiletries, jewelry, etc., some of which are discussed above. The wearable items, e.g. clothing, can be worn by the virtual version of the toy and makes the virtual version of the toy look different. Some of these products might have images of the toys, or themes of the virtual world, printed thereon, for example. Additional products might also include accessories for use with a previously purchased toy, such as clothing, hats, jewelry, houses, etc. that could be put onto the toy for play in the real world, for example.

Such ancillary products could be sold with hidden registration codes associated with the particular product, which may or may not be usable for an initial registration for creating some portion of the virtual world. In one embodiment, the user might need a primary product—such as a plush toy, for example—to initially create the virtual world with a user name/ID and password, whereas the registration code and other feature codes provided with secondary products would only register the new product and/or add additional bonus features and/or other content to an already existing account/virtual world for that toy. The registration codes can also act as a "feature code" by providing bonus content and/or other special features to the purchaser/user in addition to providing registration of the product. These registration codes provided with these products can then be entered online to receive the additional features/bonuses in that user's virtual world (i.e., associated with that user's user account). For example, access may be provided to games, modes of play, virtual cash, virtual objects, special "abilities" provided to the virtual toy, or even downloadable features such as phone ring tones, music, desktop wallpaper, etc. In addition, virtual images of the ancillary product, or images related to that product, could also be provided in response to entering the registration code. Such virtual images might also provide additional functionality in the virtual word (e.g., adding special "powers" or "abilities" to a virtual pet, or another virtual character, for example).

For example, an ancillary product such as a charm might come with a registration code that, when entered, creates a virtual representation of that charm that can then be worn by the virtual toy to change the way the virtual toy looks in the virtual world because that virtual toy is wearing that charm. In that case, the code is a registration code because it is linked to the purchased product, and then the virtual toy may be able to wear the charm similar to a real charm worn by the real toy (or the toy user). Alternatively, a feature code might be provided with the charm that leads to some other bonus material that is not a charm similar to the purchased charm.

Additional bonuses can also be provided which are tied to the registration/feature code, or tied to additional codes, such as other virtual items, online games, or virtual cash, for example, and that might be awarded with the registration code, or via additional feature codes also provided with the ancillary product. For example, alternate embodiments include a feature code that, when entered by the user via the website, conveys a benefit unrelated to the ancillary product to the user and/or the user's virtual toy. For example, when such a feature code obtained by purchasing a real charm is entered, the user's account can be credited with a sum of virtual cash that the user can use to purchase additional items such as virtual furniture for the virtual toy, or real clothing for the user. Another example includes rewarding the user with another virtual toy upon entering a feature code obtained by the user with the purchase of a mouse pad. Similarly, clothing could be sold for the real toy or the user, with the clothing including a registration code provided with the product that, when entered, provides bonuses such as similar virtual clothing for use with the virtual representation of the toy in the virtual world—associated with that user. Thus, similar clothing can be used both in the real world and in the virtual world, by purchasing the real clothing with a registration code and then submitting that registration code to unlock and add the similar bonus clothing in the virtual world Again, the virtual representation can wear the clothing, which hence changes the look of the virtual representation.

Feature codes can also be released that are not tied to a particular product, and thus would not be considered registration codes, but can still be used by the system to provide bonus content and features to a registered user. For example, additional random codes could be distributed with a randomly collectable product (e.g., Webkinz® Trading Cards), where the additional codes are used for additional bonus content, but not to register the product nor for providing virtual representations of the product. Products may have randomly different numbers of such codes. For example, a deck of cards might have a registration code and from one to five additional feature codes, or each card in the deck might have a feature code. The registration code may provide a virtual deck of cards that is similar to, or different than, the purchased cards, whereas the bonus feature codes don't provide any additional cards, but provide some other bonus materials when unlocked (for example, they could provide one or more of virtual cash, virtual pets, pet accessories, access to special games, special rooms, furniture for a room, games, virtual charms, etc.). Thus, the purchaser never knows how many extra feature codes any given package of cards may have or what bonus materials he might receive.

Similarly, feature codes could be used as a marketing device, giving retailers a free incentive to attract customers, and sell related products and/or services, with the feature codes being handed out to certain customers or potential customers, but not necessarily tied to a particular product, and thus not used to register a product. For example, a number (e.g., 50) of free feature code cards might be given to a retailer for buying a certain number or certain dollar amount of wholesale products. The retailers can then distribute those feature codes as they like (e.g., selling to customers, providing free with certain purchases, providing random drawings, distributed as bonuses, provided as door prizes, etc.).

Such feature codes could then be used to give exclusive virtual items or other bonus features to the user, or they might be used to extend a user's time on the site or to give users special privileges (e.g., the ability to set up a contest), to provide bonus content (e.g., extra virtual cash), and/or even used to unlock special features on the site that are not available otherwise, such as new games, jobs, actions for the pet, etc.), as discussed above.

Alternatively, registration codes could be passed out without any purchase, but to reward some behavior or attract certain consumes, with these registration codes not being related to a product, but being utilized to allow new users to register on the site for certain restricted content in the virtual world, but that would typically be less than the content available to a fully registered user that has purchased the required toy(s).

Feature Code Only Members Exemplary Embodiment

Because not all owners of products provided with Feature Codes (or recipients of free feature codes) may also be currently registered users of the website, it would be possible to provide those unregistered users with the ability to at least register as a "Feature Code Member". These members will only have access to the features that they have unlocked with the codes they have received. The goal of this embodiment will be to capture the attention of these users encourage them to purchase additional toys so that they can formally register to enjoy everything else the website has to offer.

Figure 10A:
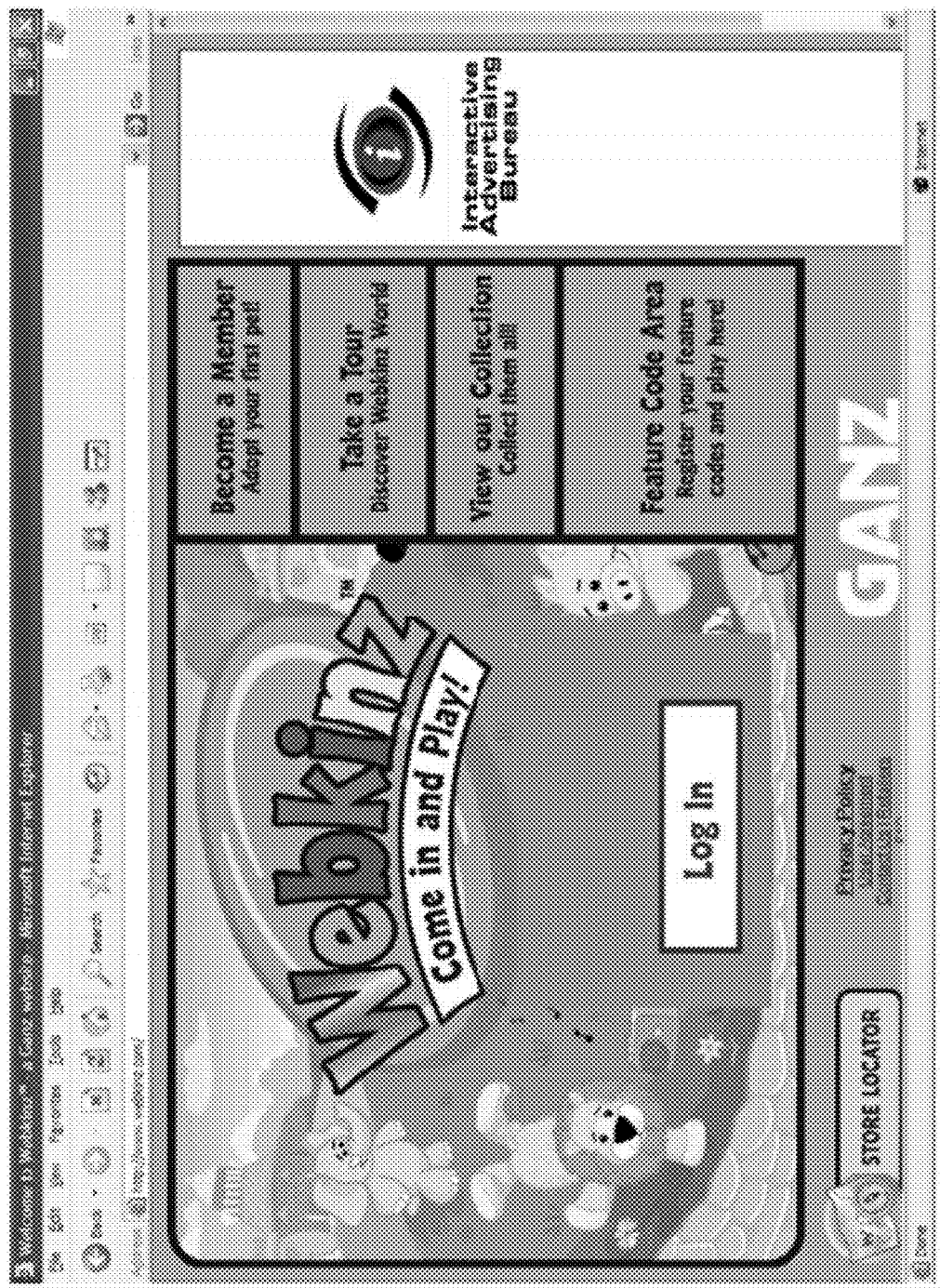
FIG. 10A is an example screen shot of a home page having links to a Feature Code area, a log in area, and a store locator.
Figure 10B:
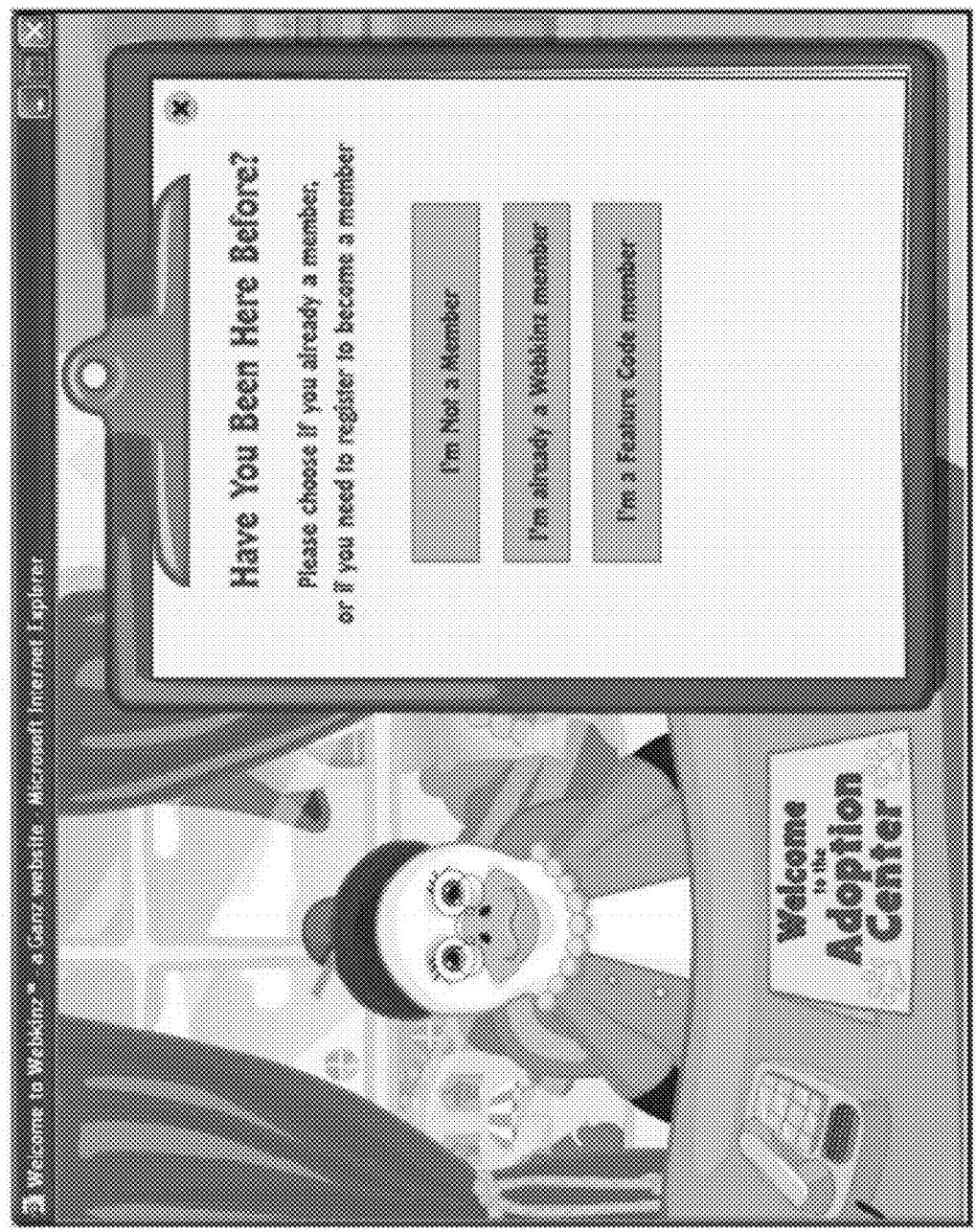
FIG. 10B is an example screen shot of an adoption page that supports current full members, non-members, and feature code members.

To allow for Feature Code members to convert their accounts into fully registered accounts, the full account registration process could be modified so that it recognizes these feature code accounts to ease making them full account users. From the home page, the user could go to a Home Page adapted for feature codes, such as shown in the example screen shot of FIG. 10A, which includes an area for banner ads and a link to a store locator. FIG. 10B shows an adoption center page where the user will have the opportunity to either log into their Feature Code account, full account, or choose to register as a (limited) Feature Code member.

Figure 10C:
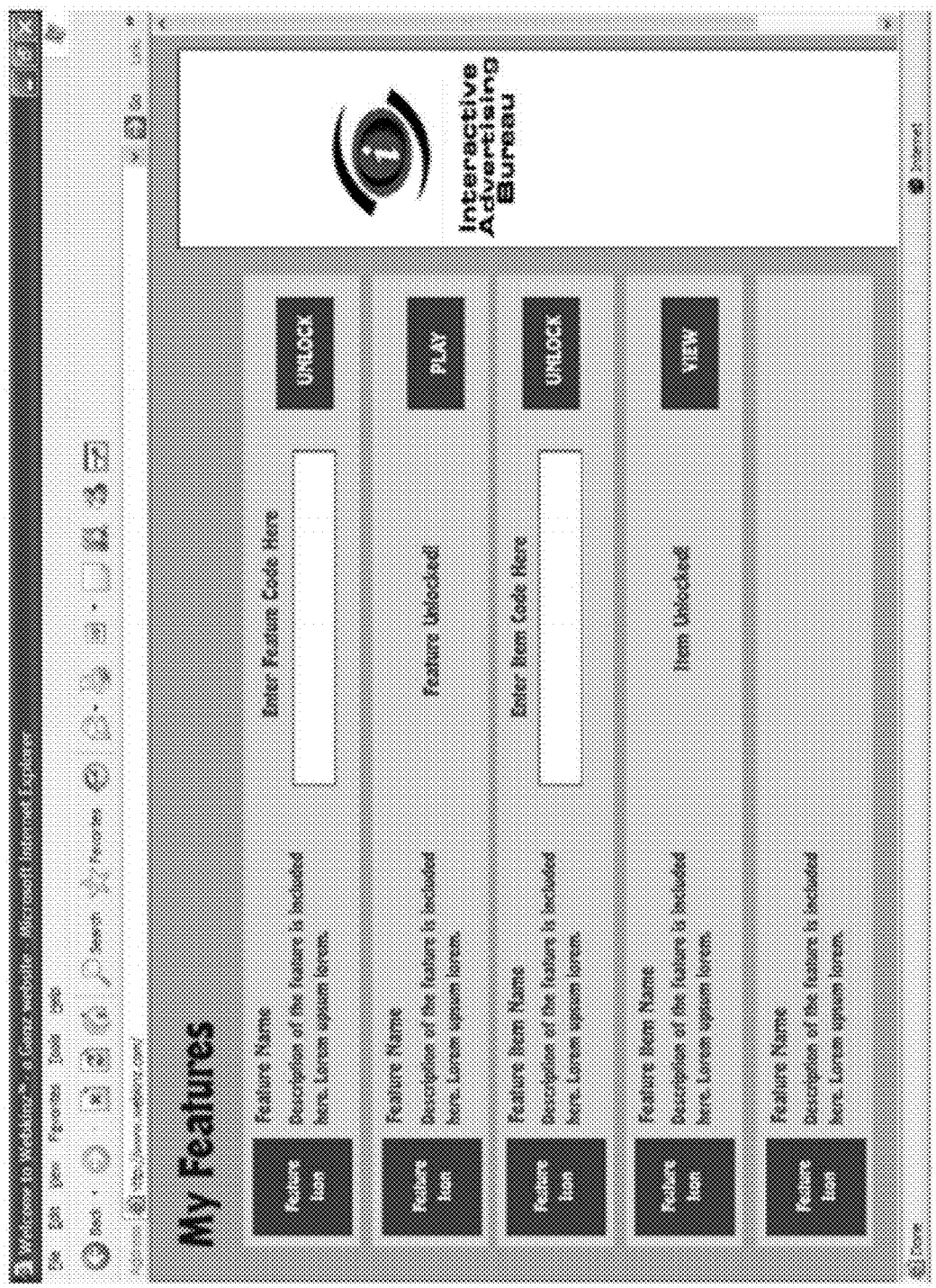
FIG. 10C is an example screen shot of a My Features Page for entering feature codes.

Once logged in or registered, the user could be taken to a My Features page, such as shown by the example of FIG. 10C. Here the user will be able to register their feature codes, regardless of their type. Note that this page can also act as a "Feature Code Collection Page", as it might list all of the peripheral products and/or all of the features that are currently available to unlock. Also note that users may not be required to have a feature code to register as a Feature Code member, so if a user chose to do so, they could register, see all of the exciting features that are offered, then go out and buy a Feature Code product.

Once a code has been registered, that feature will be unlocked and could have a button beside its listing—either Play (for features providing games and activities) or View (for features providing virtual items). For Feature Code members, the Play button would take the user to a game or activity that they can participate in. Once the game or activity is complete, the user could be returned to the My Features page. The view button could take the user to a "Collection Page" which would display all items that the user has collected through feature codes. Because a feature-code user (unlike a full user) has no virtual room for "storing" items, these items cannot be "used". Instead, the user will receive an overview of the Feature Code process. The user can be informed that if they are not currently a full member, that they will need to register as a full member (by purchasing the appropriate toy, for example, and using its registration code) before they can actually "use" their feature code.

The user could be permitted to self-select whether or not they are already a member. Members could then be taken to a login page, and then be taken to the My Features page. Non-members could then be taken to the registration page for registering as a feature code member. The My Features page is thus the core of the Feature Code area. Here, the user will be presented with a scrollable page of all of the unlockable features. If this page grows too long, it could be broken into different sections or multiple pages.

The listing for each feature could include a graphic icon, the name of the feature, and a short (e.g., twenty words or less) description of the feature. Besides each listing could be an area in which the user will be able to type in their feature code. Once the code is entered, the user would click on the Unlock button to open that feature. The code will be validated by the system, and if valid, the page will be updated to indicate that the feature is unlocked. In this case, the code entry box will be replaced with a message that the feature is unlocked and the Unlock button will be replaced by either a Play button (games/activities) or a View button (items). These buttons can then be used to use their unlocked feature.

Figure 11:
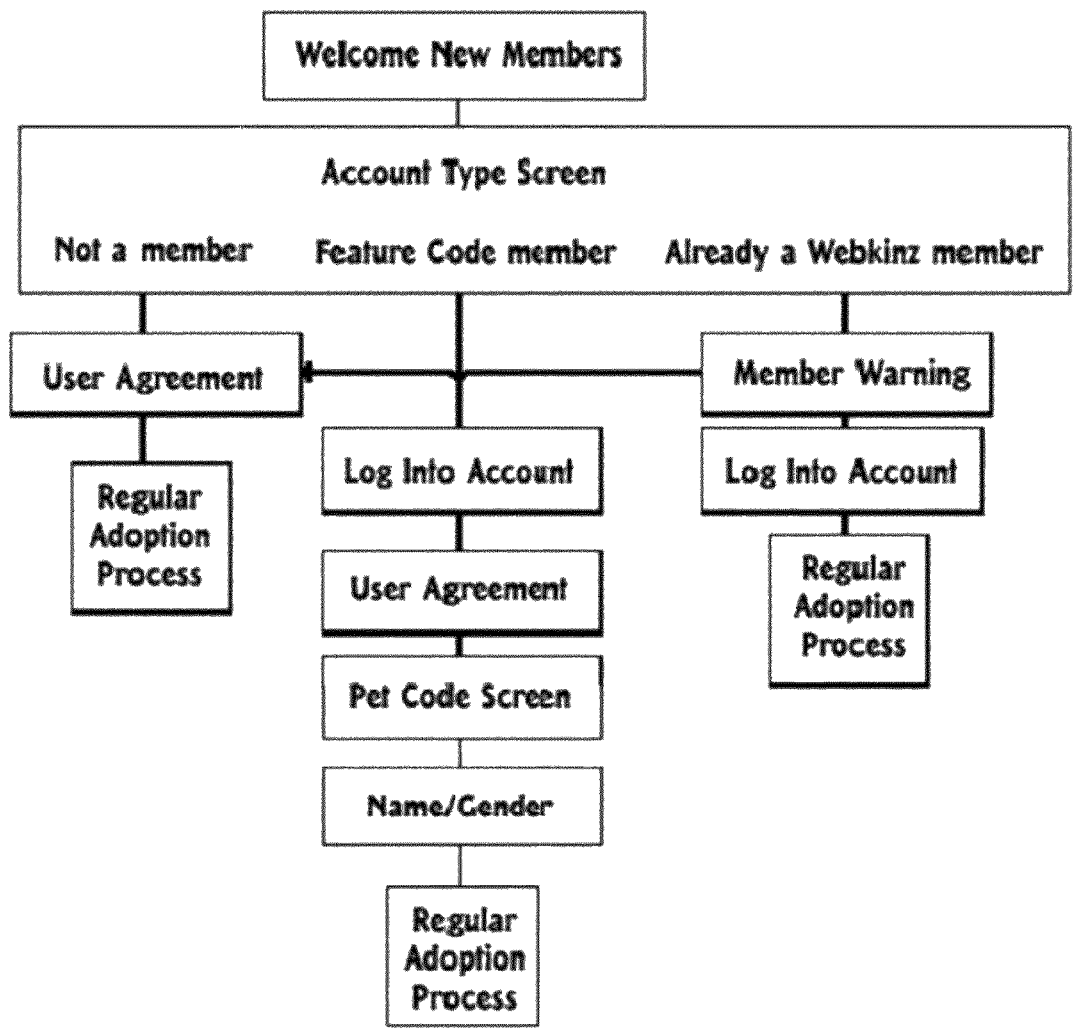
FIG. 11 shows a flow chart of an example process for visiting the site.

In this exemplary embodiment, it is possible to have a limited feature code account without having a fully registered account; and consequently, it should be expected that many feature code members will later decide to obtain or convert to a full account, so that they can have access to more of what the website has to offer. An adoption page, such as the example shown in FIG. 10, can be provided so that Feature Code Members can skip the account registration section (since they are already registered as a limited member) and get right to adopting their pet (provided with the registration code required to obtain the fully registered account). FIG. 11 shows a flow chart of an example process for visiting the site.

Finally, a particular type of feature code—an Item Code—can be used to unlock special, un-purchasable virtual items. These codes could be particularly useful in marketing campaigns and for advertisers.

Additional examples of various features and bonuses that are tied to feature codes (or more narrowly, registration codes) are described in the following sections.

Feature Codes and Bonus Content Examples

Appendix A, incorporated by reference and filed herewith, provides a table applicable to the example embodiment using toys (such as plush animals) discussed in application Ser. No. 11/027,880. This table provides various example feature code categories listing the type of feature code and the details of the bonuses offered for that type of feature code.

For at least one example embodiment, feature codes are special codes that are attached to various products that allow users to unlock various abilities, features, games, and virtual items in an online virtual world, such as discussed above. Examples of a feature codes that might be provided with a product or services, as shown in the examples of FIGS. 9C, 9D, and 9E. These feature codes can be obtained in a manner that is discussed elsewhere in this specification.

Figure 12A:
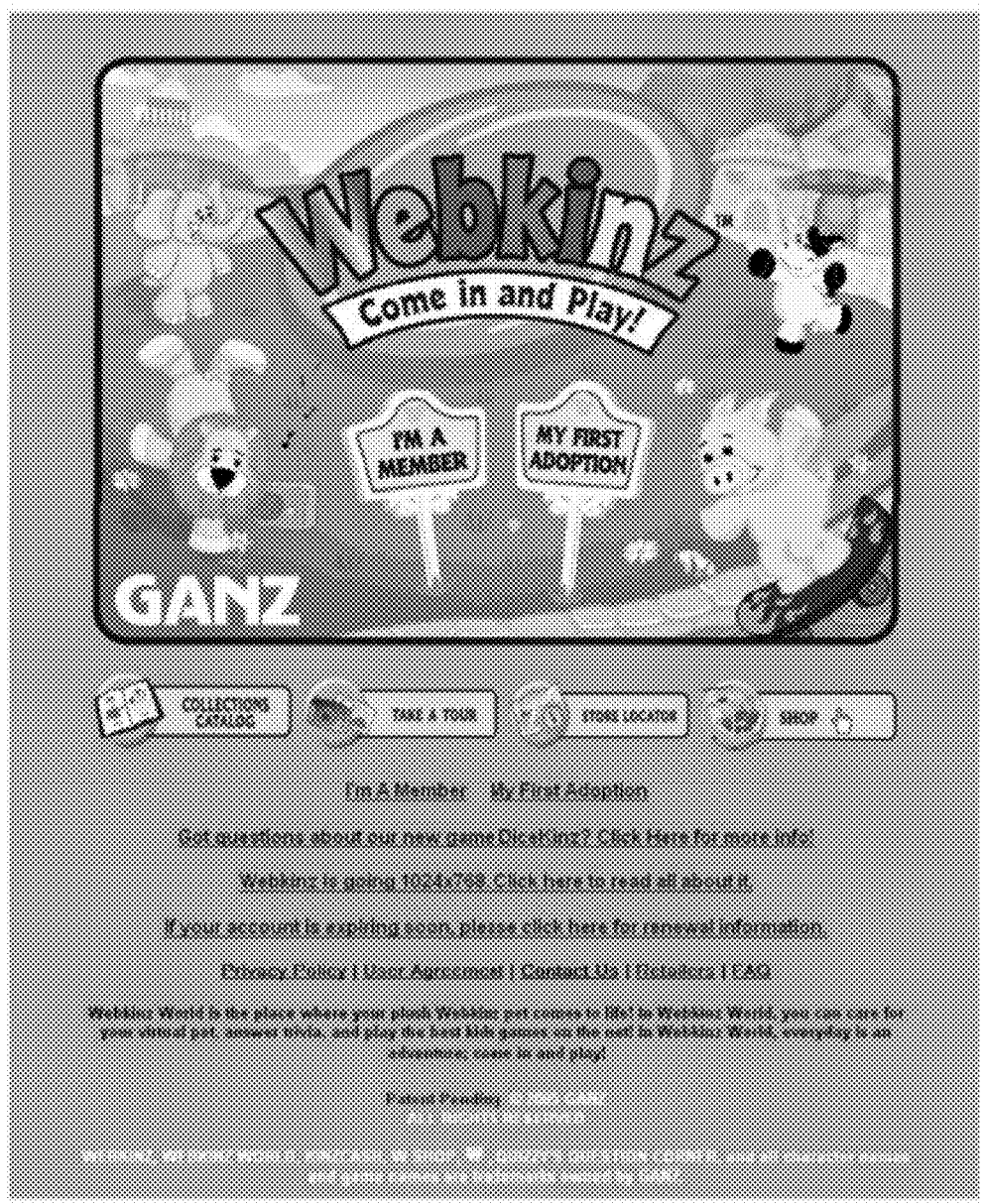
FIG. 12A shows a screen shot of a possible home page of an example embodiment including product catalogs
Figure 12B:
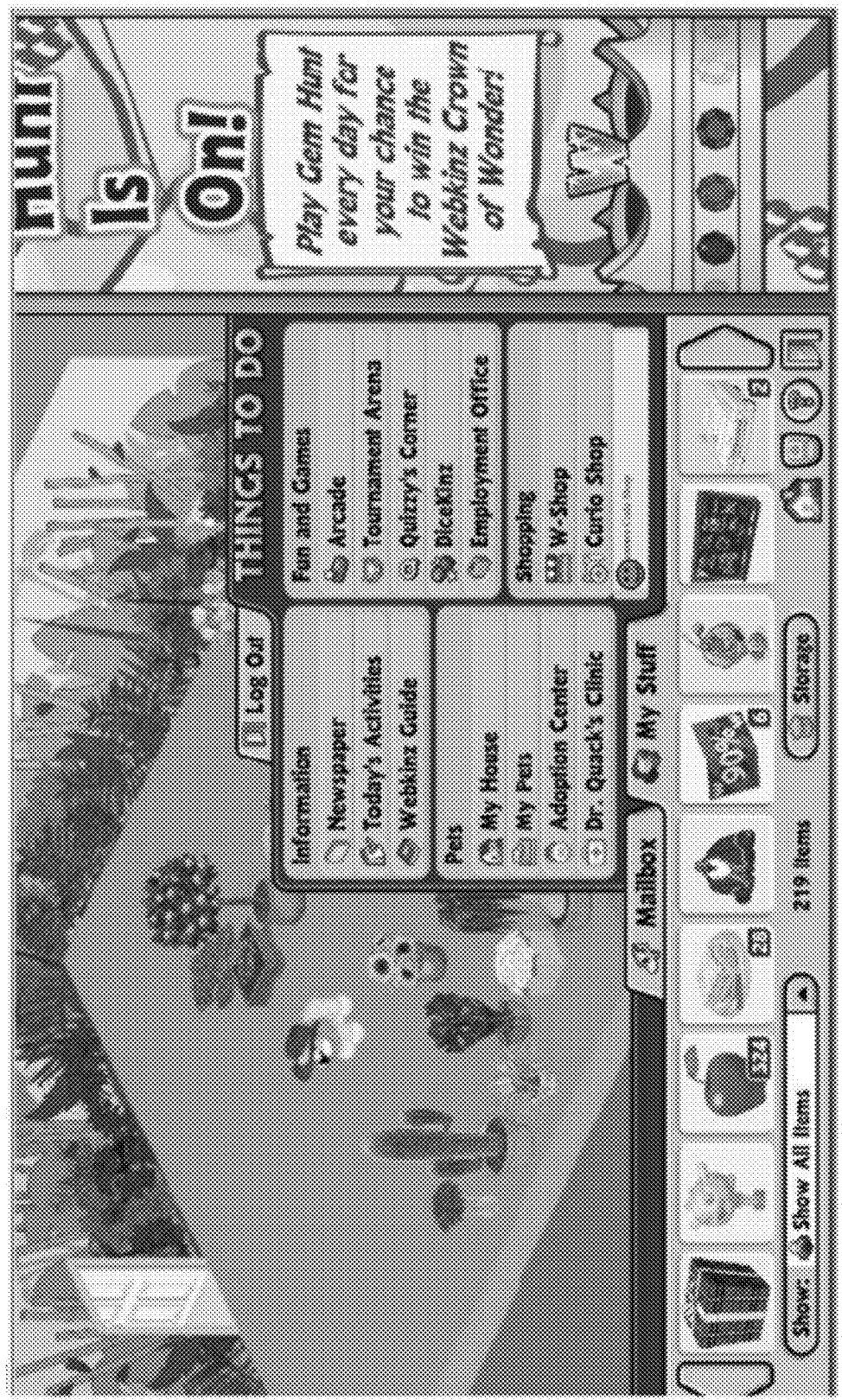
FIG. 12B shows a screen shot of an example pet room with a virtual pet and other virtual items, with a link to a feature code shop in a Things To Do menu.

FIG. 12A shows a screen shot of a possible home page of an example embodiment including product catalogs. As shown in the example screen shot of FIG. 12C, to use a feature code, users can go to a special "Feature Code Area" in the virtual world (an area that the users can access by clicking a "Feature Code Shop" button in a "Things to Do" menu as shown in the example pet room of FIG. 12B) and enter one or more feature codes. The system will notify the users what ability, feature, game or item they have unlocked. Any acquired game, feature, virtual item, or ability may remain on the user's account indefinitely, or may be time limited. Any acquired virtual item (for example, a virtual representation of a purchased product with which the registration code was provided) may remain on the user's account until they use it (in the case of a coupon to obtain some special item, for example, or until the item is consumed such as in the case of virtual food, for example) or sell it, trade it, or otherwise dispose of it. Typically, a feature or registration code is somehow unique (e.g., a unique series of characters) and can only be used once, to avoid in the unauthorized trade of used codes, which would greatly reduce the value of feature codes. After its one-time use, the code cannot be used again, and any attempt to reuse the code, or any entry of an invalid code, could lead to an error message (such as by using a pop-up window notifying the user that the code has already been used or is invalid, respectively). A user who attempts to use too many invalid codes may be warned, or even suspended or his account canceled.

Various help menus can be provided to aid the user in the proper use of feature and registration codes. Customer service will have access to various information about the feature codes and the users to allow additional help or to reactivate codes in special situations (for example, when a code was improperly used by somebody not authorized to use it, and thus it went inadvertently marked as used). Various information can be made available to customer service via access to the website providing the virtual world, or a unique website provided for customer service personnel.

Figure 12D:
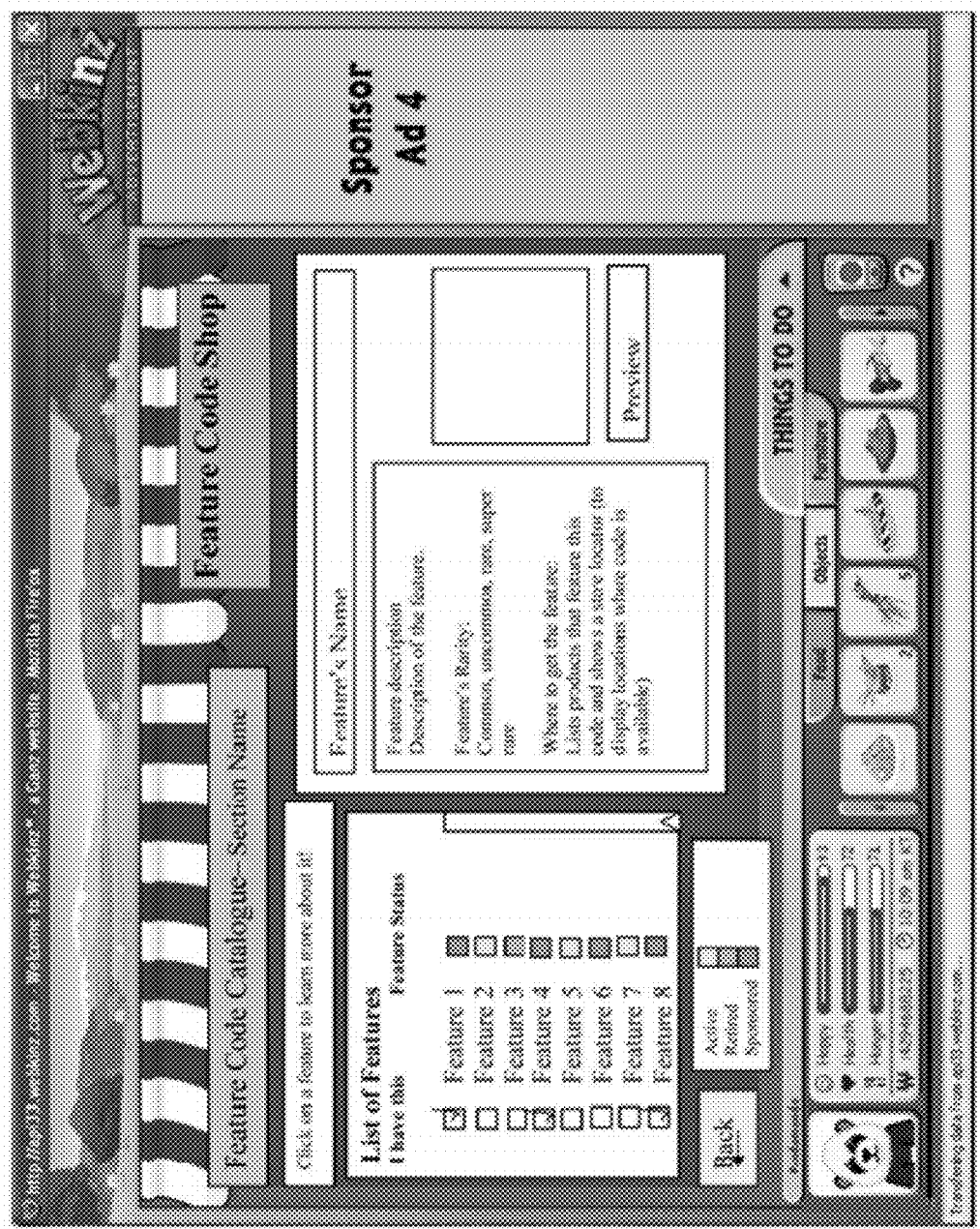
FIG. 12D shows a screen shot of an example page of the Feature Code Shop where available bonus features are listed and described.
Figure 11E:

FIG. 12D shows an example screen shot of a Feature Code Shop that can provide information about available bonus features, features that the user already has activated, and describes how feature codes work. This web page provides features icons that represent various products for sale, Partner promotions, various product series (such as first card series, second card series, etc. for various collecting cards) and links to various other features.

Clicking on any of the icons on the web page can cause a pop up message to occur, explaining the icon. Clicking on the "Unlocked Features" button can take the user to a page of features they have already unlocked, but have not yet used, as shown in the example screen shot of FIG. 12D.

The user enters their feature code in the feature code box and then clicks 'unlock' to use the code and obtain the bonus(es). Feature codes can be provided that are of a certain length, such as between sixteen numbers to eighteen numbers long, for example. If the user enters fewer numbers in the box, the 'unlock' button is not functional. The copy at the top of the screen can be used to explain to the user how to obtain a feature code and how to use the feature code.

A "Feature Code Catalogue", can be displayed at the bottom of the screen. In this example embodiment, the various features/bonuses a user can get are divided into four categories: (1) Items, (2) Abilities, (3) Features, and (4) Downloads. If the user has unlocked a code that has not been used yet (such as a download or a 'create your own recipe' feature), the user will be able to access that in an "Unlocked Features" area, as shown in FIG. 12D. Additional information about the features can be provided to the user as a web page, such as the example screen shot of FIG. 12D. Such a screen can provide a pop-up message, telling the user what feature they've unlocked. An icon of the unlocked feature/virtual cash/item can be displayed in a pop up message.

If a user attempts to use a code that has already been used, a system message pop-up can be provided to inform them that their code has been used. Similarly, if a user attempts to use a code that has been retired (due to an expiration of time, or the retiring of the product or bonus feature), a system message will pop up and inform them that their code has been retired and is no longer valid.

A list of attributes of the features can be provided, including the feature's name, where to get the feature, the feature's rarity, and the description of the feature. Furthermore, the users can be offered a preview of the feature (be it an action, a game, a special feature, virtual cash, or a special virtual item). Such a preview could be provided in a pop up window in response to clicking a preview button, for example.

One process for activating a bonus feature with a feature code can be as follows: The user enters a feature code and clicks "unlock"; if the system determines that the feature code is acceptable and has not been used previously, the system will award the user with the feature the code unlocks. The feature the user has unlocked can be displayed in a pop-up message.

Feature codes can be used to provide one or more of the various special features, including the ability to unlock special pet abilities (ability to walk on two legs, for example), provide an amount of virtual cash, provide special virtual items, and special promotional virtual items. A page such as that shown in FIG. 12D can be used to display many or all of the features within a given category; such as all the features in the Items category, or all the features in the Abilities or Special Features or Downloads categories could be displayed, depending on which category the user clicked on.

Additional information can also be displayed to the user, including one or more of:

Feature Code Catalogue Heading—with section heading next to it (i.e. "Feature Code Catalogue—Items Section"

List of features in a given section—Featured items are listed in the Items section, Featured Abilities are listed in the Abilities section, Featured Downloads are listed in the Downloads section and Special Features are listed in the Special Features section.

If the user has an applied feature, the box next to it can show a checkmark in it. The color of box next to the item can be used to tell the user whether the item or feature is active, retired, or a sponsored item.

The user can click on a feature to find out more about it (the information can be listed on the right side of the screen).

The feature's name can be displayed in a box; beneath that, the feature's: rarity (common, uncommon, rare, super rare), and description (a short note about the feature) and beneath that the user can be told where to get the code for the given feature (e.g., what product(s) to purchase).

Products that come with a code for a give feature and a store locator that shows which stores have products with the given code can be displayed A store locator will work by the user will choosing their country, state, and town to see stores with the given code.

If the feature is an item, an icon of the item can be shown. If the feature is a new game or unlocks features in a given game, the user can be shown a short preview of the game play, if the feature is virtual cash, the user can be shown the virtual cash symbol, if the feature is an action/ability for a virtual toy, the user can be shown a preview of the virtual pet performing the action. If the feature is a download, the user can be shown a picture of the downloadable item.

A feature code look-up tool can be provided to a customer service department to help users identify what feature codes that they have. Customer service representatives will be able to search by username, user ID, or feature code.

Feature codes can also be provided to customers who purchase various products online. In such a situation, Feature Codes can be provided to the purchaser (or user if different from the purchaser) in an electronic format, such as via email, for example, or by displaying the code in a receipt, or downloading a special code for storing on a local machine or device, or by some other means. The products might be provided by the same website that provides the virtual world presentation, or a different website, such as a retail vendor website or the seller of unrelated products.

FIG. 12E shows a screen shot of an example shopping page that could be utilized for offering for sale various peripheral products directly on the entertainment site, in this case the products are all virtual products, extensions or modifications to membership, and account renewals. The various items to be purchased can be added to an online shopping cart that will total up various costs and quantities of products provided. Checkout can be provided by utilizing a credit card, or an online payment system such as PayPal®, for example.

In addition, items can be placed on a wish-list for later purchase. FIG. 10B shows a screen shot of an example page showing a time that was placed in a wish list.

Once an online purchase occurs, the user will be provided with the appropriate feature codes, such as via an email notification. These codes can then be used to register the purchase and obtain the bonus features for use in the entertainment site.

Furthermore, links to additional product vendors can be provided as well. A store locator function can be utilized to show the user which stores are close to the user's location.

Charms Forest

As described above, one item that may be purchased and used to change the appearance of the virtual item is a charm. The feature code obtained from registering the charm may provide access to a special area called the charms forest. In this embodiment, the access to the special area is determined based on how many items the user has purchased. In addition, there may be a non linear relation between the number of items purchased and the access provided. For example, purchasing two items may provide more access than double the purchase of a single item.

The Charms Forest is a unique blend of real-world product collection (charms), feature codes, and a special online activity. By collecting a line of charms with a feature code (such as a registration code hidden in the packaging of the charm, for example), existing members having an online account (such as one obtained by previously registering a toy having a registration code, such as a plush animal) can use the code to unlock a special activity in a virtual world, such as a magical "Charms Forest" where virtual charms can be collected for virtual cash and other prize bonuses, for example.

The Charms Forest would be an area in the virtual world of the user which will require the purchase of one or more "real world" products (e.g., "charms") to gain access to the bonus materials. The natural collection element of the product will be boosted by the virtual collection activity it will unlock for consumers (the user collects both real and virtual charms). And in turn, the desire for more access to the activity will drive sales for even more "real world" charms.

Figure 13A:
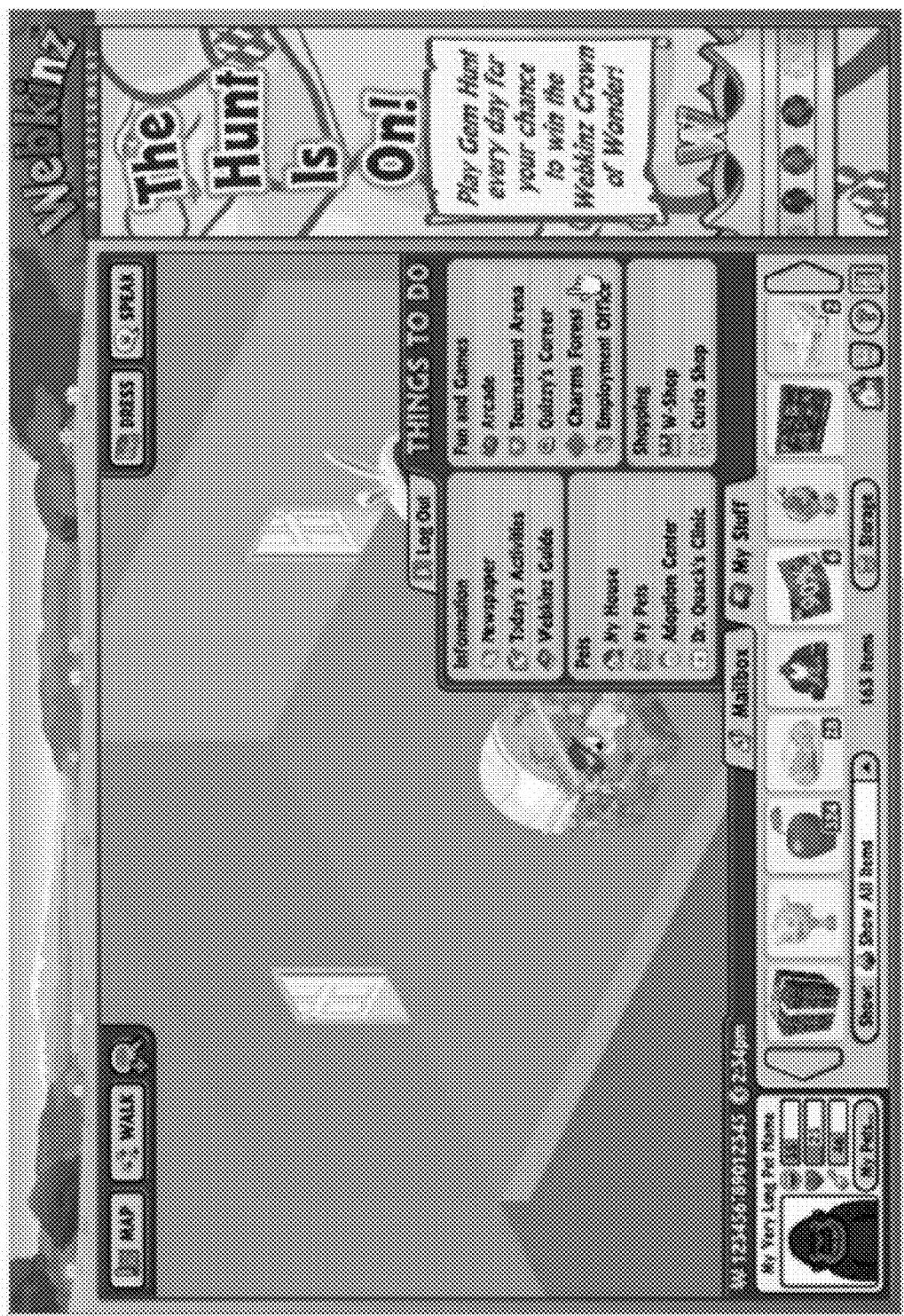
FIG. 13A shows a screen shot of another example pet room with a virtual pet and other virtual items and a link to a Charms Forest in the Things To Do menu.

For example, a "Series 1" charm bracelet could feature twenty-four real-world collectable charms. Purchasing just one of these charms could give the consumer a registration code to unlock their access to the Charms Forest (but the user would typically need an existing website membership to activate the code). Once the member unlocks the code in the feature code shop, they could get a virtual charm and a "Charms Forest" link, such as in a "Things to Do" menu as shown in the user's virtual room—see FIG. 13A, for an example screen shot.

With each real-world charm purchased, the accompanying registration code could, for example, unlock one row of five virtual collectable charms which can be found in the "Series 1" area of the Charms Forest. There can be, for example, a total of eight unlockable charm rows, for a total of 40 virtual collectable charms. Collecting a total of sixteen real-world charms could then earn the member a special virtual item, and collecting a total of twenty-four real-world charms could earn the member a SUPER-special virtual item. In addition, virtual cash and access to virtual games could be provided as well, for example. Thus, the purchase of additional real-world charms is encouraged.

With each new bracelet series, a new section in the Charms Forest can be opened up for searching, with, for example, a new set of 40 collectable virtual charms, so the activity itself can be continually expanded upon.

Figure 13C:
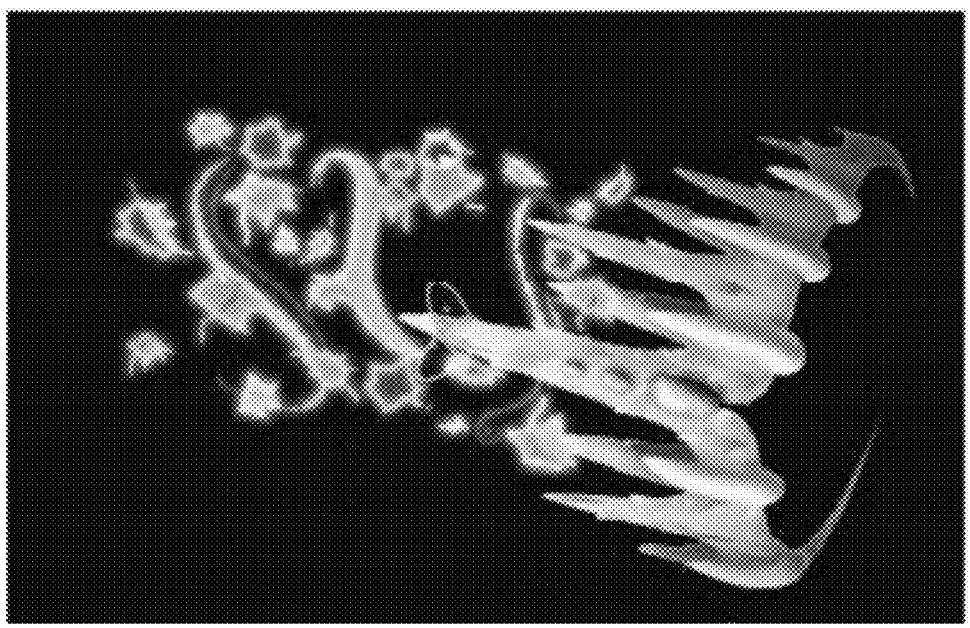
FIG. 13C is an image of a virtual tiara that can be a bonus feature.

Collecting all five of the virtual charms in one unlocked row could, for example, earn the member a virtual cash bonus. For each subsequent row completed, the virtual case bonus can grow. For the last four completed rows, the member could earn exclusive Charms Forest virtual items as a bonus instead of, or in addition to, virtual cash. For collecting all 40 virtual charms, the member could win a virtual trophy, such as a virtual tiara that can be worn by a virtual pet, as shown in FIG. 13C, for example, which could animate in a simple continuous cycle, for example.

Once the user (member) clicks on the link to the Charms Forest, the user will get access to special content, such as via an example a splash page as shown in the screen shot of FIG. 13B, for example, which could show a top-over map view of the entire Magical Charms Forest. One small highlighted section of the forest will indicate the "Series 1" area which has been opened up to search. The remainder of the forest can remain "unexplored" and thus unlabelled for options in future theme expansion.

To increase visitations, the member can be limited on getting access to a highlighted area of the forest to search for virtual charms for limited periods, such as once every six hours, for example. A countdown timer can be provided on this map splash page to help the member track when next they can search.

Figure 13D:
FIG. 13D is a screen shot of an example entrance to the Charms forest showing four possible pats.

When the member accesses an activity, they can be provided, for example, with a ground-level view from a clearing looking towards a dense magical forest of trees. There can be provided a plurality (e.g., four or five) of pathway openings into the trees to enter a charms forest, each with a different magical design theme to them, such as shown in FIG. 13D, which shows four possible paths.

Different scenarios could be utilized to provide virtual charms. For example, in one possible scenario, only one virtual charm from each of the eight unlockable rows could be provided down each path into the forest. Until a member buys their next real-world charm, they will only be able to find that one virtual charm per pathway (thus potentially provided five virtual charms if there are five pathways, for example). If the member buys eight real-world charms, for example, they will be able to find up to eight virtual charms down each pathway.

The theme of each forest pathway entrance could be unique, such as being tied to a different earth element. Thus, for the above example, each of the eight unlockable rows could have one virtual charm from each element, so each row of charms will have five different elements. Members could then be required to figure out, by the charms' names, which element each charm belongs to so they know down which pathway to search. As a further complication, the pathways might not have any names, but their design would instead suggest which earth element they represent, adding a further element of mystery to the implementation.

Further to the above example, when the member chooses a path to search, they could come to another small clearing designed in the appropriate elemental theme. The member could be given the ability to look to their left or right in 180 degree panorama. Distributed along this view could be a number of different magical interactive elements (e.g., four), for example: a Charmling Tree, a door, a genie in a lamp and a magic mirror.

The virtual charms themselves can be hidden inside "kernels" which normally grow in the Charmling Tree, for example. Fairies could be made to "fly" up and harvest the kernels and store them in a storeroom behind the door. A magic mirror and a genie in the lamp can also grant charm kernels. Like the pearl inside a clam, it could be made that not all charm kernels contain actual charms, with some only containing virtual sparkling charm "candy", or some other gag gift, or they may contain nothing at all (but perhaps a magic "poof").

The odds of a charm appearing in a kernel could be made constant, or variable. If a fixed number of charms are available, getting more charm kernels during their search increases their chances of getting one with an actual charm. Only the charms from the rows unlocked by the member can appear in their search. When the charm kernels appear, the member needs to click on them in order to crack them open and reveal their interior contents.

Each one of these interactive elements could require a specific tool to interact with it. At the beginning, the member might have only a single tool, such as a magic wand, which would only work on the fairies, for example. In order to get one of the other tools, the member would have to watch for randomly-appearing fast-moving fairies carrying little rucksacks. Clicking on the small area around the rucksack with their wand will cause them to drop a virtual item that is "in" the bag. The fairies could drop either a tool or a kernel, for example. The fairies might, for example, only carry one item at a time, so if they drop a kernel, they will only drop one. If the fairy drops a tool, the user could then use it to get access to one of the magic interactive elements which dispense slightly higher amounts of charm kernels, for example.

Once a fairy drops something, it could be provided that no other fairies will appear so the member will only get one item per search. Once the user picks up the tool, they may need to figure out where to use it through common sense intuition, or instructions for use might be provided.

Whenever the user finds a charm, it could be provided that a roll of dark blue velvet will unfurl to reveal eight charm bracelets with open spaces to hook on their charms. The member with locked rows will see some of their charm bracelets grayed out and inactive. Purchasing eight real-world charms will show all eight bracelets in full color. For example, in between navigation buttons could be provided an image of a velvet pouch roll with a colored ribbon tied around it, labeled "My Charm Collection". Clicking on this will trigger a pop-up showing the member's charm collection.

For example, it could be provided that a member would only find one charm per search. Duplicate charms could be traded for virtual cash, for example. The user could also, for example, keep any Sparkling Charm candy they find which might have a low virtual cash value, and perhaps provide happiness and/or hunger parameters for impacting the status of the virtual pet(s).

There might be a certain number (e.g., twenty) of available fairies floating in the forest along a particular path. The fairies can be of different sizes. The user is only able to choose one by clicking on the fairy. Once the member clicks on a fairy with their wand (or other device), the fairy could be made to fly up close to the center of the screen and shake their own wand with a magical flourish (all other buttons might be frozen out at this point). After the magical flourish, the fairy could be made to disappear, and be replaced with one of three results, each with a different meaning.

For example, if the member clicked on a bad fairy, that means they have received no "Pixie Pods" in their search (a pixie pod is an item that contains a bonus item or a gag item inside that is released when the pod is activated). If they get a single Pixie Pod, that could be the only one they will get for that search. If the user gets a key, they could be prompted by a system message to pick it up and use it to search the forest for one of three hidden doors with larger quantities of Pixie Pods, for example. The distribution of these three options can be randomly assigned to each of the number (e.g., twenty) of fairies upon the member's entry to the path.

In the event the member receives a key, the member could be prompted by a system message to click on it with their wand in order to pick it up. They will need to roll their key over one of three randomly-hidden invisible doors (in random sizes) in order to make them appear. Once they have rolled over an area of the screen where a door is hidden, that door will remain visible for the remainder of the search, so the member would be able to reveal all three doors before choosing between them. The potential door appearance areas could, for example, require twelve pre-designed targets.

For example, the member could choose a door simply by clicking on it with their key. Once they do so, the door will open with a magical flourish and disappear, leaving behind a certain number of Pixie Pods. The number of Pixie Pods behind each door would likely be pre-determined by a previous server database call (on path entry), using a certain occurrence percentage applied to each door individually (so all three doors could potentially contain the same number of Pixie Pods, for example).

As a further example, once the number of Pixie Pods has been revealed, the member could be prompted with a system message to click on them one by one to reveal what is inside (with the key turning back into a wand). At this point, another call could be made and what is inside each Pixie Pod will be randomly determined and recorded on the server database (along with any milestone bonuses), so if a server disconnect occurs afterwards, the member will find those items already in their dock or in their collection the next time they log in. Since the member can't see their dock or collection during the activity all that really normally occurs on the client side is a simple interactive reveal.

To ensure that the member doesn't miss when a new charm is added, a special "congratulations" system message flag should be added to the member's "Forest Charm" collection the next time it opens (either within the activity or with the member's isometric room version). Since the charms are an important collection item, they could be the only Pixie Pod prize item which will require this special flag. Bonuses could be awarded for collection milestones (i.e.: full rows of Forest Charms) and also have their own unique congratulations system message flag.

The percentage chance of finding a charm inside a Pixie Pod could be made variable depending upon the number of rows the member has unlocked. Other items could also be able to be found inside the Pixie Pods with various values and percentages, such as: a virtual cash coin; a souvenir "I visited the Magical Charm Forest" T-Shirt; Charm Candy; and Sap Glop. Sap Glop is an item which has no value (a gag item) and cannot be removed from the activity.

The percentage probability can be assigned to each Pixie Pod individually, so it could possible to find anywhere from one to five charms during a single search, for example. Only charms from unlocked rows might be made available to be part of the pool of charms found down each appropriate path.

If a member already has a revealed charm in their collection, after they click the "OK" button, they could get a new system message informing them that the charm has been automatically converted into virtual cash for them.

As a further example, once a Pixie Pod has been clicked on, that individual Pixie Pod could be made to begin to shudder and crack open, before disappearing completely and the resulting icon appearing in a message window above. Once the message window appears, all other Pixie Pods will be frozen out until the member clicks the "OK" button to close the message window. If the member doesn't find any charms they will receive a system message telling them come back in six hours to search again. If the member has found at least one charm after opening all of their Pixie Pods, clicking the final "OK" button will trigger a pop-up, unfurling a roll of dark velvet to reveal their "Forest Charm" collection. All new-found charms could appear in the correct position. After a charm animates into the collection, the user could see flagged "congratulations" system messages (for completed rows). Members could be able to view their collection at any time in the activity when the link is not frozen out. Even if the member does not have any virtual charms, they might be allowed to open up the collection interface.

Figure 13E:
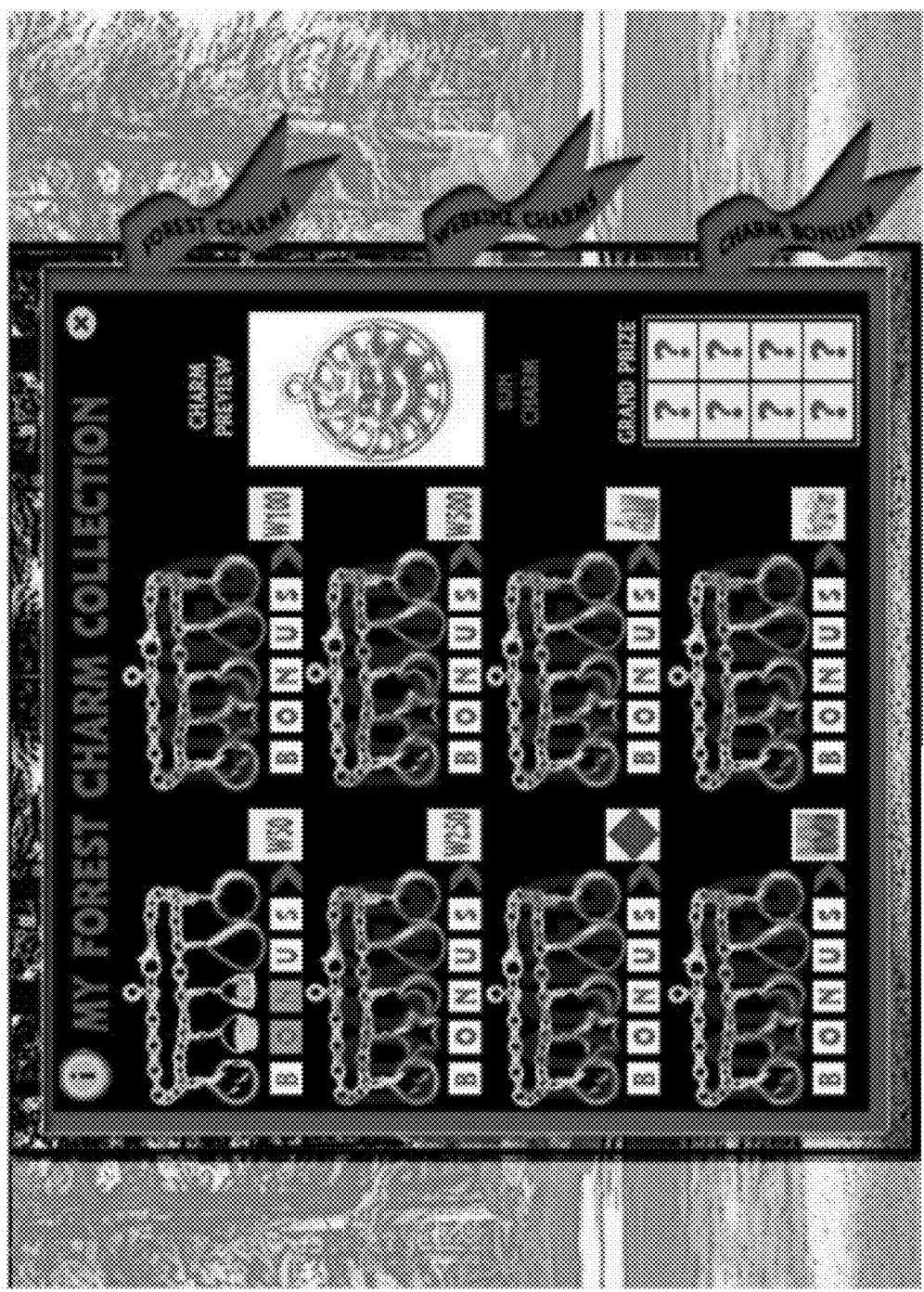
FIG. 13E is a screen shot showing an example charm collection with two virtual charms added with placeholders for additional charms.

FIG. 13E shows an example screen shot showing a charm collection with two virtual charms added. The collection interface is an unfurled roll of black velvet with three ribbons acting as page tabs. The tabs are labeled top to bottom as follows: "FOREST CHARMS" for the member's collected virtual charms; "WEBKINZ CHARMS" for the member's collected real-world charms; and "CHARM BONUSES" with a chart listing all bonuses for types of charms. These various features are discussed in more detail in application Ser. No. 60/946,829, incorporated herein by reference.

Continuing with the example, once a member chooses a particular path, their turn will be registered as taken on that server call and the six hour countdown before their next turn will begin. An isometric version of the Charm Collection could be created for members to be viewed in their pet's room. The user could receive it in their dock when they unlock the Charm Forest activity. The isometric version of the member's collection could appear as an actual "Charm Tree", but when the user clicks on it, the velvet roll interface will appear opened on the charms page tab (with all other tabs also available for viewing). Furthermore, when a visiting member opens up the isometric Charm Tree, they will see the owner's collection of charms—NOT the visiting member's collection.

Figure 13F:
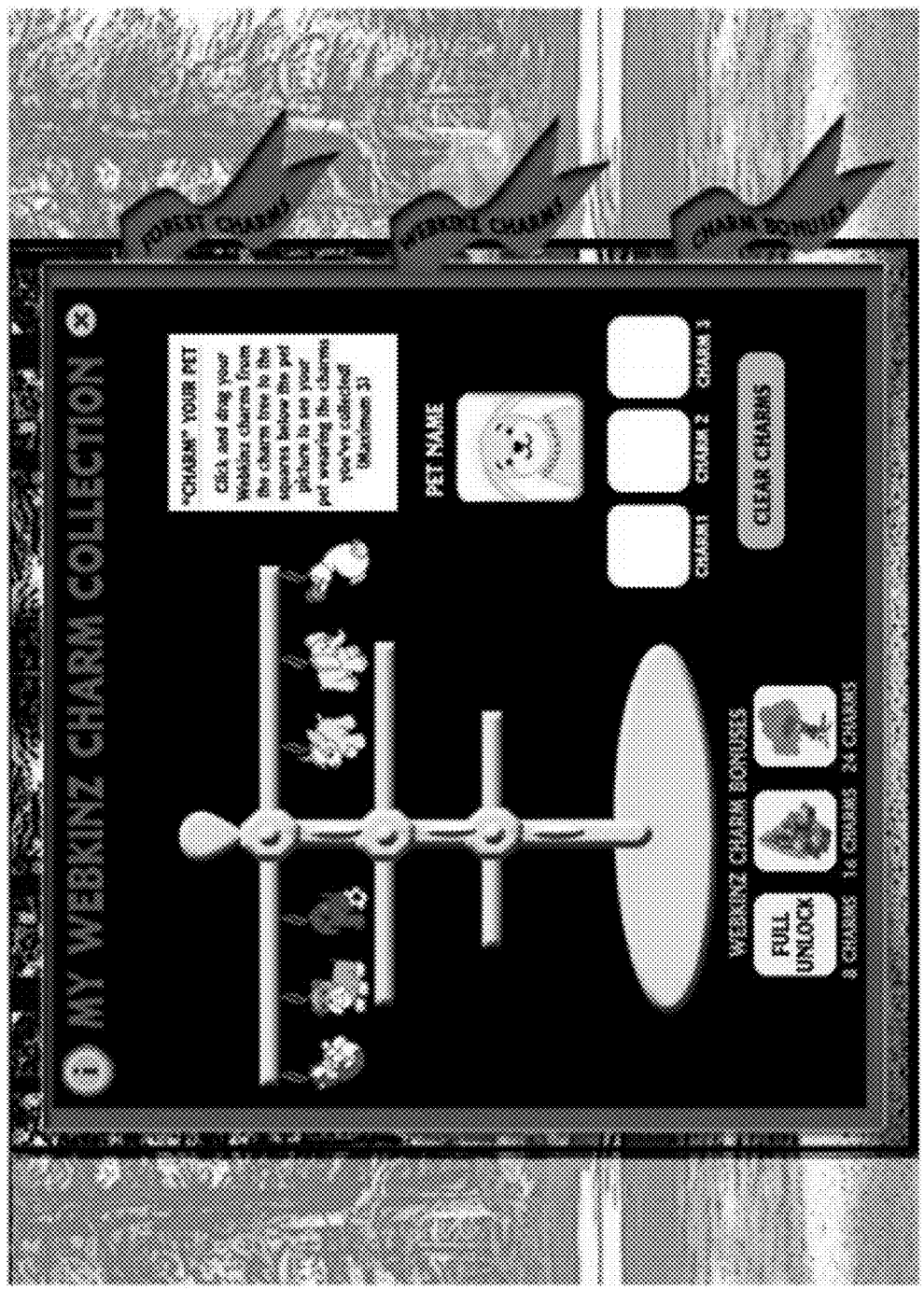
FIG. 13F is a screen shot showing an example charm tree with a plurality of virtual charms added with room for adding additional charms.

An example screen shot of a Charm Tree is shown in FIG. 13F. In this example, the Charm Tree interface on the "WEBKINZ CHARMS" page tab will be a single pole on a stand with three bisecting "branches" of decreasing length running through three rotation knuckles. The top branch will have three spots for charms on both the left and right side. The middle branch will have two spots for charms on both the left and right side. The bottom branch will have one spot for a charm on both the left and right side. This means that at any one time, the most the charms the member can see on the tree is twelve. However, by clicking on the top rotation knob button interface, they can "rotate" the tree to show their other twelve charms. Clicking on the rotation knob simply switches the displayed Webkinz® Charms from a "View A" to a "View B".

Initially, charms could be added to the charm tree in the first available open space searching left to right, top to bottom, checking "View A" before moving on to "View B". However, members will inevitably want to have the ability to re-arrange the charms on the tree. Thus the member could have the ability to simply click and drag their charm icons to any of the other target areas and have them "hook on" there instead. If another charm already occupies that target, it will be switched out and moved to the empty space where the other charm was dragged from. Under the Charm Tree will be three squares titled "WEBKINZ CHARM BONUSES". Each square will show one of the three milestone bonuses the member receives for collecting eight, sixteen and twenty-four Webkinz® Charms. Once each of these milestones has been reached, the corresponding square will change color to green. To the right of the Charm Tree will be an interface where members can click and drag charms they've collected to be worn on a necklace around their virtual pet picture's neck. Above this interface is the instructional text titled "CHARM YOUR PET", with the main text reading, "Click and drag charms from the Charm Tree to the squares below the pet picture to see your pet wearing the charms you've collected! (Maximum 3)". Below the instructional text will be the pet picture in the same size as the one in the member's dock, except with a chain necklace around its neck. Three dock squares appear under the pet picture where member can click and drag their charm icons. Dropping a charm icon in one of the squares will create a duplicate copy in the square and another smaller copy appears on one of three locations on the chain around the pet's neck. All of the same switching rules apply, but at any time if the member wants to quickly clear out their selection, a "CLEAR CHARMS" button interface will appear under these dock squares. Once the member closes the Charm Collection interface, their Charm "dressing" choices will be registered and the same chain and charms will appear on the member's regular dock pet picture. Members will not be able to rotate their Charm Tree or move Charms to "View B" until they have collected more than twelve Webkinz® Charms. Once members have collected more than twelve charms they can move them to "View B" by clicking and dragging them over the rotation knob. Dragging a Webkinz® Charm icon over the rotation knob button interface target area automatically rotates the Charm Tree from "View A" to "View B" and vice-versa. The switching rules still apply, with the view remaining wherever the member finally drops the icon. Once the member collects more than twelve Webkinz® Charms, they will also see the text: "CLICK TOP KNOB TO ROTATE CHARM TREE COLLECTION" with two rotation arrows appearing above their Charm Tree. Clicking and dragging the Charm icons simply creates a 50% transparent copy until an end destination has been determined.

An Example logic chart for the example charms forest is provided in FIG. 14.

Trading Cards: Trading cards, also discussed above, can be provided based on many of the features, toys, etc. that are provided to the user. Cards might also be used to represent sports figures, special games, etc. These cards provide a collectable retail product based on the retail toys and the online features. In addition, online versions of games can be provided that utilize virtual versions of playing cards that may be the same, or different, than the cards sold retail.

Additional Embodiments

The concepts described herein are not limited to the use with plush animals, or even toys. These concepts could be provided to various types of products, such as figurines, adult collectibles, sports products, games, etc. Two additional examples follow:

Recruit a Warrior: A user can purchase a retail figurine of a warrior. An included registration code can then allow the user to "recruit" that warrior to their stable of fighters (e.g., additional virtual warriors, some of which may have been obtained using a registration code from a retail-purchased figurine, and some of which might have been purchased online). The user can the then train the virtual warriors (using techniques discussed elsewhere in this document, e.g. via purchase, features codes, or additional techniques such as training activities, for example). These warriors can be used for dueling and battles against other virtual warriors owned by other users, for example, or used in games, etc. in a manner similar to the examples discussed above.

Sports Activities: A user can purchase a retail figurine or other product representing an actual, or fantasy, sports figure, or a pack of cards (such as baseball cards, football cards, etc. where actual players and/or professional teams might be featured, for example). A registration code included with the purchased product can be used to add one or more virtual players based on the purchased figurine or cards to the user's team roster and/or add the player type to the user's available virtual players (e.g., purchase a Quarterback figure and the user could be provided a code to unlock the "Star Quarterback" position for the user's team). Cards (and associated registration code(s)) might be used to make whole teams available, for example.

Warriors, Players and/or Teams can all be traded and/or sold to other user site members using their respective sites. For example, this could allow a "master trainer" to build an ultimate warrior and then sell it to another user who does not wish to put the effort into training. Similarly, a user could build a championship sports team using the virtual sports figures, and could sell it to a new owner who just wants to start at the top. Users could trade various virtual players to obtain specific needed skills for their teams, for example, to improve their teams.

The virtual sports teams could then be used to play virtual games against other users having similar virtual sports teams, with the various virtual players having different skill levels based on the activities the user used to build up his player's skill levels. Thus, users who spend the time and effort to build up their players' skills might win more games, for example, and those that don't do as well might trade for, or purchase, other players to improve their virtual teams (or provide training to their players to improve the players' individual skills).

The invention has been described hereinabove using specific examples; however, it will be understood by those skilled in the art that various alternatives may be used and equivalents may be substituted for elements or steps described herein, without deviating from the scope of the invention. Modifications may be provided to adapt the invention to a particular situation or to particular needs without departing from the scope of the invention. It is intended that the invention not be limited to the particular implementation described herein, but that the claims be given their broadest interpretation to cover all embodiments, literal or equivalent, covered thereby.

APPENDIX A

| Feature Code Shop Category | Type of Feature Code | Details |
| --- | --- | --- |
| Item | Money (virtual cash) | The amount of virtual case the user has unlocked is shown in a pop up message box with the words, for example: "Congratulations! You've unlocked X KinzCash!" The user gets the money once (as soon as they use - unlock - the code). |
| Special Feature | Subscription | The user gets a certain item or virtual cash for a given number of log ins; the user can only get the item once a day or once a week, for example, and the user has to go online to the site to get the item. For example, if the subscription is for watermelon for 20 days, the user gets a watermelon for each of the next 20 days they visit Webkinz World ®. Every time they're awarded the item, they see a pop up message box with the words, for example: "You've been awarded your X of the day! You've got X more X to collect!" |
| Item | Item | The user can unlock one item or multiple items. If the user unlocks multiple items, the items can be random or from a specific theme or group. The multiple items can have different item I.D.s.<br>The user will receive the item(s) as soon as they use the feature code. Items can be common or rare. |
| Download | Downloadable | The user gets to download a special feature; a ring tone, desk top wallpaper, or pictures of the Webkinz ®, for example. Upon entering the feature code, the user will see a pop up message box that says, for example: "Congratulations! You've unlocked a downloadable x! To download this feature, click here."<br>IF the user chooses NOT to download the feature at this point, they will receive a message that says "To download this feature in the future, just visit the "Unlocked" section of the Feature Code Shop." |
| Ability | Feature | The user gets special features for their virtual pets: e.g., extra big or small virtual pets or special skills for their virtual pet. When the user unlocks this type of feature, they will see a pop up message box that says, for example: "Congratulations! You've unlocked a special feature for your Webkinz ®. You've unlocked the X feature! You can see this feature on the modes menu in the 'My Options' section of the 'My Pets' area." These skills (or modes) are added to a modes menu in a "My Options" section of the "My Pets" area. Special skills can include, for example:<br>Big head - the virtual pet's head appears at twice the normal size.<br>Double speed - the virtual pet moves at twice the normal speed.<br>Invisible - the virtual pet's clothes appear, but the pet does not.<br>Screaming Bubbles - these bubbles replace the usual |

APPENDIX A-continued

| Feature Code Shop Category | Type of Feature Code | Details |
|---|---|---|
| | | thought bubbles with scream bubbles.<br>KinzChat Bubble Balloons - This is a cool looking speech balloon that others can see in a Chat function.<br>Tiny mode - The virtual pets appear at 50% of their normal size.<br>Such features could function in multiuse mode where additional users having access can see the skills. Typically, none of the features affect the virtual pet's picture as shown in the dock, only the virtual pet in the user's room is affected. |
| Ability | Action | The user will unlock one special ability (e.g., an action their virtual pet can perform). The user will be able to trigger these actions by going to the new 'action palette' in the dock. Actions can include one or more of the virtual pet:<br>Rolling over<br>Begging<br>Doing a back flip<br>Dancing<br>Blowing kisses<br>Giggling<br>Doing a handstand<br>When the user unlocks one of these features, they will see a pop up message that says, for example: "Congratulations! Your Webkinz ® has gained a new skill! Your Webkinz ® can [name of skill]. To use this skill, go to the 'actions' part of your dock and click on the action you'd like your virtual pet to do!" |
| Special feature | Instant Play | The user gets an extra chance to play a game as soon as they use the feature code.<br>When the user unlocks this ability, they will see a pop up message box that says, for example, "Congratulations! You've unlocked the ability to get an extra spin on X! Visit X to use your extra spin!" The user must use the spin within the same session. If they log out before using the spin, they will lose it. There could be a "Go here now" button for the user to get to the bonus game. If the user does not click the "go here now" button and attempts to close the box, they will get an error message that says, for example: "You must use your extra spin before you log out, or you will lose your chance." |
| Special feature | Curio Shop | The user gets extra points on a Curio Shop status. This helps to get to know them better. Most users will get enough points (e.g., about 500) to push them into insider status. When the user unlocks this feature, they will see a pop up message box, such as one that says, for example: "Congratulations! Your Curio Shop status has improved! Arte knows you better than before!" |
| Special feature | Account Extension | The user gets between a 1 and 6 month extension on their account, starting from the day they use the feature code. When the user unlocks this feature, they will see a pop up message box that says, for example: "Congratulations! Your entire account has been extended for another X months! Check the "My Options" page to find your new expiry date!" |
| Ability | Chatting | User gets special "Shout out Pro" chat (e.g., added to a rap section) and smiley faces to use in the chat feature. This new section will appear in a rap section of the chat. For example, there can be four codes that unlock these features. The user gets 5 new sayings or smiley faces with each of the four codes (a maximum of 20 new smiley faces/shout outs).<br>When the user unlocks this feature, they could see a pop up message box that says, for example: "Congratulations! You've unlocked some special chat features! We've added X [feature name] to the Rap section of your chat! Have fun!" |
| Item | Badges | Special badges are unlocked; these can be used on the "My Profile" page. For example, the user can unlock 1-3 badges. When the user unlocks this feature, they will see a pop up message box that says, for example: "Congratulations! You've unlocked (a) badge(s)! Check out the "My Profile" page to see your badge(s)!" |
| Item | Taglines | Special taglines are unlocked when the user uses the feature code. These taglines can be used on the "My Profile" page. Users can unlock 1-3 taglines.<br>When the user unlocks this feature, they will see a pop up message box that says, for example: "Congratulations! You've unlocked (a) tagline(s)! Check out the "My Profile" page to see your new tagline(s)! Click "Go there now!" to go there now!" A "Go there now" button can be provided on this page. |
| Item | Backgrounds | Special backgrounds are unlocked when the user uses the feature code. These backgrounds can be used on the "My Profile" page. Users can only unlock one background at a time. When the user unlocks this feature, they will see a pop up |

APPENDIX A-continued

| Feature Code Shop Category | Type of Feature Code | Details |
|---|---|---|
| | | message box that says, for example: "Congratulations! You've unlocked a special background! Visit the Feature Code Shop's unlocked section to see your new backgrounds! A "Go there now" button can be provided on this page. |
| Special Feature | Game unlocks | Extra levels to games, new games, and special features in games are unlocked by these codes. Any unlocked features will appear in the arcade. You can turn the unlocked version off (and play the old version) by visiting the "My Options" page. When a user plays an unlocked game in the Tournament Arena, their opponent will also play this version of the game. When the user unlocks this feature, they will see a pop up message box that says, for example: "Congratulations! You've unlocked FEATURE name! To use this new feature, just play GAME NAME!" |
| Unique experience | Create your own recipe | When the user unlocks this feature, they will be able to create their own picture of a recipe. The user will read a description and a list of ingredients we give them, and then the user will have to be able to scan in their picture of the recipe and submit it to us. If the picture is appropriate, our artists will create their recipe and award it to them (this is done within a month; this code is very rare due to the time involved in creating the recipes). The recipe will be added to the "winners" section of the cookbook. The user needs to have the ability to access this feature after they've opened it (they do not have to use the feature right away). This feature can appear in the "unlocked" section of the Feature Code Shop; the user just has to choose the "Create recipe" option to create their recipe. Until the user submits something, this feature remains active (even if they open it and close the submission window). As soon as the user submits a recipe, this option is removed from the 'unlocked' section. When the user unlocks this feature, they will see a message that says "Strap on your apron! You've got the chance to create your very own recipe! You'll get to scan in a picture that you've drawn and submit the recipe. Our artists will create it and your recipe will be added to the Simply Delicious Cookbook! When you're ready to send your picture, go to the "Feature Code Shop" page and choose "Create my recipe!" from the unlocked section. |
| Unique experience | Create your own clothing | When the user unlocks this feature, they will be able to create their own picture of a piece of clothing. The user will have to be able to scan in their picture of the item and submit it to us. If the picture is appropriate, our artists will create the clothing item and award it to them. The item will also be added to the W Shop. The user needs to have the ability to access this feature after they've opened it (they do not have to use the feature right away). This feature can appear in the "Unlocked" section of the "Feature Code Shop." The user just has to choose the "Create Clothes" option to create their clothing item. Until the user submits something, this feature remains active (even if they open it and close the submission window). As soon as the user submits a piece of clothing, this option is removed from the Unlocked section. When the user unlocks this feature, they will see a message that says "Are you ready to design some cool clothing? What would you like your Webkinz ® to wear? Draw us a picture of your ultimate Webkinz ® outfit! You'll get to scan in a picture that you've drawn and our artists will create the clothing and add them to the W Shop! When you're ready, go to the "Feature Code Shop" and visit the "Unlocked" section. |
| Special Feature | Dock Skins | When the user unlocks this feature, they will unlock one new dock skin. Dock skins can be applied by going to the "My Profile" page, and choosing the skin they'd like on the dock. Dock skins can come in different colors and textures. When the user unlocks this feature, they will see a message that says: "Congratulations! You've unlocked a new skin for your dock! That means that you can make your dock a different color. Just check out the "Unlocked" section of the Feature Code Shop! |
| Unique Experience | IronKinz Challenge | When the user unlocks this feature, they will have the ability to create their own IronKinz Challenge (with three events). The user will go to their "Unlocked" section of the Feature Code Shop. They will choose "Create my own IronKinz Challenge." This will open up a special feature that allows them to choose three games from a list. They will be able to create a name for their IronKinz Challenge, as well as a date. (We will determine the time at which the event occurs). They will submit the |

APPENDIX A-continued

| Feature Code Shop Category | Type of Feature Code | Details |
|---|---|---|
| | | challenge it will be added to the DAS. We will make the challenge available on the day they requested via the "IronKinz Challenge" page (through the "Things to Do" menu). When the user unlocks this feature, they will see a message that says: "Congratulations! You're going to be able to create your own IronKinz Challenge for everyone in Webkinz World ® to play! Just go to the "Unlocked" section of the Feature Code Shop and choose "create IronKinz Challenge." You'll be able to choose three awesome events!" The user does not have to use this feature right away. It remains in their unlocked section until they use it. |

What is claimed is:

1. A method for providing a virtual world presentation to a user, said method comprising the steps of:

registering a first product on a website, using a first registration code provided with the first product, wherein, during said registering of the first product, a successful registration verifies said first registration code, wherein said first product being a real world non virtual product;

responsive to said successful registration of the first product, displaying a virtual replica of the first product on said website, said virtual replica of the first product being associated with a user ID;

further responsive to said successful registration of the first product, granting access to a first subset of restricted content on said website, said first subset of restricted content interacting with said virtual replica of the first product, with said first subset of restricted content also being associated with said user ID such that logging in to said website using said user ID provides access to said first subset of restricted content and said virtual replica of the first product to allow said interacting;

registering a second product on said website, using a second registration code provided with the second product, wherein, during said registering of the second product, a successful registration verifies said second registration code, wherein said second product being a real world non virtual product that is an accessory to said first product, and wherein said second product being a real world non virtual product;

responsive to registering the second product, displaying a virtual replica of the second product on said website, said virtual replica of the second product also being associated with said user ID, wherein said virtual replica of the first product interacts with said virtual replica of the second product on said website, wherein the first product represents a living thing and wherein said virtual replica of the second product is an item for said virtual replica of the first product to wear.

2. The method of claim 1, wherein the virtual replica of the second product is an item of clothing that is worn by said virtual replica of said first product, and said virtual replica of said second product cannot wear an item of clothing.

3. The method of claim 1, wherein the virtual replica of the second product is an item of jewelry that is worn by said virtual replica of the first product, and said virtual replica of the second product cannot wear an item of jewelry.

4. A method for providing a virtual world presentation to a user, said method comprising the steps of:

registering a toy on a website using a first registration code provided with the toy, wherein, during said registering of the toy, a successful registration verifies said first registration code, wherein the toy is a real world non virtual product;

responsive to said successful registration of the toy, displaying a virtual replica of the toy on said website, said virtual replica of the toy being associated with a user ID and being animated on said website;

further responsive to said successful registration of the toy, granting access to a first subset of restricted content on said website, said first subset of restricted content interacting with said virtual replica of the toy such that said virtual replica of the toy is animated within an environment provided by said first subset of restricted content, with said first subset of restricted content also being associated with said user ID such that logging in to said website using said user ID provides access to said first subset of restricted content and said virtual replica of the toy to allow said interacting;

registering a peripheral product on said website using a second registration code provided with the peripheral product, said peripheral product being related to said toy, wherein a successful registering of the peripheral product verifies said second registration code, wherein the peripheral product is a real world non virtual product;

responsive to said successful registration of the peripheral product, performing one or both of the steps of:

(1) displaying a virtual representation of the peripheral product on the website, said virtual representation of the peripheral product also being associated with said user ID, such that said virtual representation of the peripheral product also interacting with one or all of said first subset of restricted content, said virtual representation of the toy, and a second subset of restricted content, and (2) granting access to said second subset of restricted content on said website, said second subset of restricted content also being associated with said user ID such that logging in to said website using said user ID also provides access to said second subset of restricted content, wherein said toy represents a living thing and wherein said virtual representation of the peripheral product is an item for said virtual replica of said toy to wear, where said peripheral product cannot wear an item of clothing.

5. A method comprising:

accepting a first registration of a real world item on a website, using a first registration code provided with a first product, wherein, during said registering of the first product, a successful registration verifies said first registration code, wherein said first product being a real world non virtual product;

responsive to a successful first registration, providing a virtual replica representation of said real world item on said website, said virtual replica of the first product being associated with a user ID;

further responsive to said successful registration of the first product, granting access to a first subset of restricted content on said website, said first subset of restricted content interacting with said virtual replica of the first product, with said first subset of restricted content also being associated with said user ID such that logging in to said website using said user ID provides access to said first subset of restricted content and said virtual replica of the first product to allow said interacting;

accepting a second registration of an accessory item on said website, using a second registration code provided with a second product, wherein, during said registering of the second product, a successful registration verifies said second registration code, wherein said second product being a real world non virtual product where said accessory item is an item that is usable to change a look of said real world item; and responsive to a successful second registration, providing a virtual replica representation of said accessory item on said website, and using said virtual replica representation of said accessory item to change a look of said virtual replica representation of said real world item on said website.

6. The method as in claim 5, wherein said real world item and said accessory item are both real world items which have virtual representations on said website that resemble the real world items.

7. The method as in claim 5, wherein said real world item is a toy.

8. The method as in claim 5, further comprising responsive to said successful second registration, providing access to an area of said website that is not available prior to said successful second registration, and wherein said area includes at least one image thereon which is a virtual image of said accessory item.

9. The method as in claim 8, wherein said accessory item is a charm, and said area of said website is a charms forest.

10. The method as in claim 5, further comprising accepting a third registration of a bonus feature code that unlocks a bonus item that is shown only on said website and does not include a corresponding real world part, and wherein said bonus item interacts with, and is usable with, the virtual version of the real world item.

11. The method as in claim 10, wherein said bonus item changes a look of a virtual version that is displayed on said website.

12. A method comprising:
registering a first product on a website, using a first registration code provided with the first product, wherein, during said registering of the first product, a successful registration verifies said first registration code, wherein said first product being a real world non virtual product;

responsive to said successful registration of the first product, displaying a virtual replica of the first product on said website, said virtual replica of the first product being associated with a user ID;

further responsive to said successful registration of the first product, granting access to a first subset of restricted content on said website, said first subset of restricted content interacting with said virtual replica of the first product, with said first subset of restricted content also being associated with said user ID such that logging in to said website using said user ID provides access to said first subset of restricted content and said virtual replica of the first product to allow said interacting;

registering a second product on said website, using a second registration code provided with the second product, wherein, during said registering of the second product, a successful registration verifies said second registration code, wherein said second product being a real world non virtual product that is an accessory to said first product, and wherein said second product being a real world non virtual product;

responsive to registering the second product, displaying a virtual replica of the second product on said website, said virtual replica of the second product also being associated with said user ID, wherein said virtual replica of the first product interacts with said virtual replica of the second product on said website, and wherein said registering said second product allows access to a second portion of said website, wherein said second portion has a theme that is based on said accessory;

wherein said second product is an item that is worn on a body of said first product, but said second product cannot wear said item, but wearing said second product changes the look of said first product.

13. A method for providing a virtual world presentation to a user, said method comprising the steps of:
registering a first product on a website, using a first registration code provided with the first product, wherein, during said registering of the first product, a successful registration verifies said first registration code, wherein said first product being a real world non virtual product;

responsive to said successful registration of the first product, displaying a virtual replica of the first product on said website, said virtual replica of the first product being associated with a user ID;

further responsive to said successful registration of the first product, granting access to a first subset of restricted content on said website, said first subset of restricted content interacting with said virtual replica of the first product, with said first subset of restricted content also being associated with said user ID such that logging in to said website using said user ID provides access to said first subset of restricted content and said virtual replica of the first product to allow said interacting;

registering a second product on said website, using a second registration code provided with the second product, wherein, during said registering of the second product, a successful registration verifies said second registration code, wherein said second product being a real world non virtual product that is an accessory to said first product, and wherein said second product being a real world non virtual product;

responsive to registering the second product, displaying a virtual replica of the second product on said website, said virtual replica of the second product also being associated with said user ID, wherein said virtual replica of the first product interacts with said virtual replica of the second product on said website, wherein said first product is a figurine, said virtual replica is of a figurine that resembles said first product, and said accessory is not a figurine, but changes the look of said virtual replica of said figurine.

14. A method for providing a virtual world presentation to a user, said method comprising the steps of:
registering a first product on a website using a first registration code provided with the first product, wherein, during said registering of the first product, a successful registration verifies said first registration code, wherein said first product being a real world non virtual product;

responsive to said successful registration of the first product, displaying a virtual replica of the first product on said website, said virtual replica of the first product being associated with a user ID;

further responsive to said successful registration of the first product, granting access to a first subset of restricted content on said website, said first subset of restricted content interacting with said virtual replica of the first product, with said first subset of restricted content also being associated with said user ID such that logging in to said website using said user ID provides access to said first subset of restricted content and said virtual replica of the first product to allow said interacting;

registering a second product on said website using a second registration code provided with the second product, wherein during said registering of the second product, a successful registration verifies said second registration code, wherein said second product being a real world non virtual product;

responsive to said successful registration of the second product, performing one or both of the steps of:
(1) displaying a virtual representation of the second product on the website, said virtual representation of the second product being related to the second product and also being associated with said user ID, and
(2) granting access to a second subset of restricted content on said website, said second subset of restricted content interacting with one or more of said virtual replica of the first product, said virtual representation of the second product, and said first subset of restricted content, said second subset of restricted content also being associated with said user ID;

entering a bonus code on said website, said bonus code also being provided with the second product and said bonus code being different than said second registration code; and responsive to said entering of the bonus code, performing one or both of the steps of:
(1) displaying a virtual image on the website, said virtual image interacting with at least said virtual representation of the second product and/or said second subset of restricted content that is associated with registration of said second product, wherein said virtual image is also associated with said user ID and said virtual image being different than said virtual replica of said first product and different than said virtual representation of said second product, and
(2) granting access to a third subset of restricted content on said website, said third subset of restricted content interacting with one or more of said virtual replica of the first product, said virtual representation of the second product, said first subset of restricted content, and said second subset of restricted content, wherein said third subset of restricted content is also associated with said user ID;

whereby logging in to said website using said user ID provides access to all of said virtual replica of the first product, said first subset of restricted content, said second subset of restricted content and/or said virtual representation of the second product, and said third subset of restricted content and/or said virtual image, to allow said interacting, wherein said first product is a figurine, said virtual replica is of a figurine that resembles said first product, and said accessory is not a figurine, but changes the look of said virtual replica of said figurine.

15. A method for providing a virtual world presentation to a user, said method comprising the steps of:

registering a toy on a website using a first registration code provided with the toy, wherein, during said registering of the toy, a successful registration verifies said first registration code, wherein the toy is a real world non virtual product;

responsive to said successful registration of the toy, displaying a virtual replica of the toy on said website, said virtual replica of the toy being associated with a user ID and being animated on said website;

further responsive to said successful registration of the toy, granting access to a first subset of restricted content on said website, said first subset of restricted content interacting with said virtual replica of the toy such that said virtual replica of the toy is animated within an environment provided by said first subset of restricted content, with said first subset of restricted content also being associated with said user ID such that logging in to said website using said user ID provides access to said first subset of restricted content and said virtual replica of the toy to allow said interacting;

registering a peripheral product on said website using a second registration code provided with the peripheral product, said peripheral product being related to said toy, wherein a successful registering of the peripheral product verifies said second registration code, wherein the peripheral product is a real world non virtual product;

responsive to said successful registration of the peripheral product, performing one or both of the steps of:
(1) displaying a virtual representation of the peripheral product on the website, said virtual representation of the peripheral product also being associated with said user ID, such that said virtual representation of the peripheral product also interacting with one or all of said first subset of restricted content, said virtual representation of the toy, and a second subset of restricted content, and
(2) granting access to said second subset of restricted content on said website, said second subset of restricted content also being associated with said user ID such that logging in to said website using said user ID also provides access to said second subset of restricted content, wherein said toy is a plush toy, said virtual replica is of a toy that resembles said plush toy that was registered, and said peripheral is not a plush toy, but changes the look of said virtual replica of said plush toy.

16. A method for selling products, said method comprising the steps of:

providing a toy for sale, said toy being provided with an associated registration code, wherein the toy is a real world non virtual product;

providing a plurality of accessories to said toy for sale, each of said accessories being provided with an associated registration code, wherein each of said accessories is a real world non virtual product;

registering said toy on a website using said associated registration code, wherein, during said registering of said toy, a successful registration verifies said associated registration code;

responsive to said successful registration of said toy, obtaining a user ID and obtaining access to a subset of restricted content on said website, with said subset of restricted content being associated with a user having said user ID such that the user logging in to said website using said user ID gains access to said subset of restricted content; and offering said plurality of accessories for sale to the user, said offering including notifying a user that purchase of one or more of said accessories provides access to additional subsets of restricted content on said website, wherein said toy is a plush toy, said virtual replica is of a toy that resembles said plush toy that was registered, and said plurality of accessories are each not plush toys, but each change the look of said virtual replica of said plush toy.

17. A method as in claim 5, wherein said real world item is a figurine, said representation is of a figurine that resembles said real world item that was registered, and said accessory item is not a figurine, but changes the look of said virtual replica of said figurine.

18. A method for providing a virtual world presentation to a user, said method comprising the steps of:

registering a first product on a website, using a first registration code provided with the first product, wherein, during said registering of the first product, a successful registration verifies said first registration code, wherein said first product being a real world non virtual product;

responsive to said successful registration of the first product, displaying a virtual replica of the first product on said website, said virtual replica of the first product being associated with a user ID;

further responsive to said successful registration of the first product, granting access to a first subset of restricted content on said website, said first subset of restricted content interacting with said virtual replica of the first product, with said first subset of restricted content also being associated with said user ID such that logging in to said website using said user ID provides access to said first subset of restricted content and said virtual replica of the first product to allow said interacting;

registering a second product on said website, using a second registration code provided with the second product, wherein, during said registering of the second product, a successful registration verifies said second registration code, wherein said second product being a real world non virtual product that is an accessory to said first product, and wherein said second product being a real world non virtual product;

responsive to registering the second product, displaying a virtual replica of the second product on said website, said virtual replica of the second product also being associated with said user ID, wherein said virtual replica of the first product interacts with said virtual replica of the second product on said website, wherein said accessory is not a figurine, but changes the look of said virtual replica of said figurine.

19. A method for providing a virtual world presentation to a user, said method comprising the steps of:

registering a first product on a website, using a first registration code provided with the first product, wherein, during said registering of the first product, a successful registration verifies said first registration code, wherein said first product being a real world non virtual product;

responsive to said successful registration of the first product, displaying a virtual replica of the first product on said website, said virtual replica of the first product being associated with a user ID;

further responsive to said successful registration of the first product, granting access to a first subset of restricted content on said website, said first subset of restricted content interacting with said virtual replica of the first product, with said first subset of restricted content also being associated with said user ID such that logging in to said website using said user ID provides access to said first subset of restricted content and said virtual replica of the first product to allow said interacting;

registering a second product on said website, using a second registration code provided with the second product, wherein, during said registering of the second product, a successful registration verifies said second registration code, wherein said second product being a real world non virtual product that is an accessory to said first product, and wherein said second product being a real world non virtual product;

responsive to registering the second product, displaying a virtual replica of the second product on said website, said virtual replica of the second product also being associated with said user ID, wherein said virtual replica of the first product interacts with said virtual replica of the second product on said website, wherein said accessory is an item that is worn on a body of said first product, but said second product cannot wear said accessory item, but wearing said second product changes the look of said first product.

20. A method for providing a virtual world presentation to a user, said method comprising the steps of:

registering a first product on a website using a first registration code provided with the first product, wherein, during said registering of the first product, a successful registration verifies said first registration code, wherein said first product being a real world non virtual product;

responsive to said successful registration of the first product, displaying a virtual replica of the first product on said website, said virtual replica of the first product being associated with a user ID;

further responsive to said successful registration of the first product, granting access to a first subset of restricted content on said website, said first subset of restricted content interacting with said virtual replica of the first product, with said first subset of restricted content also being associated with said user ID such that logging in to said website using said user ID provides access to said first subset of restricted content and said virtual replica of the first product to allow said interacting;

registering a second product on said website using a second registration code provided with the second product, wherein during said registering of the second product, a successful registration verifies said second registration code, wherein said second product being a real world non virtual product;

responsive to said successful registration of the second product, performing one or both of the steps of:

(1) displaying a virtual representation of the second product on the website, said virtual representation of the second product being related to the second product and also being associated with said user ID, and (2) granting access to a second subset of restricted content on said website, said second subset of restricted content interacting with one or more of said virtual replica of the first product, said virtual representation of the second product, and said first subset of restricted content, said second subset of restricted content also being associated with said user ID;

entering a bonus code on said website, said bonus code also being provided with the second product and said bonus code being different than said second registration code; and responsive to said entering of the bonus code, performing one or both of the steps of:

(1) displaying a virtual image on the website, said virtual image interacting with at least said virtual representation of the second product and/or said second subset of restricted content that is associated with registration of said second product, wherein said virtual image is also associated with said user ID and said virtual image being different than said virtual replica of said first product and different than said virtual representation of said second product, and (2) granting access to a third subset of restricted content on said website, said third subset of restricted content interacting with one or more of said virtual replica of the first product, said virtual representation of the second product, said first subset of restricted content, and said second subset of restricted content, wherein said third subset of restricted content is also associated with said user ID;

whereby logging in to said website using said user ID provides access to all of said virtual replica of the first product, said first subset of restricted content, said second subset of restricted content and/or said virtual representation of the second product, and said third subset of restricted content and/or said virtual image, to allow said interacting, wherein said second product is an item that is worn on a body of said first product, but said second product cannot wear said item, but wearing said second product changes the look of said first product.

21. A method for providing a virtual world presentation to a user, said method comprising the steps of:

registering a toy on a website using a first registration code provided with the toy, wherein, during said registering of the toy, a successful registration verifies said first registration code, wherein the toy is a real world non virtual product;

responsive to said successful registration of the toy, displaying a virtual replica of the toy on said website, said virtual replica of the toy being associated with a user ID and being animated on said website;

further responsive to said successful registration of the toy, granting access to a first subset of restricted content on said website, said first subset of restricted content interacting with said virtual replica of the toy such that said virtual replica of the toy is animated within an environment provided by said first subset of restricted content, with said first subset of restricted content also being associated with said user ID such that logging in to said website using said user ID provides access to said first subset of restricted content and said virtual replica of the toy to allow said interacting;

registering a peripheral product on said website using a second registration code provided with the peripheral product, said peripheral product being related to said toy, wherein a successful registering of the peripheral product verifies said second registration code, wherein the peripheral product is a real world non virtual product;

responsive to said successful registration of the peripheral product, performing one or both of the steps of:

(1) displaying a virtual representation of the peripheral product on the website, said virtual representation of the peripheral product also being associated with said user ID, such that said virtual representation of the peripheral product also interacting with one or all of said first subset of restricted content, said virtual representation of the toy, and a second subset of restricted content, and (2) granting access to said second subset of restricted content on said website, said second subset of restricted content also being associated with said user ID such that logging in to said website using said user ID also provides access to said second subset of restricted content, wherein said second product is an item that is worn on a body of said first product, but said second product cannot wear said item, but wearing said second product changes the look of said first product.

22. A method for providing a virtual world presentation to a user, said method comprising the steps of:

registering the user on a website using a user ID;

registering a code provided with a first product on the website, wherein the first product is a real world non virtual product;

responsive to registering the first product, performing one or both of the steps of:

(1) displaying a virtual representation of the first product on said website, said virtual representation of the first product being associated with said user ID, and (2) granting access to a first subset of restricted content on said website, said first subset of restricted content providing an activity for the user;

after said registering of the user and the code, registering a second code provided with a second product on said website, wherein said second product is associated with said user ID, wherein the second product is a real world non virtual product;

registering a bonus code on said website, wherein said bonus code is provided with said second product;

responsive to registering the second product, providing access to additional restricted content on the website, and in response to registering said bonus code, providing a bonus feature associated with said first product that was not available prior to said registering of the bonus code and that would not have been available without said registering of the first product and wherein said bonus feature is other than the second product itself, wherein said second product is an item that is worn on a body of said first product, but said second product cannot wear said item, but wearing said second product changes the look of said first product.

23. A method for selling products, said method comprising the steps of:

providing a toy for sale, said toy being provided with an associated registration code, wherein the toy is a real world non virtual product;

providing a plurality of accessories to said toy for sale, each of said accessories being provided with an associated registration code, wherein each of said accessories is a real world non virtual product;

registering said toy on a website using said associated registration code, wherein, during said registering of said toy, a successful registration verifies said associated registration code;

responsive to said successful registration of said toy, obtaining a user ID and obtaining access to a subset of restricted content on said website, with said subset of restricted content being associated with a user having said user ID such that the user logging in to said website using said user ID gains access to said subset of restricted content; and offering said plurality of accessories for sale to the user, said offering including notifying a user that purchase of one or more of said accessories provides access to additional subsets of restricted content on said website, wherein at least one of said accessories is an item that is worn on a body of said toy, but said accessory cannot wear said item, but wearing said accessory changes the look of said toy.

24. A method as in claim 5, wherein said accessory is an item that is worn on a body of said real world item but said accessory cannot wear said item, but wearing said accessory changes the look of said real world item.

* * * * *